(12) United States Patent
Eisenberg et al.

(10) Patent No.: US 12,339,194 B2
(45) Date of Patent: Jun. 24, 2025

(54) METHODS FOR COMPENSATING MEASUREMENTS OF DEVICES UNDER TEST (DUTS) CAPTURED THROUGH PRESCRIPTION LENSES, AND ASSOCIATED IMAGING SYSTEMS, DEVICES, AND METHODS

(71) Applicant: RADIANT VISION SYSTEMS, LLC, Redmond, WA (US)

(72) Inventors: Eric Christopher Eisenberg, Bothell, WA (US); Javier Antonio Ruiz, Oceanside, CA (US); Erin Marie Elizabeth Brown, Redmond, WA (US)

(73) Assignee: RADIANT VISION SYSTEMS, LLC, Redmond, WA (US)

( * ) Notice: Subject to any disclaimer, the term of this patent is extended or adjusted under 35 U.S.C. 154(b) by 0 days.

(21) Appl. No.: 18/870,275

(22) PCT Filed: Jun. 7, 2024

(86) PCT No.: PCT/US2024/032948
§ 371 (c)(1),
(2) Date: Nov. 27, 2024

(87) PCT Pub. No.: WO2024/254410
PCT Pub. Date: Dec. 12, 2024

(65) Prior Publication Data
US 2025/0110015 A1    Apr. 3, 2025

Related U.S. Application Data

(60) Provisional application No. 63/572,085, filed on Mar. 29, 2024, provisional application No. 63/507,170, filed on Jun. 9, 2023.

(51) Int. Cl.
*G01M 11/04*     (2006.01)
*G01M 11/02*     (2006.01)
(Continued)

(52) U.S. Cl.
CPC ........ *G01M 11/04* (2013.01); *G01M 11/0228* (2013.01); *G02B 27/017* (2013.01); *G06V 20/20* (2022.01); *H04N 13/332* (2018.05)

(58) Field of Classification Search
CPC .... G06V 20/20; H04N 13/332; H04N 13/344; G06T 19/006; G02B 2027/0178;
(Continued)

(56) References Cited

U.S. PATENT DOCUMENTS

| 2007/0285537 A1 | 12/2007 | Dwinell et al. |
| 2009/0091707 A1 | 4/2009 | Rush et al. |

(Continued)

FOREIGN PATENT DOCUMENTS

| CN | 114486195 A * | 5/2022 | |
| FR | 2878979 A1 * | 6/2006 | ........ G01M 11/0214 |

(Continued)

OTHER PUBLICATIONS

International Search Report and Written Opinion mailed Oct. 18, 2024 in International Patent Application No. PCT/US24/32948, 14 pages.

*Primary Examiner* — Maurice C Smith
(74) *Attorney, Agent, or Firm* — Perkins Coie LLP

(57) ABSTRACT

Methods for compensating measurements of devices under test (DUTs) captured through prescription lenses (and associated imaging systems, devices, and methods) are described herein. In one embodiment, a method for characterizing focus quality of a DUT through a prescription lens includes adjusting an optical power of a measurement device to compensate for optical power provided by the prescription lens. The method further comprises imaging, using the measurement device, a test pattern through the prescription lens, wherein the test pattern is displayed by the DUT; measuring contrast of an edge in the test pattern at a point (Continued)

of interest within the imaging of the test pattern; and determining focus quality of the DUT based at least in part on the contrast measurement.

35 Claims, 18 Drawing Sheets

(51) Int. Cl.
*G02B 27/01* (2006.01)
*G06V 20/20* (2022.01)
*H04N 13/332* (2018.01)

(58) Field of Classification Search
CPC . G02B 27/017; G01M 11/02; G01M 11/0235; G01M 11/04
See application file for complete search history.

(56) References Cited

U.S. PATENT DOCUMENTS

| 2014/0253907 A1* | 9/2014 | Ignatovich ........... G01M 11/025 356/73 |
| 2018/0136486 A1 | 5/2018 | Macnamara et al. |
| 2019/0265514 A1 | 8/2019 | Richards et al. |

FOREIGN PATENT DOCUMENTS

| KR | 20200106301 A * | 9/2020 | ........ G01M 11/0235 |
| WO | WO-2020081871 A1 * | 4/2020 | ........ G01M 11/0221 |

* cited by examiner

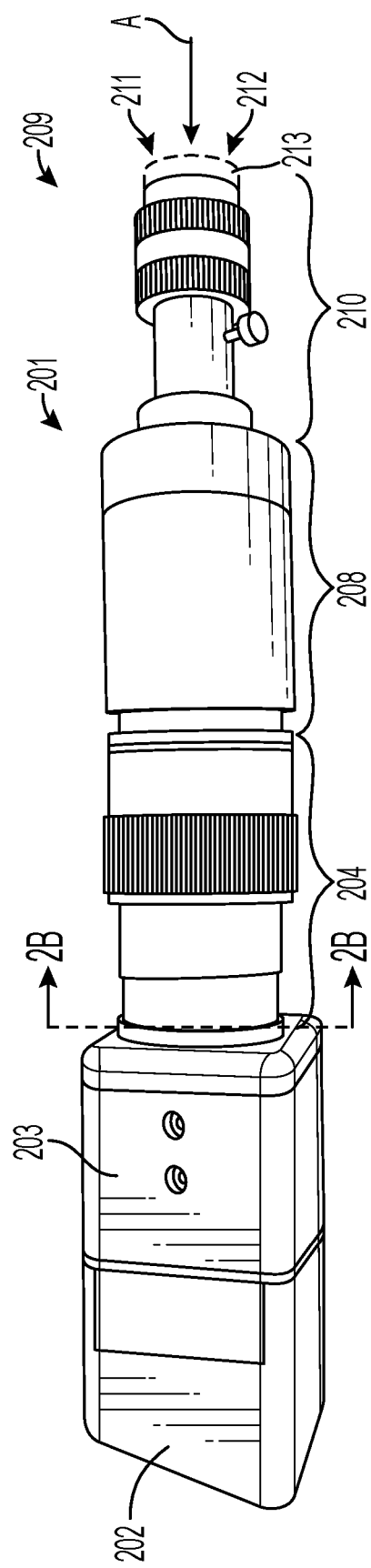
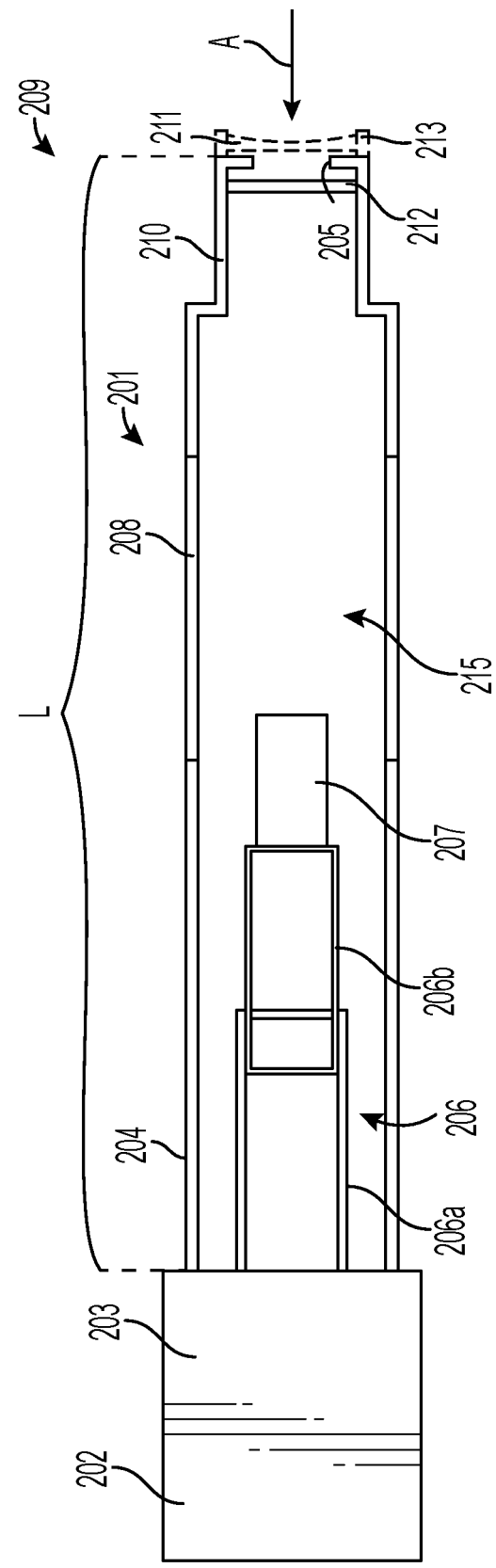
FIG. 2A
FIG. 2B

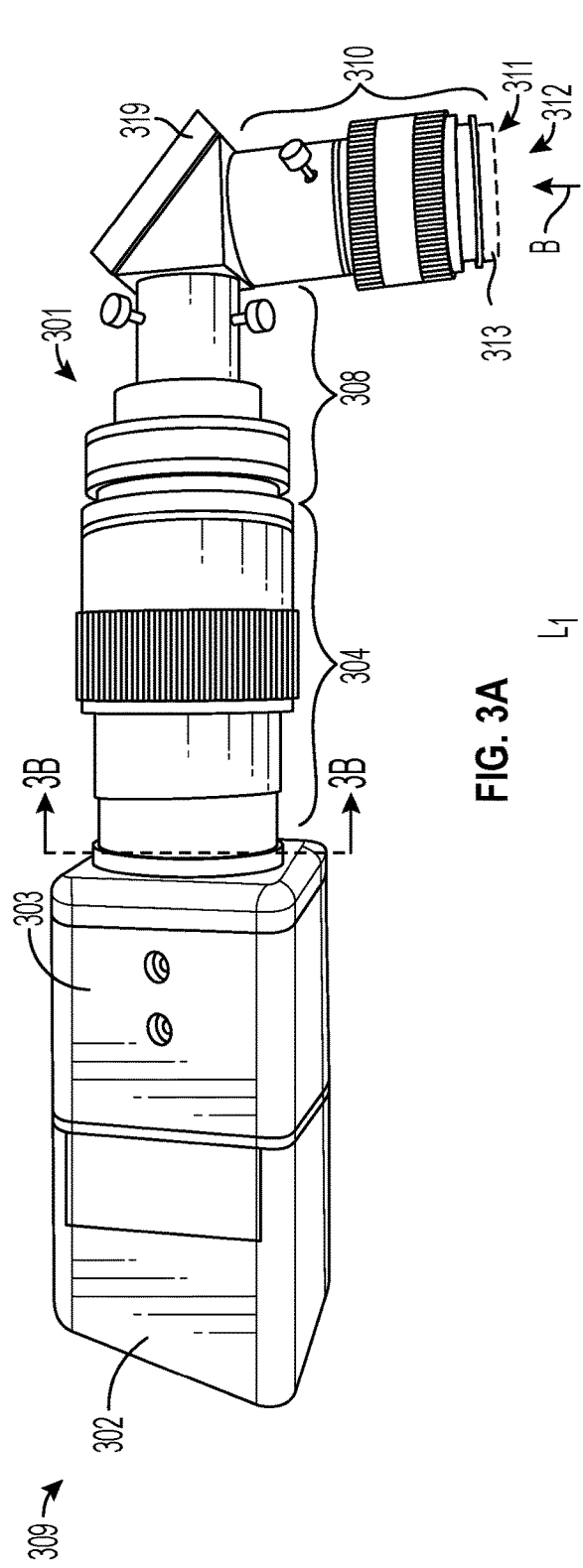
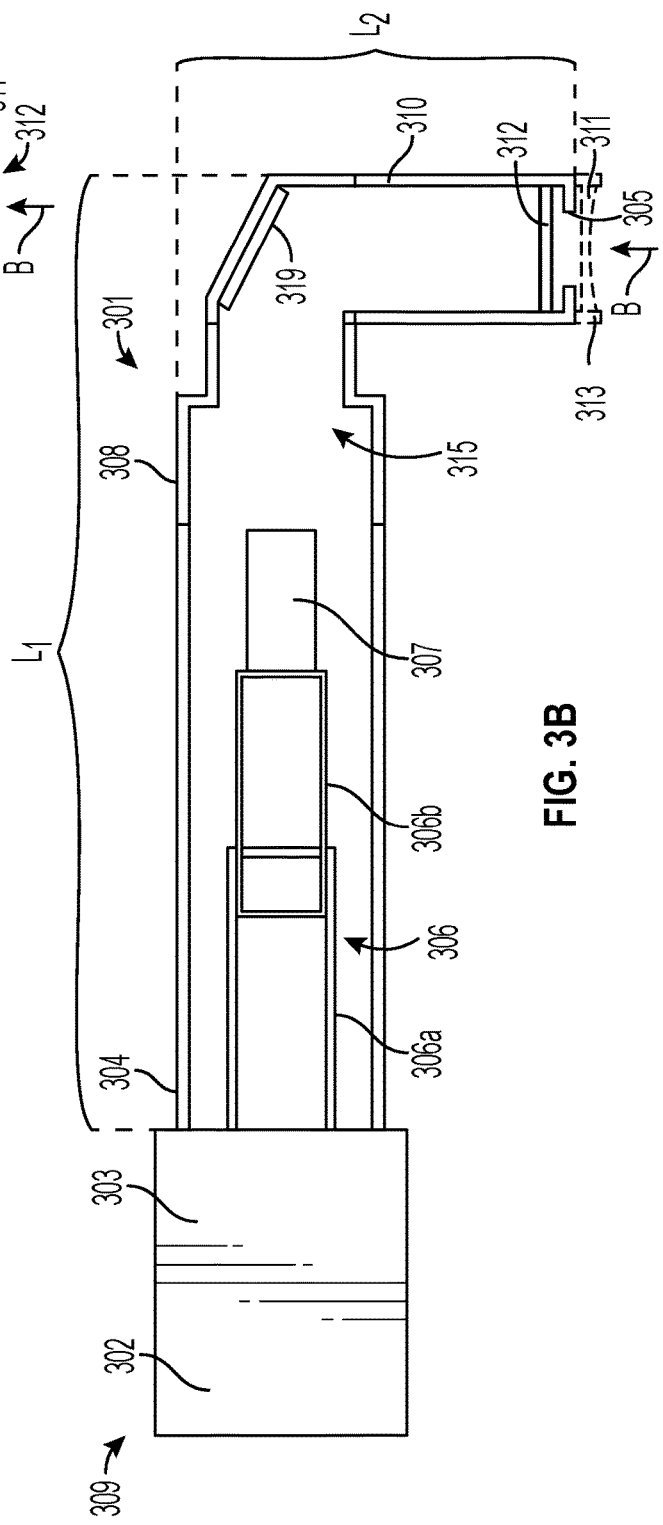
FIG. 3A
FIG. 3B

METHODS FOR COMPENSATING MEASUREMENTS OF DEVICES UNDER TEST (DUTS) CAPTURED THROUGH PRESCRIPTION LENSES, AND ASSOCIATED IMAGING SYSTEMS, DEVICES, AND METHODS

CROSS-REFERENCE TO RELATED APPLICATION(S)

This application is a national phase of International Patent Application No. PCT/US24/32948, filed on Jun. 7, 2024, and claims the benefit of the following pending patent applications:
 (a) U.S. Provisional Patent Application No. 63/507,170, filed Jun. 9, 2023; and
 (b) U.S. Provisional Patent Application No. 63/572,085, filed Mar. 29, 2024.

Each of the foregoing applications is incorporated herein by reference in its entirety. Further, components and features of embodiments disclosed in the applications incorporated herein by reference may be combined with various components and features disclosed and claimed in the present application.

TECHNICAL FIELD

The present disclosure relates generally to imaging systems. For example, several embodiments of the present technology relate to methods for compensating measurements of a device under test (e.g., an electronic display) captured through a prescription lens, and associated imaging systems, devices, and methods. As a specific example, several embodiments of the present technology are directed to methods for compensating measurements of an augmented reality (AR) and/or virtual reality (VR) display captured through a lens matching a user's glasses prescription.

BACKGROUND

Electronic visual displays have become commonplace. Such displays are used in a wide variety of contexts, from scoreboards and billboards, to computer screens, televisions, and personal electronics. One such context is in AR and VR devices in which smaller displays are positioned near a user's eyes and are used to enhance the real-world environment by computer-generated perceptual information (in the case of augmented reality) or to completely replace the real-world environment with a simulated one (in the case of virtual reality).

It is often desirable to measure characteristics of some or all portions of a display. For example, it is often desirable to measure the color and brightness of a pixel or group of pixels in a display and/or other characteristics of the display to ensure that the display meets specified and/or acceptable parameters before it is incorporated into other devices, shipped, and/or sold. In industry, imaging systems are often employed in addition to, or in lieu of, human vision to inspect displays. Data collected by such imaging systems can be used to verify that one or more characteristics of a display are correct, to perform various calibrations to bring the characteristics of the display into alignment with specified and/or acceptable parameters, and/or to reject deficient displays altogether.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments shown, but are provided for explanation and understanding.

FIG. 2A is a side view of an imaging system configured in accordance with various embodiments of the present technology.

FIG. 2B is a schematic, partial cross-sectional side view of the imaging system of FIG. 2A.

FIG. 3A is a side view of another imaging system configured in accordance with various embodiments of the present technology.

FIG. 3B is a schematic, partial cross-sectional side view of the imaging system of FIG. 3A.

DETAILED DESCRIPTION

Figure 1:
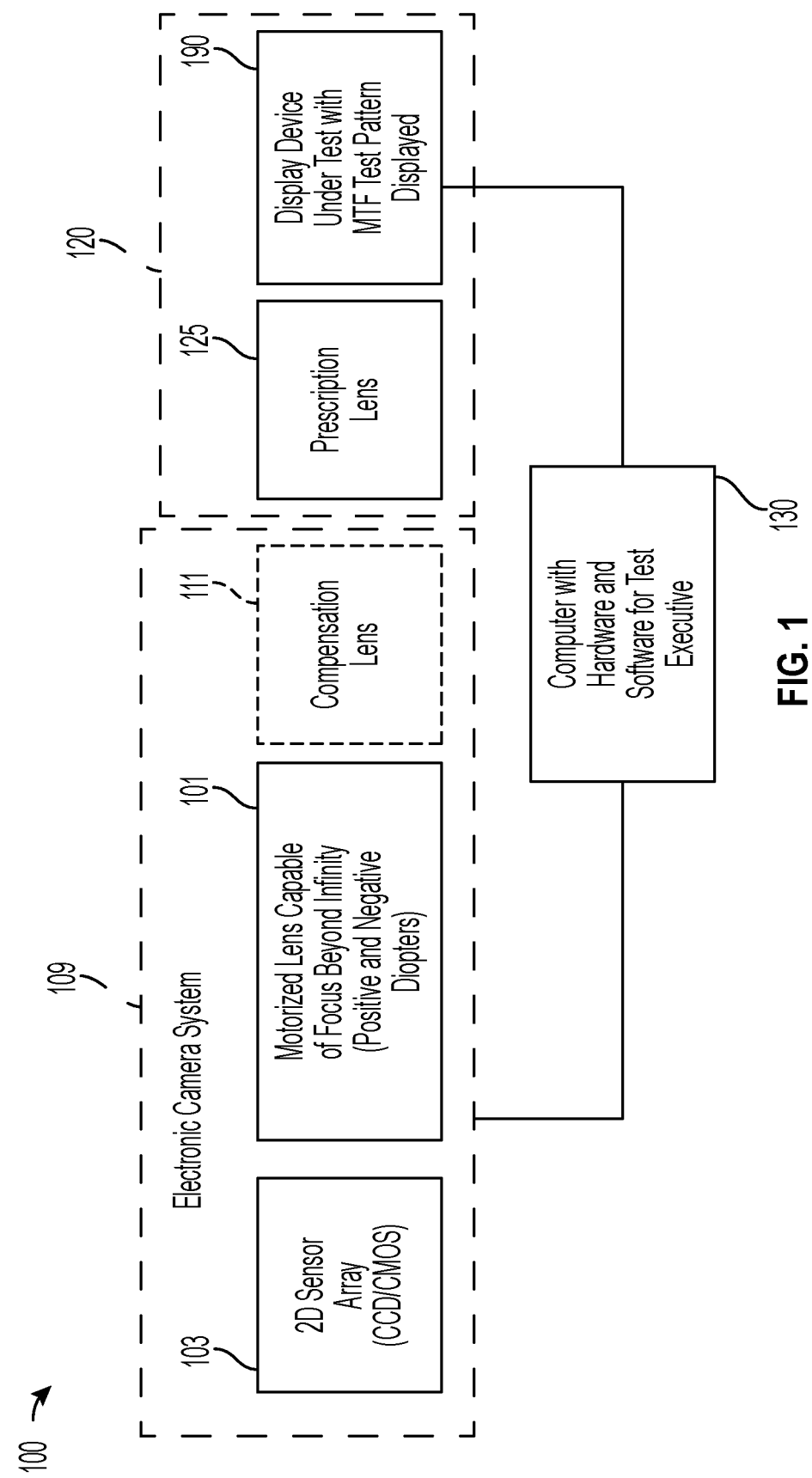
FIG. 1 is a partially schematic block diagram of an imaging system configured in accordance with various embodiments of the present technology.

The following disclosure describes methods for compensating measurements of a device under test captured through a prescription lens, and associated imaging systems, devices, and methods. For the sake of clarity and understanding, embodiments of the present technology are discussed in detail below with respect to imaging systems configured to measure (e.g., image and/or analyze) one or more characteristics of displays of near-to-eye devices, such as AR and VR devices, through prescription lenses. The prescription lenses may or may not be components of the near-to-eye devices themselves. For example, AR glasses can include a display that is integrated with (e.g., irreversibly attached to) a prescription lens that is positioned between the display and a user's eye when the AR glasses are worn. As another example, VR goggles can include a permanent display and can be configured to receive a removable and/or interchangeable glasses component having a prescription lens. The measured displays are occasionally referred to herein as devices under test (DUTs).

A person of ordinary skill in the art will readily appreciate that imaging systems (and associated systems, devices, and methods) of the present technology can be employed in other contexts, including to measure other DUTs through a lens. For example, imaging systems of the present technology can be employed to measure a variety of different displays (e.g., scoreboards, billboards, computer screens, televisions, and/or personal electronics), including in contexts in which a lens (prescription or otherwise) is positioned between such displays and the imaging system and/or users' eyes. Additionally, or alternatively, imaging systems of the present technology can be employed to measure other components of a device besides its display (e.g., the cover or case of a mobile phone to, for example, identify cosmetic defects; an illuminator, such as an infrared illuminator on a facial recognition device; diffraction gratings; diffractive optical elements; holographic optical elements) and/or to measure other objects that may lack displays altogether (e.g., appliance parts, vehicle parts, durable good surfaces, etc.). Such other applications are within the scope of the present technology.

A. Overview

As discussed above, it is often desirable to measure characteristics of some portion of a DUT to increase the likelihood that the DUT meets specified and/or acceptable parameters before it is incorporated into other devices, shipped, and/or sold. For example, in the case of an electronic display, it is often desirable to measure sharpness of focus (also referred to herein as "focus quality") of the display at a given distance. As a specific example, in AR or VR near-to-eye devices, it is often desirable to measure contrast of information presented by one or more displays of such devices as an indication of focus quality of the display(s) at a distance corresponding to the positioning of a user's eyes when wearing such devices. In industry, imaging systems are often employed to perform such measurements.

As near-to-eye devices become ubiquitous, it is expected that manufacturers of such devices will incorporate users' unique glasses prescriptions into the devices. For example, in the case of AR glasses, it is expected that manufactures will integrate (e.g., incorporate, fuse, manufacture, assemble, combine, couple, irreversibly or reversibly attach) a display with a prescription lens that corrects or compensates for a specific user's eyesight. Doing so will enable the user to wear the AR glasses as regular, everyday glasses while also providing the user the ability to selectively view AR information via the display.

Typically, after a near-to-eye device is assembled, various aspects of the final integrated system are tested (e.g., as part of a quality control process) before the near-to-eye device is provided to an end user. For example, various aspects of a display integrated into the near-to-eye device can be tested to ensure that those aspects are within acceptable parameters/tolerances before the near-to-eye device is provided to the end user. One important aspect is the sharpness of focus of the display. But when the display has been integrated with a lens that corresponds to an end user's glasses prescription, an imaging system will need to measure light generated by the display after the light passes through and is affected by the prescription lens to ensure that the sharpness of focus, as will be seen by the end user, is within acceptable parameters/tolerances. Such testing has proven challenging for several reasons.

First, a prescription lens negatively affects the sharpness of focus of a display. Thus, when attempting to measure sharpness of focus of a display through a prescription lens using a conventional imaging system that has been focused to the virtual distance at which the display is configured to present an image, the prescription lens causes the conventional imaging system to report poor focus quality.

Second, standard photography lenses typically allow focus between some finite distance and infinity. Stated another way, standard photography lenses typically operate with only positive optical powers and do not permit focusing beyond infinity (or operating with negative optical powers). Prescription lenses that are used to correct for nearsightedness, however, are manufactured with negative diopter values. As such, specialized imaging systems that include lenses that can focus beyond infinity to provide negative optical power are needed to correctly measure sharpness of focus of a display that projects light through a prescription lens manufactured with negative diopter values.

To address the above concerns, one potential approach is to utilize a standard imaging system and introduce additional optical components, such as a lens (e.g., an "anti-prescription lens", or a "compensation lens") between the standard imaging system and the prescription lens that counteracts the effects of the prescription lens. For example, when a display is integrated with a prescription lens that provides negative optical power equivalent to −2 diopters, a compensation lens providing positive optical power equivalent to +2 diopters or greater can be introduced between the standard imaging system and the prescription lens to cancel out or counteract the effects of the prescription lens on light emitted from the display. In turn, a standard imaging system with positive optical power focusing capabilities can be used to measure the display.

Such a solution, however, can suffer from several drawbacks in many cases. For example, this approach generally requires the prescription to be known. In addition, there is a limited amount of space between the imaging system and the display of a DUT. Thus, inserting one or more compensation lenses between the imaging system and the display can be impractical and, in some cases, impossible. Furthermore, this approach requires additional mounts, motors, electronics, etc. to switch out, position, retain, or otherwise control or manage the compensation lens(es), which can be bulky, expensive, labor-intensive, time-consuming, and/or difficult to calibrate and maintain.

Moreover, prescription lenses come in a wide range of optical powers and often are combined with components to correct for astigmatism. For example, spherical components of prescription lenses that are used to correct or compensate for farsightedness can be manufactured with various positive diopter values (e.g., diopter values falling between zero and +20 or more), and spherical components of prescription lenses that are used to correct or compensate for nearsightedness can be manufactured with various negative diopter values (e.g., diopter values falling between zero and −9 or less). Additionally, or alternatively, prescription lenses can be manufactured with cylindrical components (e.g., cylindrical components with diopter values between zero and +3 or more) to correct for various degrees of astigmatism. Thus, the sheer number of unique prescription possibilities can, in some cases, require an impractical or unwieldy number of compensation lenses to account for every testing scenario.

To address these challenges, the present inventors have developed methods for compensating measurements of a DUT (e.g., an electronic display) through a prescription lens. More specifically, the inventors have determined that the addition of a prescription lens changes the optical power required for an imaging system to achieve, at a given point of interest, best focus of a test pattern displayed by a DUT through the prescription lens. In addition, the inventors have determined that, due to the nature of how many lenses for measuring near-to-eye devices are designed, optical power can vary as a function of angle in the object plane, which is relevant when using such lenses to measure a DUT through a prescription lens that includes a cylindrical component to address astigmatism. Thus, the inventors have developed methods for compensating for the effects of spherical and/or cylindrical components of a prescription lens on measurements of a DUT captured by an imaging system configured in accordance with various embodiments of the present technology. The inventors have also developed associated methods for characterizing focus quality of a DUT through a prescription lens.

For example, in several embodiments of the present technology, a DUT and a prescription lens (e.g., of a near-to-eye device, such as AR glasses) can be positioned within a FOV of a measurement device, and the DUT can be used to display a test pattern that can be imaged by the measurement device. The measurement device can be capable of providing both positive and negative optical powers. For example, the measurement device can include a lens that can be electronically or manually positioned at various locations to provide focus between some finite distance and infinity (to provide positive optical powers), as well as to provide focus beyond infinity (to provide negative optical powers). Thus, when prescription information of the prescription lens is known, the position of the lens of the measurement device can be adjusted such that the measurement device provides an optical power that corresponds to (and compensates for) the optical power provided by spherical components of the prescription lens. Additionally, or alternatively, when the prescription lens includes cylindrical components (e.g., to account for astigmatism), the measurement device can optionally include a cylindrical compensation lens that can be positioned between the prescription lens and an image sensor of the measurement device. The cylindrical compensation lens can provide an optical power that corresponds to (and compensates for) the optical power provided by the cylindrical components of the prescription lens, and can be installed and/or rotated such that an orientation of the cylindrical components of the compensation lens achieves an orientation (or cylindrical angle) that compensates for the cylindrical components of the prescription lens. The cylindrical optical power of the compensation lens may be positive or negative. In the event that the cylindrical optical power of the compensation lens is opposite (e.g., is equivalent to the negation of) the optical power provided by cylindrical components of the prescription lens, the compensation lens can be installed and/or rotated such that an orientation (or cylindrical angle) of the compensation lens matches the orientation (or cylindrical angle) of the prescription lens. On the other hand, in the event that the cylindrical optical power of the compensation lens is equal to the optical power provided by cylindrical components of the prescription lens, the compensation lens can be installed and/or rotated such that an orientation (or cylindrical angle) of the compensation lens is orthogonal to the orientation (or cylindrical angle) of the prescription lens. Thereafter, measurements of the DUT taken by the measurement device through the prescription lens can be used to accurately characterize sharpness of focus ("focus quality") and/or other aspects of the DUT at one or more points of interest within the FOV of the measurement device.

On the other hand, when prescription information of the prescription lens is not known or is to be verified, the measurement device can capture images of the test pattern over a range of optical powers by stepping through a range of positions of the lens of the measurement device (e.g., using software, such as a test executive running on a computing device that is coupled to the measurement device and/or to the DUT). In some embodiments, assuming that the working distance of a virtual image viewed by the measurement device is known, the captured images can be analyzed to determine an optical power provided by spherical components of the prescription lens. Additionally, or alternatively, the captured images can be analyzed to determine a modulation transfer function (MTF) of the DUT at one or more points of interest within the FOV of the measurement device. The MTF of the DUT at a given point of interest can reveal an ideal or optimal optical power at which to set the measurement device to (a) compensate for the optical power provided by the prescription lens and (b) maximize focus of the test pattern at the given point of interest. A peak MTF value in the MTF of the DUT at the given point of interest can be used to characterize the sharpness of focus of the DUT at that point of interest.

In some embodiments, the test pattern displayed by the DUT can include a 4-degree slant edge (e.g., compliant with ISO Standard 12233). Alternatively, the test pattern displayed by the DUT can include line pairs spaced at a desired spatial frequency. Such a test pattern can be used in various embodiments of the present technology to (a) determine optical power provided by cylindrical components of a prescription lens and/or (b) compensate for the effects that astigmatic components of the prescription lenses have on measurements of the DUT captured by the measurement device. For example, when prescription information of the prescription lens is known, target edges that are defined at least in part by lines in the test pattern can be displayed oriented at an angle that matches an astigmatism angle of the prescription lens. Matching the orientation of the target edges of the test pattern with the astigmatism angle of cylindrical components of the prescription lens compensates (e.g., cancels, reduces, minimizes) negative effects of the cylindrical components on measurements of the DUT captured by the measurement device through the prescription lens. As a result, measurements of the DUT taken by the measurement device through the prescription lens when the orientation of the target edges of the test pattern match the astigmatism angle of cylindrical components of the prescription lens can be identical or nearly identical to measurements (a) taken through a prescription lens that lacks cylindrical components and/or (b) taken without a prescription lens present. In other words, matching the angle at which target edges in the test pattern are displayed to the astigmatism angle of a prescription lens (if any) can facilitate accurately characterizing sharpness of focus and/or other aspects of the DUT at one or more points of interest within the FOV of the measurement device.

When prescription information of a prescription lens is not known or is to be verified, the measurement device can capture images of the test pattern as the orientation of the lines in the test pattern are stepped through a range of target edge angles (e.g., using software, such as a test executive running on a computing device that is coupled to the measurement device and/or to the DUT). The captured images can be analyzed to determine a target edge angle that maximizes focus of the test pattern at a point of interest in images captured by the measurement device. Additionally, or alternatively, the measurement device can capture images of a test pattern that includes several sections. Each of the sections can include, for example, lines pairs arranged at an orientation that is different from other sections of the test pattern. In these embodiments, a fewer number of adjustments of the target pattern to step through the range of target edge angles and/or a fewer number of images of the test pattern taken by the measurement device can be used to identify a proper orientation for compensating for astigmatism. After determining the target edge angle that maximizes focus of the test pattern at a point of interest, the astigmatism angle of the prescription lens (or the optical power provided by cylindrical components of the prescription lens) can be determined based at least in part on this optimal target edge angle. Additionally, or alternatively, one or more images of the target pattern with line pairs oriented at the optimal target edge angle can be used to identify an MTF of the DUT at a given point of interest. As discussed above, the MTF of the DUT at the given point of interest can reveal an ideal or optimal optical power at which to set the measurement device to (a) compensate for the optical power provided by the prescription lens and (b) maximize focus of the test pattern at the given point of interest. A peak MTF value in the MTF of the DUT at the given point of interest can also be used to characterize the sharpness of focus of the DUT at that point of interest.

The present technology disclosed herein therefore offers several advantages over the above-described approaches. For example, the present technology permits compensation for the effects of a prescription lens on measurements of a DUT taken through the prescription lens even when the prescription information of the prescription lens is not known. In addition, the present technology accommodates a wide range of prescription possibilities, including prescriptions that provide positive optical power to address farsightedness, negative optical power to address nearsightedness, and/or cylindrical components to address astigmatisms. The present technology also accommodates this wide range of prescriptions possibilities while working within the limited amount of space available between a DUT and a measurement device, and without using additional and/or bulky optics or mechanisms between the imaging lens of the measurement device and the DUT. Furthermore, the present technology permits finer steps through optical powers than can be achieved using physical/additional compensation lenses added to the imaging system between the imaging lens of the measurement device and the prescription lens. As a result, the present technology it expected to achieve more precise measurements than those possible when using physical/additional compensation lenses, and is expected to better identify appropriate focus and/or astigmatism angle orientation settings that can be used to obtain measurements in the presence of a prescription lens that are identical or nearly identical to measurements captured when no prescription lens is positioned between a DUT and the imaging lens of a measurement device.

Certain details are set forth in the following description and in FIGS. 1-17 to provide a thorough understanding of various embodiments of the present technology. However, other details describing well-known structures and systems often associated with imaging systems, product inspection, and/or machine vision systems and associated methods are not set forth below to avoid unnecessarily obscuring the description of various embodiments of the technology.

Many of the details, dimensions, angles, and other features shown in FIGS. 1-17 are merely illustrative of particular embodiments of the technology. Accordingly, other embodiments can have other details, dimensions, angles, and features without departing from the spirit or scope of the present technology. In addition, those of ordinary skill in the art will appreciate that further embodiments of the technology can be practiced without several of the details described below.

B. Selected Embodiments of Imaging Systems and Associated Systems, Devices, and Methods 1. Imaging Systems and Associated Devices, Arrangements, and Environments FIG. 1 is a partially schematic block diagram of an example environment 150 in which an imaging system 100 configured in accordance with various embodiments of the present technology is arranged to measure a DUT 190. As shown, the imaging system 100 includes an electronic camera system 109 ("the camera system 109") having an image sensor 103 (e.g., a two-dimensional CCD or CMOS sensor array) and a lens arrangement 101. The camera system 109 and other camera systems of the present technology disclosed herein are also referred to herein as "measurement devices." In some embodiments, the lens arrangement 101 can be motorized and/or electronically controlled. Additionally, or alternatively, the lens arrangement 101 can be capable of focusing between some finite distance and infinity, as well as at distances beyond infinity. Thus, the lens arrangement 101 can provide both positive and negative optical powers.

The DUT 190 of FIG. 1 includes an electronic display. As shown, the DUT 190 is integrated with a prescription lens 125 as components of AR glasses 120. In operation, the DUT 190 is configured to emit light through the prescription lens 125 and thereby present information to a user at least when the AR glasses 120 are worn by the user.

When the prescription lens 125 includes cylindrical components (e.g., to account for astigmatism), the imaging system 100 and/or the camera system 109 can optionally include a compensation lens 111 positionable between the prescription lens 125 and the image sensor 103 of the camera system 109 to, for example, compensate for (e.g., cancel out, negate, mitigate, reduce, eliminate, alter) the optical power and/or other effects provided by the cylindrical components of the prescription lens 125. As discussed in greater detail below, the compensation lens 111 can include a cylindrical lens (a) that provides an optical power that corresponds to (e.g., compensates for, cancels out) an optical power provided by the cylindrical components of the prescription lens 125, and/or (b) that can be installed in—or rotated to—an orientation (or cylindrical angle) that corresponds to (e.g., matches, aligns, is orthogonal to) the orientation (or cylindrical angle) of the cylindrical components of the prescription lens 125. For example, the compensation lens 111 can include a cylindrical lens that provides an optical power that is opposite (e.g., equivalent to the negation of) the optical power provided by the cylindrical components of the prescription lens 125. Continuing with this example, to compensate for (e.g., cancel out, negate, eliminate, reduce) the optical power and/or other effects provided by the cylindrical components of the prescription lens 125, the compensation lens can be installed in—or rotated to—an orientation that matches or aligns with the orientation of the cylindrical components of the prescription lens 125. As discussed in greater detail below, the imaging system 100 and/or the camera system 109 can thereafter compensate for optical power provided by spherical components of the prescription lens 125, such as by adjusting the optical power provided by the lens arrangement 101 of the camera system 109.

As another example, the compensation lens 111 can include a cylindrical lens that provides an optical power that is equivalent to (e.g., is the same as) the optical power provided by cylindrical components of the prescription lens 125. Continuing with this example, the compensation lens 111 can be installed in—or rotated to—an orientation that is orthogonal to the orientation of the cylindrical components of the prescription lens 125. As two cylindrical lenses combined at orthogonal angles can be treated as a spherical lens of the same power, the cylindrical components of the prescription lens 125 and the compensation lens 111 can add spherical power to the system. Thus, as discussed in greater detail below, the imaging system 100 and/or the camera system 109 can thereafter compensate for optical power provided by (a) spherical components of the prescription lens 125 and (b) the cylindrical components of the prescription lens 125 in combination with the compensation lens 111, such as by adjusting the optical power provided by the lens arrangement 101 of the camera system 109.

The DUT 190 is positioned before the camera system 109 such that the camera system 109 can measure one or more aspects of the DUT 190 through the prescription lens 125. More specifically, the camera system 109 and the DUT 190 are arranged relative to one another such that light emitted from the DUT 190 (i) passes through the prescription lens 125 and the lens arrangement 101 and (ii) strikes the image sensor 103. As discussed in greater detail below, such an arrangement can facilitate measuring focus quality and/or other aspects of the DUT 190 using the imaging system 100.

The imaging system 100 of FIG. 1 further includes a test executive 130. In the illustrated embodiment, the test executive 130 is executed using hardware and/or software of a computer that is coupled to both the camera system 109 and the DUT 190. As discussed in greater detail below, the test executive 130 can be used (a) to electronically control focus of the lens arrangement 101, (b) to electronically control position and/or orientation of the compensation lens 111, (c) to electronically control timings of when the camera system 109 captures images, and/or (d) to electronically control test patterns displayed by the DUT 190.

FIG. 2A is a side view of an electronic camera system 209 ("the camera system 209") configured in accordance with various embodiments of the present technology, and FIG. 2B is a schematic, partial cross-sectional side view of the camera system 209 taken along line 2B-2B in FIG. 2A. It is appreciated that the illustrated camera system 209 may be an example of the camera system 109 of FIG. 1, or of another electronic camera system of the present technology. As shown in FIG. 2A, the camera system 209 includes a lens arrangement 201 and a machine or camera 202. The camera 202 includes an image sensor 203. The lens arrangement 201 includes a macro lens 204 (only a housing or barrel of the macro lens 204 is visible in FIG. 2A), a baffle 208, and an eyepiece 212. The eyepiece 212 is positioned within an eyepiece housing, shroud, or mount 210. In some embodiments, the lens arrangement 201 may also include an optional compensation lens 211. In these and other embodiments, the camera system 209 can be positioned and/or held in place at a desired location and/or orientation using a mount (not shown).

The camera 202 and/or the image sensor 203 of the camera system 209 can be any camera and/or image sensor suitable for imaging a device under test (DUT), such as one or more displays of a near-to-eye device. In some embodiments, the camera 202 is a spatial measurement camera. In these and other embodiments, the camera 202 is a non-spatial measurement camera (e.g., for use with a conoscope lens). The image sensor 203 can be a CCD image sensor and/or a CMOS image sensor.

In some embodiments, the camera 202 and/or the image sensor 203 can be selected based on desired characteristics. For example, the camera 202 and/or the image sensor 203 can be selected based at least in part on desired sensor pixel resolution, sensor megapixels, sensor type, field of view, camera dynamic range, high dynamic range, luminance minimum or maximum, camera accuracy, sensor aspect ratio, sensor shape, sensor form factor, camera measurement capabilities (e.g., luminance, radiance, illuminance, irradiance, luminous intensity, radiant intensity, etc.), and/or on other desired characteristics. In these and other embodiments, the camera 202 and/or the image sensor 203 can be selected based at least in part on use of a particular macro lens 204 (e.g., based at least in part on hardware and/or software compatibility with the particular macro lens 204), on use of a particular compensation lens 211, and/or on other components of the camera system 209. In these and still other embodiments, the camera 202 and/or the image sensor 203 can be selected based at least in part on characteristics of a DUT, such (a) a size of an area of interest on a display DUT, (b) space or size constraints presented by the DUT and/or another system (e.g., a headset) including the DUT, and/or characteristics of a prescription lens associated with the DUT.

The macro lens 204 can likewise be any macro lens suitable for imaging a DUT. In some embodiments, the macro lens 204 can be selected based on desired characteristics. For example, the macro lens 204 can be selected based at least in part on desired magnification, pupil size and/or location, focus distance, luminance minimum or maximum, horizontal or vertical field of view, size and/or barrel length, measurement capabilities (e.g., luminance, radiance, CIE chromaticity coordinates, correlated color temperature, etc.), and/or on other desired characteristics. In these and other embodiments, the macro lens 204 can be selected based at least in part on use of a particular camera 202 and/or image sensor 203 (e.g., based at least in part on hardware and/or software compatibility with the particular camera 202 and/or the particular image sensor 203) and/or on other components of the camera system 209 (e.g., based at least in part on a length of a particular baffle 208 and/or on a focus length of a particular eyepiece 212). In these and still other embodiments, the macro lens 204 can be selected based at least in part on characteristics of a DUT, such as (a) size of an area of interest on a display DUT and/or (b) space or size constraints presented by the DUT and/or another system (e.g., a headset) including the DUT. As shown in FIG. 2A, the macro lens 204 can be removably and/or mechanically connected to the camera 202 and/or to the imaging sensor 203. In some embodiments, the macro lens 204 can additionally or alternatively be removably and/or electrically connected to the camera 202 and/or to the imaging sensor 203.

The optional compensation lens 211 can similarly be selected based on desired characteristics. For example, as best shown in FIG. 2B, the compensation lens 211 can be a positive or negative cylindrical lens. The positive or negative cylindrical lens can provide an optical power when arranged a given orientation. Continuing with this example, the compensation lens 211 can therefore be selected to provide an optical power that corresponds to (e.g., compensates for, cancels out, mitigates, reduces, adjusts, alters) an optical power of cylindrical components of a prescription lens that is associated with a DUT. As shown, the compensation lens 211 can be positioned in hardware 213 that (a) enables the compensation lens 211 to be permanently or removably mounted to the eyepiece 212 (or an eyepiece mount 210 associated with the eyepiece 212), and/or (b) enables the compensation lens 211 to be rotated (e.g., such that an orientation of the compensation lens 211 can correspond to (e.g., be matched to, aligned with, be orthogonal to) an orientation of cylindrical components of a prescription lens). Although shown as positioned in front of the eyepiece 212 and an aperture 205 in FIGS. 2A and 2B, the compensation lens 211 can be positioned at other locations in other embodiments. For example, the compensation lens 211 can be positioned at a location between the eyepiece 212 and the aperture 205. As another example, the compensation lens 211 can be positioned between the eyepiece 212 and the macro lens 204, such as within eyepiece mount 210 or within the baffle 208. As still another example, the compensation lens 211 can be positioned at a location between the macro lens 204 and the image sensor 203.

The eyepiece 212 can be an ocular lens that is commonly employed in various optical systems. For example, the eyepiece 212 can be an eyepiece commonly employed in telescopes, microscopes, binoculars, rifle scopes, and/or other optical systems. In some embodiments, the eyepiece 212 can be selected based at least in part on desired characteristics. For example, the eyepiece 212 can be selected based on desired field of view, focal length, diameter, shape, type (e.g., Galilean, Convex, Huygenian, Ramsden, Kellner, Orthoscopic, Plössl, Monocentric, Erfle, König, RKE, Nagler, etc.), and/or on other desired characteristics. In these and other embodiments, the eyepiece 212 can be selected based, at least in part, on use of a particular macro lens 204 (e.g., based at least in part on the focal length of the macro lens 204) and/or on other components of the camera system 209 (e.g., based at least in part on a length of a particular baffle 208 and/or based at least in part on a length of a particular eyepiece mount 210). In these and still other embodiments, the eyepiece 212 can be selected based at least in part on characteristics of a DUT, such as (a) size of an area of interest on a display DUT and/or (b) space or size constraints presented by the DUT and/or another system (e.g., a headset) including the DUT.

As best shown in FIG. 2B, the eyepiece 212 is positioned at or near a distalmost end of the eyepiece mount 210, the lens arrangement 201, and/or the camera system 209. For example, the eyepiece 212 can be positioned at the distalmost end of the eyepiece mount 210, the lens arrangement 201, and/or the camera system 209. In other embodiments, the camera system 209 can include the aperture 205 and/or the optional compensation lens 211 positioned in front of the eyepiece 212, as discussed in greater detail below. In these embodiments, the eyepiece 212 can be positioned near the distalmost end. As a result of the position of the eyepiece 212 at or near the distalmost end, an exit pupil of the eyepiece 212 and/or an entrance pupil of the camera system 209 is not buried in the eyepiece mount 210 and/or the lens arrangement 201 of the camera system 209. In other words, the exit pupil of the eyepiece 212 and/or the entrance pupil of the camera system 209 is positioned in front of the camera system 209 and outside of the lens arrangement 201. Stated another way, the eyepiece 212 can be positioned such that a FOV of the camera system 209 is not clipped (or is only minorly and/or insignificantly obstructed) when looking through an exit pupil of a DUT. Furthermore, the position of the eyepiece 212 at or near the distalmost end portion of the eyepiece mount 210 and/or the lens arrangement 201 facilitates quickly positioning an exit pupil of the eyepiece 212 at a location corresponding to a location that a human eye pupil would be positioned when the near-to-eye device is used by a human as intended. When the exit pupil of the eyepiece 212 is positioned at this location, the camera system 209 can measure parameters (e.g., color, luminance, focus quality, etc.) exactly and/or similar to how those parameters would be viewed by a human user when using the near-to-eye device as intended.

In the illustrated embodiment, the eyepiece 212 is positioned in the eyepiece mount 210 in an orientation reversed from and/or opposite to how the eyepiece 212 would be positioned in other common optical systems. For example, in a common optical system, an eyepiece is typically positioned as the last or nearly the last optical element through which light traverses before it reaches a user's eye. Thus, the eyepiece is typically positioned proximate (e.g., a distance corresponding to the eye relief of the eyepiece from) the user's eye. Furthermore, the eyepiece is configured to (i) take an intermediate image formed by one or more other optical elements of the common optical system and (ii) present the image to the user's eye. To accomplish this, a focal side of the eyepiece is directed toward the intermediate image, and an afocal side of the eyepiece is directed toward the user's eye. The afocal side of the eyepiece is used to present the image to the user's eye as collimated light that (from the perspective of the user's eye) appears similar to light coming from infinity and therefore reduces strain on the user's eye.

In contrast, the eyepiece 212 of the present technology is positioned as the first or nearly the first optical element through which light traverses on its way through the lens arrangement 201 to the image sensor 203 of the camera 202. Thus, the eyepiece 212 is positioned at or near the front or distal end of the camera system 209. In other words, the eyepiece 212 is positioned a large distance (e.g., a distance much greater than the eye relief of the eyepiece 212) from the image sensor 203. Furthermore, the eyepiece 212 is configured to (i) take a far field image of an object and (ii)

present an intermediate image to the macro lens 204. To accomplish this, an afocal side of the eyepiece 212 is directed toward the far field image of the object, and a focal side of the eyepiece 212 is directed toward the macro lens 204.

Referring to FIGS. 2A and 2B together, the baffle 208 can be a generally hollow barrel that (e.g., removably) operably and/or mechanically connects the eyepiece mount 210 to a barrel of the macro lens 204. In some embodiments, the baffle 208 can be selected based at least in part on desired characteristics. For example, the baffle 208 can be selected based at least in part on desired length, diameter, shape (e.g., straight or folded), and/or on other desired characteristics. In these and other embodiments, the baffle 208 can be selected based at least in part on use of a particular macro lens 204 (e.g., based at least in part on the focal length of the macro lens 204) and/or on other components of the camera system 209 (e.g., based at least in part on the focal length of a particular eyepiece 212). In these and still other embodiments, the eyepiece 212 can be selected based at least in part on characteristics of a DUT, such as space or size constraints presented by the DUT and/or another system (e.g., a headset or frames) including the DUT.

In some embodiments, the baffle 208 shields an internal lens of the macro lens 204 from stray (e.g., ambient) light such that only light introduced into the camera system 209 via the eyepiece 212 reaches the internal lens of the macro lens 204. In other embodiments, the camera system 209 can lack a baffle 208 and/or the baffle 208 can be incorporated into other components of the camera system 209. For example, the eyepiece mount 210 can be directly connected to the barrel of the macro lens 204 in some embodiments. In these embodiments, a portion of the eyepiece mount 210 and/or a portion of the barrel of the macro lens 204 can serve as the baffle 208.

Referring now to FIG. 2B, the camera system 209 can optionally include the aperture 205 positioned in front of the eyepiece 212 (e.g., at or near a position of an eye relief of the eyepiece 212, and/or at or near the exit pupil of the eyepiece and/or the entrance pupil of the imaging system). The aperture 205 can be formed by an extension of the eyepiece mount 210 in some embodiments. In other embodiments, a separate component including or forming the aperture 205 can be attached to the eyepiece mount 210. The aperture 205 can have a fixed or adjustable shape and/or size (e.g., dimension). For example, the aperture 205 can be circular with a fixed or adjustable diameter. In embodiments in which the size of the shape and/or size of the aperture is/are adjustable, the shape and/or size of the aperture can be manually or electronically adjusted. For example, if the shape and/or size of the aperture is electronically adjustable, the component including or forming the aperture 205 can be electrically coupled to the eyepiece mount 210, the baffle 208, the macro lens 204, and/or the camera 202. As another example, the internal aperture (or "stop") of the macro lens 204 can be used to adjust the size of the entrance pupil of the imaging system. Continuing with this example, a diameter of the entrance pupil can be a function of the diameter of the stop of the macro lens 204. Thus, the diameter of the entrance pupil can be mechanically or electronically adjusted by adjusting mechanically or electronically adjusting the stop of the macro lens 204. In operation, the aperture 205 can limit or adjust the amount of light that enters the lens arrangement 201, much like how a pupil of a human eye can limit or adjust (e.g., via dilation and/or contraction) the amount of light permitted into the human eye. In some embodiments, the camera system 209 can include a virtual aperture (e.g., in lieu of the physical aperture 205) defined by the optics of the camera system 209. For example, when imaging a DUT in an environment with mechanical constraints, a virtual aperture can be used to project the entrance pupil of the camera system 209 in front of the lens arrangement 201.

The macro lens 204 can include one or more internal components. For example, the macro lens 204 can include a lens tube 206 and a lens 207. As shown, the lens tube 206 includes a first stationary component 206a and a second movable component 206b. The lens 207 can be fixedly attached to the second component 206b, and/or the second component 206b can move into and out of the first component 206a (e.g., along an axis generally parallel to the arrow A illustrated in FIG. 2B). As discussed in greater detail below, this can enable the camera system 209 to focus the internal lens 207 of the macro lens 204 on an intermediate image formed by the eyepiece 212.

The internal lens 207 of the macro lens 204 can be electronically and/or automatically focused. For example, the second component 206b of the lens tube 206 can be moved in response to instructions received from the camera 202 and/or another computing device. As a specific example, the camera 202 can include or be controlled using software (e.g., a test executive, such as the test executive of FIG. 1) to control the movement and positioning of the second component 206b of the lens tube 206. In these embodiments, the positioning of the internal lens 207 of the macro lens 204 can be electronically adjusted (e.g., via the camera 202 and/or at the direction of a test executive) along an axis generally parallel to the arrow A by extending the second component 206b outside of the first component 206a of the lens tube 206 and/or by retracting the second component 206b within the first component 206a. In these and other embodiments, the internal lens 207 of the macro lens 204 can be manually focused.

As discussed in greater detail below, the focus of the internal lens 207 can be adjusted to provide various optical powers for the camera system 209. For example, the internal lens 207 can be electronically or manually adjusted to focus at various distances between some finite distance and infinity, as well as at distances beyond infinity. Thus, the internal lens 207 can be adjusted to provide a wide range of positive and negative optical powers for the camera system 209. In some embodiments, the focus of the internal lens 207 can electronically or manually adjusted in diopters. For example, the focus of the internal lens 207 can be adjusted to various diopter values between zero (0) diopters and +20 diopters (or more), to provide positive optical powers for the camera system 209. Additionally, or alternatively, the focus of the internal lens 207 can be adjusted to various diopter values between zero (0) diopters and −9 diopters (or less), to provide negative optical powers for the camera system 209.

In operation, the camera system 209 can be electronically or manually focused onto a virtual image formed by DUT optics, and can be used to measure contrast of information within the virtual image as an indication of focus quality of the DUT. More specifically, the internal lens 207 of the macro lens 204 can be electronically or manually focused onto an intermediate image plane. The location of the intermediate image plane can vary depending on the environment in which the camera system 209 is employed. For example, when measuring a DUT of AR glasses that lack prescription lenses, the internal lens 207 can be focused onto an intermediate image plane close to a field stop position of the eyepiece 212. The field stop position of the eyepiece 212 can be, in effect, a position of where the eyepiece 212 is focused at infinity. Thus, when the internal lens 207 is focused on the field stop position of the eyepiece 212, the camera system 209 can be focused at infinity (corresponding to zero (0) diopters). As another example, when measuring a DUT of AR glasses through a convex prescription lens having a positive diopter value, the desired working distance can be shorter than infinity. As such, the physical position of the internal lens 207 can be adjusted to focus the camera system 209 onto an intermediate image plane located behind the field stop of the eyepiece 212. As still another example, when measuring a DUT of AR glasses through a concave prescription lens having a negative diopter value, the desired working distance can be beyond infinity. Thus, the physical position of the internal lens 207 can be adjusted to focus the camera system 209 onto an intermediate image plane located in front of the field stop of the eyepiece 212.

For the sake of clarity and understanding, consider a scenario in which the camera system 209 is employed to measure focus quality of a DUT at 2 meters. Absent a prescription lens positioned between the DUT and the image sensor 203 of the camera system 209, the internal lens 207 of the macro lens 204 can be focused to provide +0.5 diopters (equivalent to $$\frac{1}{\text{focal length}}, \text{ or } \frac{1}{2 \text{ meters}}\Bigg)$$

of optical power. In turn, the camera system 209 can be used to image a test pattern displayed by the DUT. Based on the image, an imaging system incorporating the camera system 209 can analyze contrast of information in the imaged test pattern to determine focus quality of the DUT at 2 meters. Assume for the following example that the imaging system concludes that the DUT has good focus quality at 2 meters.

Now assume that a prescription lens is positioned between the same DUT and the camera system 209. In this position, the prescription lens affects light emitted from the DUT before it reaches the image sensor 203 of the camera system 209. Thus, focusing the internal lens 207 to provide +0.5 diopters of optical power (as was done in the above example) and thereafter imaging a test pattern displayed by the DUT will likely result in the imaging system concluding that the focus quality of the same DUT is poor because the imaging system at this optical power is not accounting or compensating for the effects of the prescription lens. Therefore, to compensate for the effects of the prescription lens on the light emitted from the DUT, the internal lens 207 can be adjusted to provide a different amount of optical power than was provided in the above example.

As a specific example, assume that the prescription lens is concave and has an optical power equivalent to −2 diopters. In this scenario, the internal lens 207 of the macro lens 204 can be focused to provide −1.5 diopters (equivalent to $$\frac{1}{\text{focal length}} +$$

optical power provided by prescription lens, or +0.5 diopters −2 diopters) of optical power instead of +0.5 diopters of optical power. In other words, the internal lens 207 can be adjusted to focus the camera system 209 beyond infinity to compensate for the effects of the concave prescription lens on light emitted from the DUT. Thereafter, the camera 202 can be used to capture an image of a test pattern displayed by the DUT, and the imaging system can measure and/or analyze contrast of information presented in the test pattern to determine focus quality of the DUT at 2 meters. Because the DUT in this example is the same DUT in the above example in which no prescription lens was present, an imaging system incorporating the camera system 209 of FIG. 2 is expected to report a same or similar (good) focus quality of the DUT at 2 meters even though the camera system 209 is adjusted to provide a different optical power in the present example than in the above example.

Referring again to FIG. 2B, the internal lens 207 of the macro lens 204 can be focused without translating and/or changing the size/length of the barrel of the macro lens 204. For example, the length of the barrel of the macro lens 204 can be fixed. Alternatively, the length of the barrel of the macro lens 204 can be changeable yet remain fixed while the position of the internal lens 207 is changed (e.g., while the internal lens 207 is focused). This can enable the camera system 209 to focus the internal lens 207 on an intermediate image formed by the eyepiece 212 while the overall length of the camera system 209 remains unchanged. For the sake of clarity and understanding of this feature of the present technology, the lens arrangement 201 (comprising the barrel of the macro lens 204, the baffle 208, the eyepiece mount 210, and the aperture 205 (or the component forming the aperture 205)) are illustrated with a fixed length L (e.g., 100 mm) in FIG. 2B even though (a) the macro lens 204, the baffle 208, the eyepiece mount 210, the eyepiece 212, and/or the aperture 205 can be interchanged with other macro lenses 204, baffles 208, eyepiece mounts 210, eyepieces 212, and/or apertures 205, respectively, that may have different lengths that may change the overall length of the camera system 209; (b) the aperture 205 can be omitted, which may change (e.g., shorten) the overall length of the camera system 209; and/or (c) the camera system 209 can include (or be attached to) a compensation lens 211 that may change (e.g., increase) the overall length of the camera system 209.

The constant length of the camera system 209 while the position of the internal lens 207 is changed (e.g., to focus the internal lens 207) offers several advantages. For example, once the camera system 209 is positioned such that the eyepiece 212 is at a desired location before a DUT, the camera system 209 can adjust the position of the internal lens 207 of the macro lens 204 (e.g., to focus the internal lens 207 at different object planes) without changing the overall length of the camera system 209 and without changing the position of the eyepiece 212. This can decrease the time required to correctly position the camera system 209 to measure a DUT and/or can enable the camera system 209 to take several measurements of the DUT without needing to reposition the camera system 209 between the various different measurements. As a result, the time required to use the camera system 209 to inspect a DUT can be minimized and/or reduced, which can increase throughput of DUT inspections.

In operation, the camera system 209 can capture one or more measurements of a DUT. For example, light emitted from and/or reflected off a DUT positioned in front of the camera system 209 can enter into the camera system 209 via the compensation lens 211, the aperture 205, and/or the eyepiece 212, and generally along the arrow A illustrated in FIGS. 2A and 2B. When included, the compensation lens 211 (when rotated to/positioned in an orientation that corresponds to the orientation of cylindrical components of a prescription lens associated with the DUT, if any) can compensate for (e.g., counteract, cancel, mitigate, reduce, negate, alter, adjust) optical power provided by the cylindrical component of the prescription lens. The eyepiece 212 can collect and focus this light to form an intermediate image at a location within the focal range of the macro lens 204. In some embodiments, the eyepiece 212 can collect and focus the light to form an intermediate image at a location within airspace 215 (FIG. 2B), the airspace 215 being bounded by a portion of the eyepiece mount 210, a portion of the baffle 208, and/or a portion of the barrel of the macro lens 204. In other embodiments, the eyepiece 212 can collect and focus the light to form an intermediate image at a location beyond the distal end of the camera system 209. The intermediate image can be real or virtual. The baffle 208 can shield this airspace 215 from stray (e.g., ambient) light that does not enter the camera system 209 via the eyepiece 212. The lens tube 206 can adjust the position the internal lens 207 of the macro lens 204 until the internal lens 207 is focused at an image plane corresponding to the location of the intermediate image (e.g., within the airspace 215). At this point, the internal lens 207 can be considered focused on the intermediate image formed by the eyepiece 212. The internal lens 207 can collect and focus the light of the intermediate image onto the image sensor 203 of the camera 202. In turn, the image sensor 203 can convert the light incident on the image sensor 203 to electrical signals that can be processed by a computing device, such as the camera 202 and/or another computing device (not shown) operably connected to the camera 202. In the context of product inspection, measurements captured by the camera system 209 of a DUT can be used to verify one or more characteristics (e.g., color, brightness, angular distribution, focus quality) of the DUT are correct or are within acceptable parameters/tolerances, to perform various calibrations to bring the characteristics of a DUT into alignment with specified and/or acceptable parameters, to inform rework of the DUT or other stages of manufacturing and/or assembly, and/or to reject a DUT altogether such that the DUT is not provided to an end user.

As discussed above, images captured by the camera system 209 can be spatial or non-spatial. For example, the camera system 209 can be a spatial imaging system that is used to capture still images or to record moving images of a DUT. Continuing with this example, the camera system 209 can capture/measure/record color, brightness, and/or spatial information (e.g., relative location, shape, size, and/or orientation data) of light emitted from the DUT. As another example, the camera system 209 can be a non-spatial imaging system that is used to capture data of DUT that is independent of geometric considerations. Continuing with this example, the lens arrangement 201 of the camera system 209 can form a conoscope lens that can facilitate measuring (e.g., in Fourier space, angular space, spectral space, etc.) an angular distribution of particular wavelengths of light emitted, reflected, or scattered by or from a DUT. In some embodiments, the same or similar camera system 209 or lens arrangement 201 can be used to capture spatial and non-spatial images, such as by using different calibration routines to configure or reconfigure the camera system 209 to capture one type of image or the other.

In some embodiments, various components of the camera system 209 are interchangeable with other components. For example, if an camera system 209 includes a first camera 202, a first image sensor 203, a first macro lens 204, a first baffle 208, a first eyepiece mount 210, a first eyepiece 212, a first aperture 205, and/or a first compensation lens 211; any one or more of these components can be swapped out for a second camera 202, a second image sensor 203, a second macro lens 204, a second baffle 208, a second eyepiece mount 210, a second eyepiece 212, a second aperture 205, and/or a second compensation lens 211, respectively. Interchangeable components can have same, similar, and/or different characteristics. In other words, camera systems 209 configured in accordance with the present technology can be modular and can be readily adjusted such that they are suitable to capture various measurements, merely by swapping out components of the camera system 209 for other components of like kind but having different desired characteristics. Additional details regarding (a) the modularity of the camera system 209 and/or the lens arrangement 201 and (b) the advantages associated with such modularity are provided in International (PCT) Patent Application No. PCT/US2022/021145, which is incorporated herein by reference in its entirety.

In some embodiments, the camera system 209 can include one or more other components in addition to or in lieu of one or more components illustrated in FIGS. 2A and 2B. For example, the camera 202 can be coupled to a computer (not shown) that includes signal processing hardware and/or software to analyze data captured by the camera 202. Additionally, or alternatively, the camera 202 can be coupled to one or more displays configured to provide feedback to a system user. In these and other embodiments, the camera 202 can include onboard signal processing hardware and/or software, and/or can include an onboard display.

As another example, the camera system 209 can include a teleconverter (not shown). The teleconverter can be positioned between the image sensor 203 of the camera 202 and the macro lens 204. A teleconverter can increase the versatility of the camera system 209. For example, the teleconverter can be used to adjust a FOV and/or imaging quality of the camera system 209. Thus, the teleconverter can enable compatibility of a macro lens 204 with various different shapes and/or sizes of image sensors 203.

FIG. 3A is a side view of another camera system 309 configured in accordance with various embodiments of the present technology, and FIG. 3B is a schematic, partial cross-sectional side view of the camera system 309 taken along line 3B-3B in FIG. 3A. It is appreciated that the illustrated camera system 309 may be an example of the camera system 109 of FIG. 1, or of another camera system of the present technology. The camera system 309 is generally similar to the camera system 209. (Thus, similar reference numbers are used to indicate similar elements across FIGS. 2A-3B, but the individual elements may not be identical.) For example, as shown in FIG. 3A, the camera system 309 includes a lens arrangement 301 and a machine or camera 302. The camera 302 includes an image sensor 303. The lens arrangement 301 includes a macro lens 304 (only a housing or barrel of the macro lens 304 is illustrated in FIG. 3A), a baffle 308, an eyepiece 312, and (optionally) an aperture 305 (FIG. 3B). The eyepiece 312 is mounted in an eyepiece mount 310. Furthermore, as shown in FIG. 3B, the macro lens 304 includes a lens tube 306 and an internal lens 307. The lens tube 306 includes a first stationary component 306a and a second movable component 306b. In some embodiments, the lens arrangement 301 may also include an optional compensation lens 311 (e.g., similar to the optional compensation lens 211 described above with reference to FIGS. 2A and 2B). In these and other embodiments, the camera system 309 can positioned and/or held in place at a desired location and/or orientation using a mount (not shown).

Figure 4:
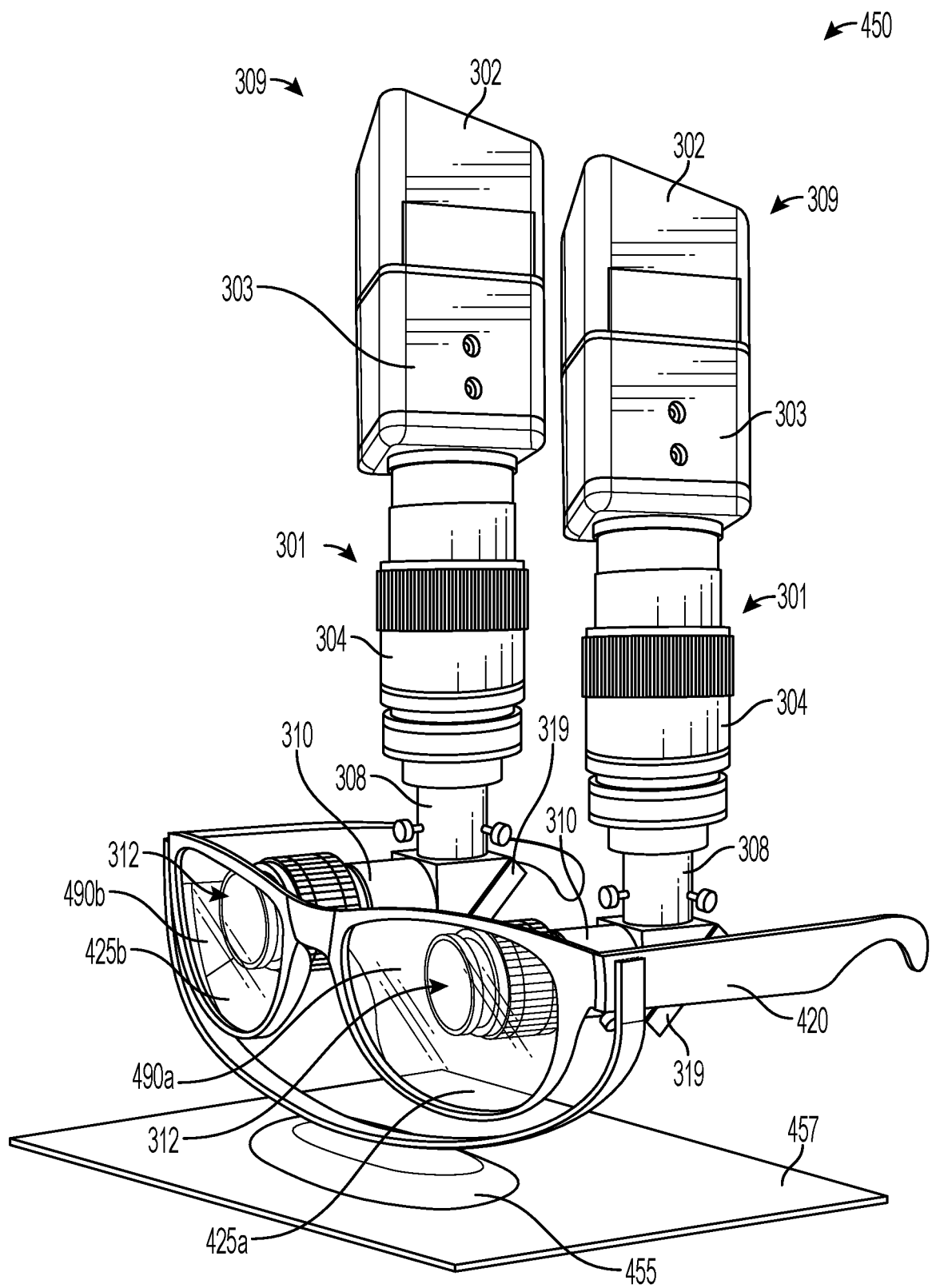
FIG. 4 is a side perspective view of an arrangement of imaging systems configured in accordance with various embodiments of the present technology.

The camera system 309 illustrated in FIGS. 3A and 3B differs from the camera system 209 illustrated in FIGS. 2A and 2B, however, in that the lens arrangement 301 (i)

additionally includes a mirror 319 and (ii) is folded (e.g., the barrel of the macro lens 304, the baffle 308, a housing or mount of the mirror 319, the eyepiece mount 310, and/or the component forming the aperture 305 is/are bent, curved, etc. and/or includes approximately a 90-degree turn). The folded configuration of the lens arrangement 301 facilitates positioning the camera system 309 in front of a DUT (e.g., for measuring the DUT) in the event there is a limited amount of space available in front of and/or surrounding the DUT within which to position the camera system 309. For example, as discussed in greater detail below with respect to FIG. 4, a long dimension of the camera system 309 (e.g., a dimension including the camera 302, the image sensor 303, the macro lens 304, the baffle 308, and/or the mirror 319) can be positioned generally parallel to an image plane of the camera system 309 and/or an object plane of a DUT. In other words, the long dimension of the camera system 309 can be positioned generally perpendicular to arrow B illustrated in FIGS. 3A and 3B. Additionally, or alternatively, a short dimension of the camera system 309 (e.g., a dimension including the mirror 319, the eyepiece mount 310, the eyepiece 312, and/or the aperture 305) can be positioned generally perpendicular to the image plane of the camera system 309 and/or the object plane of a DUT. In other words, the short dimension of the imaging system can be positioned generally parallel to the arrow B. The folded configuration of the camera system 309 can facilitate using two or more camera systems 309 to (e.g., simultaneously) measure one or more DUTs, as shown in FIG. 4.

Similar to the camera system 209 of FIGS. 2A and 2B, the camera system 309 includes an eyepiece 312 mounted at or near a distalmost end portion of the eyepiece mount 310 such that an entrance pupil of the lens arrangement 301 and/or of the camera system 309 is not buried. Another similarity between the camera system 209 and the camera system 309 is that the internal lens 307 of the macro lens 304 can be manually, electronically, and/or automatically focused (e.g., using the lens tube 306). In these and other embodiments, the internal lens 307 can be focused without rotating and/or changing the size/length of the barrel of the macro lens 304. For example, the length of the barrel of the macro lens 304 can be fixed. Alternatively, the length of the barrel of the macro lens 304 can be changeable yet remain fixed while the position of the internal lens 307 is changed (e.g., while the internal lens 307 is focused). This can enable the camera system 309 to focus the internal lens 307 on an intermediate image produced by the eyepiece 312 while an overall length of the camera system 309 remains unchanged. For the sake of clarity and understanding of this feature of the present technology, the lens arrangement 301 (comprising the barrel of the macro lens 304, the baffle 308, the mirror mount, and the eyepiece mount 310) are illustrated with a first fixed length L, and/or a second fixed length $L_2$ in FIG. 3B, even though (a) the camera system 309 can be modular (generally similar to the camera system 209) such that the components of the lens arrangement 301 can be interchanged with other components having different corresponding lengths, which may alter the length $L_1$ and/or the length $L_2$ of the lens arrangement 301; (b) the aperture 305 can be omitted, which may change (shorten) the length $L_2$; and/or (c) the camera system 309 can include (or be attached to) a compensation lens 311 that may change (e.g., increase) the length $L_1$ or the length $L_2$ depending on the location of the compensation lens 311 (e.g., depending on whether the compensation lens 311 is positioned in front of the eyepiece 312 and the aperture 305 (as shown in FIG. 3B), is positioned in front of the eyepiece and/or between the eyepiece 312 and the aperture 305, is positioned at a location between the eyepiece 312 and the mirror 319, is positioned at a location between the mirror 319 and the macro lens 304, such as within the baffle 308, or is positioned between the macro lens 304 and the image sensor 303).

In operation, the camera system 309 can capture one or more measurements of a DUT. For example, light emitted from and/or reflected off a DUT positioned in front of the camera system 309 (e.g., in front of the eyepiece 312) can enter into the camera system 309 via the compensation lens 311, the aperture 305, and/or the eyepiece 312, and generally along the arrow B illustrated in FIGS. 3A and 3B. When included, the compensation lens 311 (when rotated to/positioned in an orientation that corresponds to the orientation of cylindrical components of a prescription lens associated with the DUT, if any) can compensate for (e.g., counteract, cancel, mitigate, reduce, negate, alter, adjust) optical power provided by the cylindrical component of the prescription lens. The eyepiece 312 can collect and focus this light to form an intermediate image (e.g., a real or virtual image) at a location within the focal range of the macro lens 304. In some embodiments, the eyepiece 312 can collect and focus the light to form an intermediate image at a location within airspace 315 (FIG. 3B), the airspace 315 being bounded by a portion of the eyepiece mount 310, a portion of the baffle 308, a portion of the mirror 319, a portion of the mirror mount, and/or a portion of the barrel of the macro lens 304. For example, the eyepiece 312 can focus the light to form an intermediate image on the mirror 319. As another example, the eyepiece 312 can focus the light at a first location within the airspace 315 between the eyepiece 312 and the mirror 319. As still another example, the eyepiece 312 can focus the light (e.g., using the mirror 319) at a second location within the airspace 315 between the mirror 319 and the macro lens 304. In other embodiments, the eyepiece 312 can collect and focus the light to form an intermediate image at a location beyond the distal end of the camera system 309. The baffle 308 can shield this airspace 315 from stray (e.g., ambient) light that does not enter the camera system 309 via the eyepiece 312.

The lens tube 306 can adjust the position the internal lens 307 of the macro lens 304 until the internal lens 307 is focused at an image plane corresponding to the location of the intermediate image within the airspace 315. For example, the lens tube 306 can adjust the position of the internal lens 307 until the internal lens 307 is focused at the image plane on the mirror 319. As another example, the lens tube 306 can focus the internal lens 307 (e.g., using the mirror 319) at the image plane at the first location within the airspace 315 between the eyepiece 312 and the mirror 319. As still another example, the lens tube 306 can focus the internal lens 307 at the second location within the airspace 315 between the mirror 319 and the macro lens 304. Once focused at the image plane corresponding to the location of the intermediate image within the airspace 315, the internal lens 307 can be considered focused on the intermediate image formed by the eyepiece 312 and/or the mirror 319.

The internal lens 307 can collect and focus the light of the intermediate image onto the image sensor 303 of the camera 302. In turn, the image sensor 303 can convert the light incident on the image sensor 303 to electrical signals that can be processed by a computing device, such as the camera 302 and/or another computing device (not shown) operably connected to the camera 202. In the context of product inspection, measurements captured by the camera system 309 of a DUT can be used to verify one or more characteristics (e.g., color, brightness, focus quality, etc.) of the DUT are correct or are within acceptable parameters/tolerances, to perform various calibrations to bring the characteristics of a DUT into alignment with specified and/or acceptable parameters, to inform rework of the DUT or other stages of manufacturing and/or assembly, and/or to reject a DUT altogether such that the DUT is not provided to an end user.

FIG. 4 is a side perspective view of an example system or arrangement 450 configured in accordance with various embodiments of the present technology. It is appreciated that the illustrated arrangement 450 can be an example of the environment 150 of FIG. 1, or of another environment/arrangement of the present technology. As shown, the arrangement 450 includes two of the camera systems 309 of FIGS. 3A and 3B that lack the aperture 305. The arrangement 450 further includes a near-to-eye device 420 having a DUT 490a and a DUT 490b. In the illustrated embodiment, the near-to-eye device 420 is AR glasses having prescription lenses 425a and 425b. The DUTs 490a and 490b can be displays configured to enhance the real-world environment of a human user by presenting computer-generated perceptual information to a corresponding eye of the user through a corresponding one of the prescriptions lenses 425a and 425b. The near-to-eye device 420 is supported by a mount 455 that is positioned on a table 457.

Each camera system 309 in FIG. 4 is positioned (e.g., using one or more mounts) in front of and aligned with the DUT 490a or the DUT 490b of the near-to-eye device 420. In particular, an exit pupil of an eyepiece 312 of each camera system 309 can be positioned at a location corresponding to where a human eye pupil would be positioned should the near-to-eye device 420 be used by a human as intended. Additionally, or alternatively, the eyepieces 312 of the camera systems 309 are positioned at locations in front of respective DUTs 490a and 490b such that the camera systems 309 can view the same or similar information as the DUTs 490a and 490b would present to a user's eyes when the user wears or employs the near-to-eye device 420 as intended. As discussed in greater detail above, the positions of the eyepieces 312 can remain unchanged in some embodiments while the macro lenses 304 are focused onto respective virtual images of the DUTs 490a and/or 490b formed by the eyepieces 312.

As shown, the camera systems 309 and/or the lens arrangements 301 have a folded configuration. The folded configurations of the camera systems 309 and/or the lens arrangements 301 can facilitate positioning the camera systems 309 side-by-side with the long dimensions of the camera systems 309 (e.g., dimensions comprising the cameras 302, the image sensors 303, the macro lenses 304, the baffles 308, the mirrors 319, and/or the mirror mounts of the camera systems 309) positioned generally parallel to image planes of the camera systems 309 and/or object planes of the DUTs 490a and 490b. The short dimensions (e.g., only the short dimensions) of the camera systems 309 (e.g., dimensions comprising the mirrors 319, the mirror mounts, the eyepiece mounts 310, and the eyepieces 312 of the camera systems 309) are positioned generally perpendicular to the image planes of the camera systems 309 and/or the object planes of the DUTs 490a and 490b. In other words, the bulk of the camera systems 309 can be positioned at locations other than in front of the DUTs 490a and 490b. This can facilitate positioning the camera systems 309 in areas in front of the DUTs 490a and 490b (e.g., to measure the DUTs 490a and 490b) even when there are space constraints in these areas, for example, due to other components of the near-to-eye device 420, other components (not shown) of the camera systems 309, and/or other components (not shown) of the arrangement 450.

Use of two camera systems 309 in the arrangement 450 can facilitate stereoscopic and/or simultaneous imaging/measurement of the DUTs 490a and 490b. This can decrease the amount of time required to measure the DUTs 490a and/or 490b, especially in comparison to other arrangements that include a single (e.g., only one) imaging system. Furthermore, the amount of time required to measure the DUTs 490a and/or 490b can also be reduced in embodiments in which the camera systems 309 can capture all information of interest presented by the DUTs 490a and/or 490b in a single image or shot and/or without needing to reposition the camera systems 309 to measure other portions of the DUTs 490a and/or 490b. As such, the present technology can increase throughput of inspected DUTs (e.g., in comparison to conventional imaging systems) in a variety of ways. Although illustrated with two camera systems 309 in FIG. 4, the arrangement 450 can include a greater (e.g., more than two) or lesser (e.g., one) camera system 309 and/or camera system 209 in other embodiments of the present technology.

Additional details regarding the camera system 209 (FIGS. 2A and 2B) and the camera system 309 (FIGS. 3A-4), and associated, systems, devices and methods, are provided in PCT Patent Application Number PCT/US2022/021145, which has been incorporated herein by reference above.

Although not shown so as to avoid unnecessarily obscuring the description of the embodiments of the technology, any of the forgoing systems and methods described above can include and/or be performed by a computing device configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output device, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include (e.g., non-transitory) computer readable media (e.g., the storage device, disk drives, and/or other storage media) including computer-executable instructions stored thereon that, when executed by the processor and/or computing device, cause the systems to perform one or more of the methods described herein. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

2. Associated Methods

Methods for compensating measurements of a DUT through a prescription lens will now be discussed.

Figure 5:
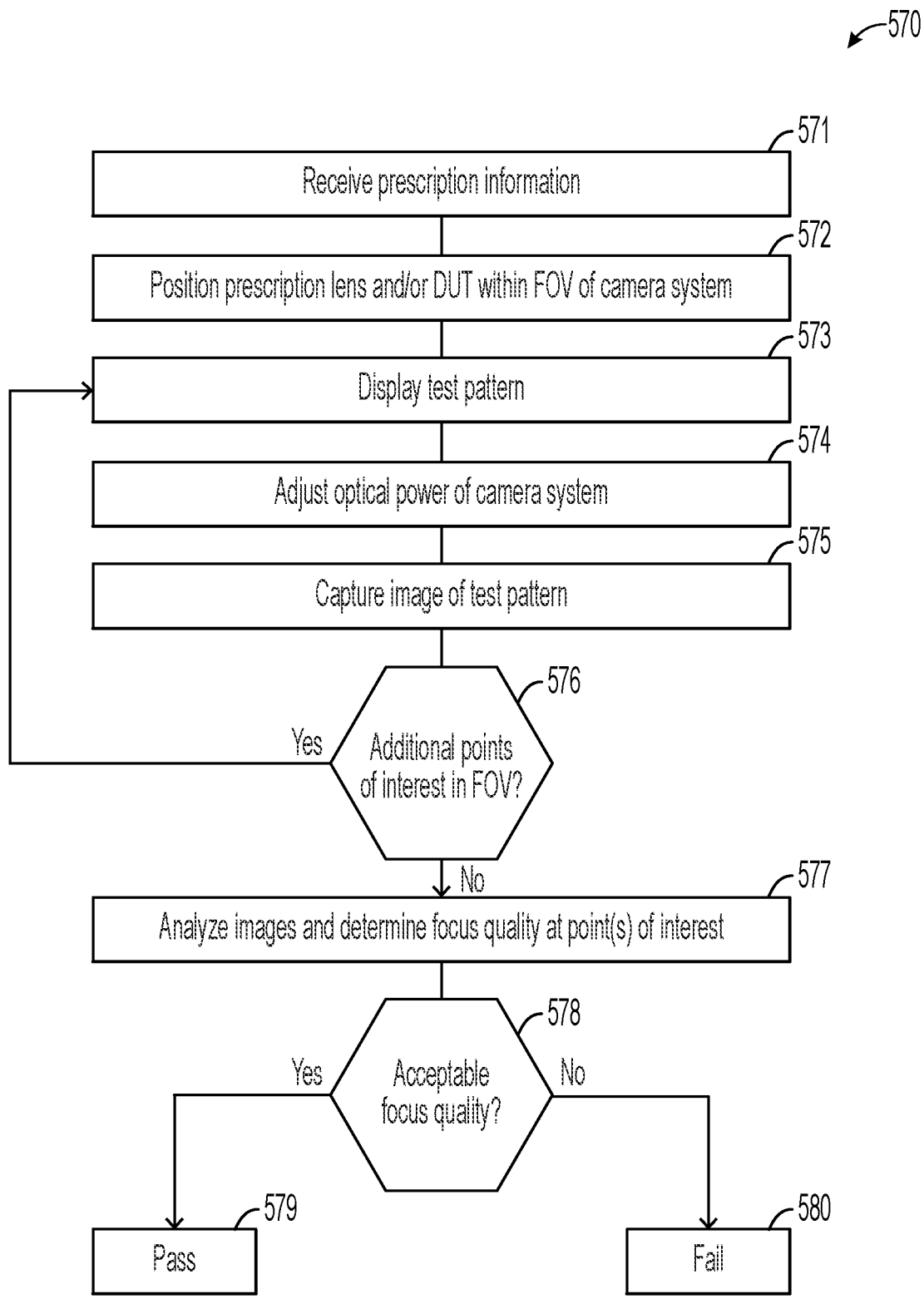
FIG. 5 is a flow diagram illustrating a method of characterizing focus quality of a device under test through a lens in accordance with various embodiments of the present technology.

FIG. 5 is a flow diagram illustrating a method 570 of characterizing focus quality of a DUT through a lens in accordance with various embodiments of the present technology. In some embodiments, the method 570 can be employed to measure a DUT (e.g., a display) through a prescription lens when prescription information of the lens is known. All or a subset of one or more of the steps of the method 570 can be executed by various components or devices of an imaging system (e.g., the imaging system 100 of FIG. 1), such as the camera systems 109, 209, and/or 309 of FIGS. 1-4, and/or the test executive 130 of FIG. 1. Additionally, or alternatively, all or a subset of one or more of the steps of the method 570 can be executed by a user (e.g., an operator, a technician, an engineer, etc.) of the imaging system. In these and other embodiments, all or a subset of one or more of the steps of the method 570 can be automated and/or executed by a robotic system associated with the imaging system. In these and still other embodiments, all or a portion of one or more steps of the method 570 can be executed by a DUT, such as the DUT 190 and/or 490 of FIGS. 1 and 4. Furthermore, all or a subset of any one or more of the steps of the method 570 can be executed in accordance with the discussion above and/or with the discussion below.

The method 570 begins at block 571 by receiving prescription information. The prescription information can specify prescription information of a lens that is integrated with a DUT (e.g., a display) in a near-to-eye device, such as in AR glasses. For example, the prescription information can specify an optical power (e.g., in diopters) of spherical components of the lens that are used to correct or compensate for nearsightedness or farsightedness. Additionally, or alternatively, the prescription information can specify optical power (e.g., in diopters and/or in astigmatism angle) of cylindrical components of the lens that are used to correct or compensate for astigmatism.

At block 572, the method 570 continues by positioning the lens and/or the DUT within a field of view (FOV) of a camera system configured in accordance with various embodiments of the present technology. In some embodiments, the lens and/or the DUT can be positioned and held at a location/orientation such that an entrance pupil of the camera system relative to the DUT is located at a position corresponding to where a user's pupil would be positioned when the user wears the near-to-eye device. In these and other embodiments, the lens and/or the DUT can be positioned and held at a location/orientation such that light emitted by the display passes through the prescription lens, enters the lens arrangement of the camera system, and strikes an image sensor of the camera system.

At block 573, the method 570 continues by displaying a test pattern. Displaying the test pattern can include emitting light from the DUT and/or presenting a known pattern of information to the camera system through the lens of the near-to-eye device. In scenarios in which the lens of the near-to-eye device lacks a cylindrical component to correct or compensate for astigmatism, the test pattern can be a test pattern that is commonly used to characterize focus quality. For example, when the lens lacks a cylindrical component, the test pattern can include at least one 4-degree slanted edge such that the test pattern is compliant with ISO Standard 12233. Additionally, or alternatively, a non-standard test pattern can be used, such as line pairs spaced apart from one another at a specific or desired spatial frequency, as discussed in greater detail below.

In scenarios in which the lens of the near-to-eye device includes one or more cylindrical components to correct or compensate for astigmatism, the test pattern displayed at block 573 can include line pairs spaced apart from one another at a specific or desired spatial frequency. In some embodiments, the spatial frequency is user- or system-defined. Furthermore, target edges defined at least in part by lines of the line pairs in the test pattern can be oriented to match the astigmatism angle of the lens of the near-to-eye device.

Figure 6:
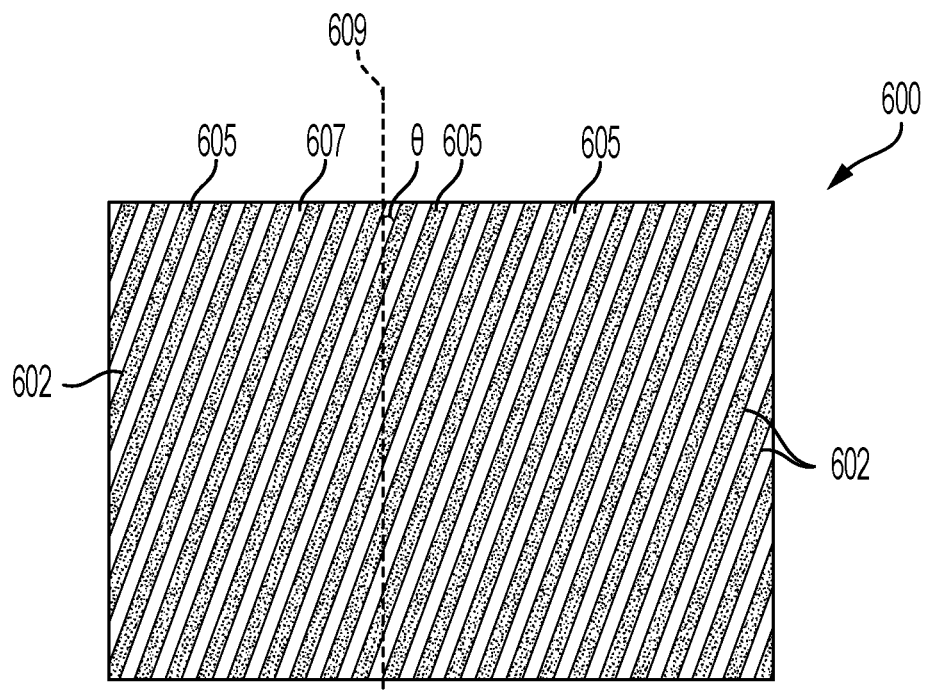
FIG. 6 is an example test pattern that can be displayed by a device under test in accordance with various embodiments of the present technology.

FIG. 6 illustrates an example of such a test pattern 600 that can be displayed at block 573 when the les of the near-to-eye device includes one or more cylindrical components. As shown, the test pattern 600 includes a plurality of lines 605. The individual lines 605 are separated from one another by white gaps 607 corresponding to a specified spatial frequency of the lines 605. Each of the lines 605 is slanted with respect to a vertical dashed line 609 shown in FIG. 6. (The vertical dashed line 609 is not part of the test pattern 600 and is displayed in FIG. 6 merely for the sake of clarity and explanation.) The test pattern 600 defines edges 602 at locations where the lines 605 interface with corresponding white gaps 607. These edges 602 are referred to herein as 'target edges.' Due in part to the orientation of the lines 605 in the test pattern 600, the target edges 602 are slanted at an angle theta (θ) with respect to the vertical dashed line 609. The angle theta is referred to herein as the 'target edge angle.'

When the target edge angle does not match the astigmatism angle of a prescription lens, a camera system imaging the test pattern 600 through the prescription lens will observe poor contrast values at the target edges 602 of the test pattern 600. Thus, a mismatch between the astigmatism angle of the prescription lens and the target edge angle of the target edges 602 can skew contrast measurements captured by an imaging system, which can cause the imaging system to incorrectly or inaccurately conclude that the focus quality of the DUT is poor. On the other hand, when the target edge angle of the target edges 602 matches or is aligned with the astigmatism angle of a prescription lens, degradation of the modulation of the test pattern 600 caused by astigmatism components of the prescription lens are reduced and/or minimized. In turn, a camera system imaging the test pattern 600 through the prescription lens will observe contrast values at the target edges 602 that are largely unaffected by the astigmatism components of the prescription lens. In other words, matching the target edge angle of the target edges 602 in the test pattern 600 to the astigmatism angle of the prescription lens can permit an imaging system to accurately characterize focus quality of a DUT through the prescription lens. Therefore, when displaying the test pattern 600 (e.g., at block 573 of the method 570 in FIG. 5), a target edge angle for the test pattern 600 can be set to match the astigmatism angle of the lens of the near-to-eye device. (When the lens of the near-to-eye device does not include cylindrical components, any target edge angle (e.g., a default target edge angle) can be used.)

In some embodiments, an imaging system of the present technology can include a test executive that can be used at block 573 of the method 570 to control the DUT and cause the DUT to display a desired test pattern. In these and other embodiments, a test executive of the present technology can communicate with a pattern generator (e.g., a digital video pattern generator, and/or a pattern generator in communication with the DUT) to cause or prompt the DUT to display a test pattern having desired characteristics. In turn, the DUT can present the desired test pattern in response to instructions received from the test executive or from the pattern generator.

Figure 7:
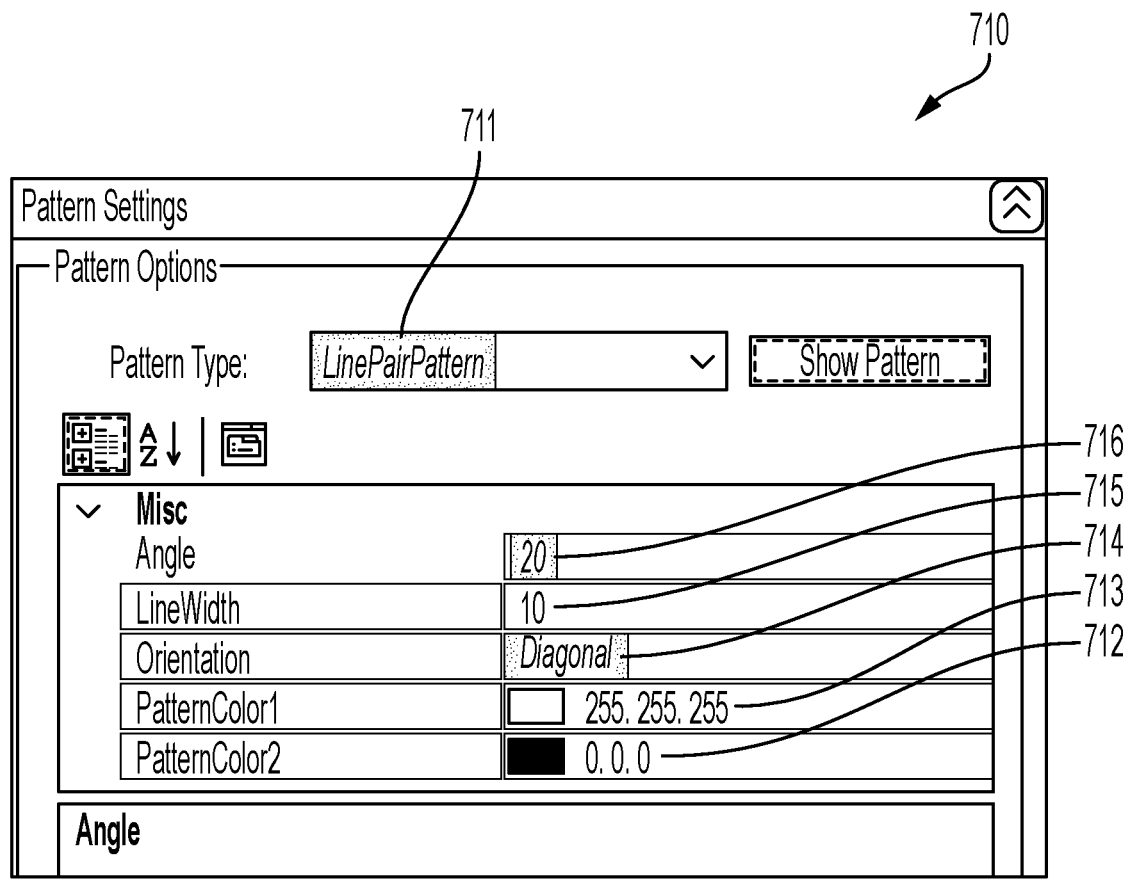
FIG. 7 is an example user interface that can be used to set one or more parameters of a test pattern in accordance with various embodiments of the present technology.

FIG. 7 illustrates an example user interface 710 that can be used to set one or more parameters of a test pattern displayed by a DUT. The user interface 710 can be a user interface of a test executive of an imaging system of the present technology, or a user interface of a pattern generator (e.g., in communication with the DUT). As shown, the user interface 710 includes several fields 711-716. All or a subset of the fields 711-716 can be automatically populated (e.g., in response to receiving prescription information at block 571). Additionally, or alternatively, all or a subset of the fields 711-716 can be set by a user (e.g., of a computer running the test executive).

A pattern type field 711 of the user interface 710 can be used to select the overall pattern type that is displayed by a DUT. For example, the pattern type field 711 can be used to instruct a DUT to display line pairs (similar to the line pairs illustrated in FIG. 6) or to display another test pattern, such as a test pattern that includes a 4-degree slanted edge (e.g., consistent with ISO Standard 12233). Pattern color fields 712 and 713 of the user interface 710 can be used to set the colors at which components of the test pattern are display by the DUT. For example, the pattern color fields 712 and 713 in FIG. 7 specify that a DUT should display a test pattern that includes black line pairs (field 712) that are separated by white gaps (field 713).

An orientation field 714 of the user interface 710 can be used to set a general orientation of the test pattern. Here, the orientation field 714 is set to 'diagonal' such that line pairs in the test pattern are displayed in a generally diagonal orientation with respect to one another. A line width field 715 of the user interface 710 can be used to set the thickness of each of the black lines included in the test pattern.

Furthermore, an angle field 716 of the user interface 710 can be used to set an angle at which target edges defined by the black line pairs are displayed with respect to a reference line. For example, the value (e.g., 20 degrees) entered in the angle field 716 of FIG. 7 can correspond to the angle theta (θ) in FIG. 6 with respect to the vertical dashed line 609 of FIG. 6. As discussed above, the value entered or populated into the angle field 716 of the user interface 710 can be set to match the astigmatism angle of a prescription lens through which a DUT displays a test pattern to the camera system or measurement device.

Referring again to FIG. 5, the method 570 continues at block 574 by adjusting an optical power of the camera system. In some embodiments, the optical power of the camera system can be adjusted to correspond to the optical power of spherical components of the lens of the near-to-eye device. For example, assuming that the imaging system is employed to characterize focus quality of the DUT at 2 meters and that the lens of the near-to-eye device is a convex lens having an optical power of +2 diopters, the camera system can be adjusted at block 574 to provide +2.5 diopters (equivalent to $$\frac{1}{\text{focal length}} +$$

optical power provided by prescription lens, or $$\frac{1}{2 \text{ meters}}$$

diopters+2 diopters) of optical power to compensate for the effects of the convex prescription lens on the test pattern as it is emitted by the DUT through the lens. As another example, assuming that the imaging system is employed to measure focus quality of the DUT at 2 meters and the lens in a concave lens having an optical power of −4 diopters, the camera system can be adjusted at block 574 to provide −3.5 diopters (equivalent to +0.5 diopters −4 diopters) of optical power to compensate for the effects of the concave prescription lens.

In some embodiments, the optical power of the camera system can additionally or alternatively be adjusted at block 574 to correspond to a point of interest in a FOV of the camera system at which sharpness of focus of the DUT should be characterized. For example, in many scenarios, the object plane imaged by the camera system is curved. As a result, a point in the object plane corresponding to a center of the FOV of the camera system can be positioned closer or farther away from the image sensor of the camera system than a point in the object plane corresponding to an edge of the FOV of the camera system. As such, different optical powers can be required to maximize focus at different points of interest within the FOV of the camera system. Thus, each time the method 570 executes the block 574, the optical power of the camera system can be adjusted to maximize focus at a specific point of interest. The points of interest can be user- or system-defined, and/or can represent locations within the field of view at which contrast of the test pattern (used as an indication of sharpness of focus of the DUT) should be measured for analysis at block 577. For the sake of example, it can be assumed that the first time the block 574 of the method 570 is executed, the optical power of the camera system is adjusted to maximize focus with respect to a center location (e.g., either a center tangential point of interest or a center sagittal point of interest) within the FOV of the camera system.

In some embodiments, adjusting the optical power of the camera system at block 574 includes electronically adjusting a lens of the camera system. For example, a position of a lens (e.g., the internal lens 207 of FIG. 2B or the internal lens 307 of FIG. 3B) of the camera system can be adjusted using an electronic motor to adjust the optical power of the camera system. In some embodiments, the camera system can be configured to automatically adjust the optical power of the camera system (e.g., in response to instructions received from the test executive of the system). In some embodiments, optical power of the camera system can be adjusted as a function of motor counts of the electronic motor. For example, optical power of the camera system as a function of motor counts can be recorded to a look up table. Continuing with this example, to adjust the optical power of the camera system by a desired amount, the test executive controlling the camera system (or the camera system itself) can refer to the look up table to determine a number and/or direction of motor counts required to adjust the optical power by the desired amount or to a desired value. In turn, the test executive can instruct the camera system to adjust the optical power of the camera system by instructing the camera system to step through the number and/or direction of motor counts of the electronic motor, and thereby adjust the positioning of the lens of the camera system. Additionally, or alternatively, the lens can be manually adjusted and/or the electronic motor can be manually controlled (e.g., by a user) to adjust the optical power of the camera system.

At block 575, the method 570 continues by capturing an image of the test pattern displayed by the DUT. Capturing the image can include capturing an image of the test pattern using the image sensor of the camera system. The timing of image capture can be manually controlled. Additionally, or alternatively, the timing of image capture can be controlled via a computer coupled to the camera system and/or automatically via the test executive.

At block 576, the method 570 continues by determining whether there are additional points of interest within the FOV at which contrast of the test pattern (as an indication of sharpness of focus of the DUT) should be measured for analysis at block 577. If the method 570 determines that there are additional points of interest within the FOV at which contrast of the test pattern should be measured (block 576: Yes), the method 570 can return to block 574 to adjust the optical power of the camera system such that the optical power of the camera system (a) accounts for the effects of the spherical components of the lens of the near-to-eye device on the test pattern and (b) maximizes focus of the test pattern at a next point of interest within the FOV of the camera system. In the discussion of block 574 above, it was assumed for the sake of example that during a first iteration of blocks 574-576 of the method 570 the optical power of the camera system was adjusted at block 574 to maximize focus of the test pattern at a center location (e.g., either a center tangential point of interest or a center sagittal point of interest) within the FOV of the camera system. Continuing with this example, when the method 570 returns to block 574 from block 576 in a subsequent iteration of blocks 574-576, the optical power of the camera system can be adjusted at block 574 to maximize focus of the test pattern at (i) a non-center location (e.g., an azimuth zero degrees tangential point of interest, an azimuth zero degrees sagittal point of interest, an azimuth 180 degrees tangential point of interest, or an azimuth 180 degrees sagittal point of interest) within the FOV of the camera system or (ii) another center location (e.g., the other one of either the center tangential point of interest or the center sagittal point of interest that was not previously selected at block 574) within the FOV of the camera system. After adjusting the optical power of the camera system to maximize focus of the test pattern at the next point of interest, the method 570 can proceed to block 575 to capture another image of the test pattern and then return to block 576.

Referring again to block 576, if the method 570 determines that there are no additional points of interest within the FOV at which contrast of the test pattern (as an indication of sharpness of focus of the display) should be measured (block 576: No), the method 570 can proceed to block 577 to analyze the image(s) captured at block 575 and determine the sharpness of focus of the DUT at each of the points of interest. Analysis of the sharpness of focus of the DUT at each of the points of interest can include measuring, in an image of the test pattern that was captured at block 575 while optical power of the camera system was set at a value intended to maximize focus of the test pattern at that point of interest, contrast of a corresponding target edge in the test pattern located at that point of interest. Measuring contrast of a target edge in the test pattern can include measuring a sharpness or slope of transition in the image across the target edge (e.g., measuring the suddenness of a transition from a white gap 607 in the test pattern 600 of FIG. 6 onto a black line 605 across the corresponding target edge 602). The measured contrast value is referred to herein as a modulation transfer function (MTF) value. Such an analysis can be performed for each point of interest using the corresponding image captured at block 575.

As discussed in greater detail below, an overall MTF of the DUT at a point of interest can be identified by measuring contrast of a corresponding slant edge in the test pattern at that point of interest over several images of the test pattern that are captured while the camera system is set at various different optical powers. In other embodiments of the present technology, discrete Fourier transform (DFT) methods or any other techniques known in the art can be used to compute an overall MTF (or individual MTF values) for a DUT, such as along a spatial edge of known expected contrast (e.g., 100% to 0%, or some other known transition/step) at a point of interest. Regardless of the method used to compute an MTF of the DUT at a point of interest, the resulting MTF at the point of interest can represent sharpness of focus of the DUT at that point of interest as a function of optical power of the camera system.

At block 578, the method 570 continues by determining whether the sharpness of focus at each point of interest is within acceptable parameters and/or tolerances. The acceptable parameters and/or tolerances can be user- or system-defined. In some embodiments, determining whether the sharpness of focus for a point of interest is within acceptable parameters/tolerances can include comparing the corresponding MTF value determined at block 577 to a corresponding focus quality threshold. For example, in a first iteration through blocks 574-576 above, the method 570 can (i) adjust the optical power of the camera system (block 574) to maximize focus of the test pattern at a center location within the FOV while also compensating for the effects of the prescription lens of the near-to-eye device on the test pattern, and (ii) capture a first image of the test pattern (block 575). Then, at block 577, the method 570 can analyze the first image and determine a first MTF value corresponding to the center location point of interest. The first MTF value can be compared to a corresponding (e.g., user- or system-defined) first focus quality threshold. The first focus quality threshold can be set at an MTF value at or above which focus quality of the DUT at the center location point of interest is acceptable.

This process can be repeated for each of the other points of interest. In particular, continuing with the above example for the sake of clarity, in a second iteration through blocks 574-576 above, the method 570 can (i) adjust the optical power of the camera system (block 574) to maximize focus of the test pattern at a non-center location within the FOV while also compensating for the effects of the prescription lens of the near-to-eye device on the test pattern, and (ii) capture a second image of the test pattern (block 575). Then, at block 577, the method 570 can analyze the second image and determine a second MTF value corresponding to the non-center location point of interest. The second MTF value can be compared to a corresponding (e.g., user- or system-defined) second focus quality threshold. The second focus quality threshold can be the same threshold as or a different threshold from the first focus quality threshold. Additionally, or alternatively, the second focus quality threshold can be set at an MTF value at or above which focus quality of the DUT at the non-center location point of interest is acceptable.

When a threshold number (e.g., all or a subset) of the MTF values from block 577 meet or exceed their corresponding focus quality thresholds, the method 570 can determine that the focus quality of the DUT is within acceptable parameters/tolerances (block 578: Yes). The threshold number of the MTF values can be user- or system-defined. In the event that the method 570 determines that the focus quality of the DUT is within acceptable parameters/tolerances (block 578: Yes), the method 570 can proceed to block 579 at which the DUT can be determined to have passed (e.g., passed inspection and/or passed a sharpness-of-focus quality control check). Assuming that other characterized aspects of the DUT and/or the near-to-eye device also fall within acceptable parameters/tolerances, the near-to-eye device can thereafter be delivered to an end-user.

On the other hand, in the event a certain number (e.g., all or specific number, such as one or more) or specific ones of the MTF values from block 577 do not meet or exceed their corresponding focus quality thresholds (block 578: No), the method 570 can proceed to block 580 at which the DUT can be determined to have failed (e.g., failed inspection and/or failed a sharpness-of-focus quality control check). In some embodiments, the near-to-eye device can be discarded at this point instead of being delivered to an end-user. Additionally, or alternatively, the results of the analysis performed at blocks 577 and/or 578 of the method 570 can be used to inform various stages of manufacturing and/or assembly of DUTs and/or corresponding near-to-eye devices. For example, the results of the analysis performed at blocks 577 and/or 578 can be used to calibrate the DUT to bring the sharpness of focus of the DUT within acceptable parameters/tolerance. As another example, the results of the analysis performed at blocks 577 and/or 578 can be used to inform rework of that near-to-eye device or that DUT, or can be used to inform rework of other near-to-eye devices or other DUTs. Furthermore, although unlikely, it is possible for the method 570 to receive incorrect prescription information at block 571 for the lens of the near-to-eye device. When this occurs, there is a high probability that the method 570 will determine that the sharpness of focus of the DUT is not acceptable (block 578: No). Thus, to rule out the possibility that wrong prescription information was provided for the lens of the near-to-eye device at block 571 of the method 570 and/or to determine the actual prescription information of the lens, the method 570 can proceed from block 580 to block 801 of the method 800 of FIG. 8 or to block 921 of the method 920 of FIG. 9.

Although the steps of the method 570 are discussed and illustrated in a particular order, the method 570 of FIG. 5 is not so limited. In other embodiments, all or a subset of one or more of the steps of the method 570 can be performed in a different order. In these and other embodiments, all or a subset of any of the steps of the method 570 can be performed before, during, and/or after all or a subset of any of the other steps of the method 570. Furthermore, a person skilled in the art will readily recognize that the method 570 can be altered and still remain within these and other embodiments of the present technology. For example, all or a subset of one or more steps of the method 570 can be omitted and/or repeated in some embodiments.

Figure 8:
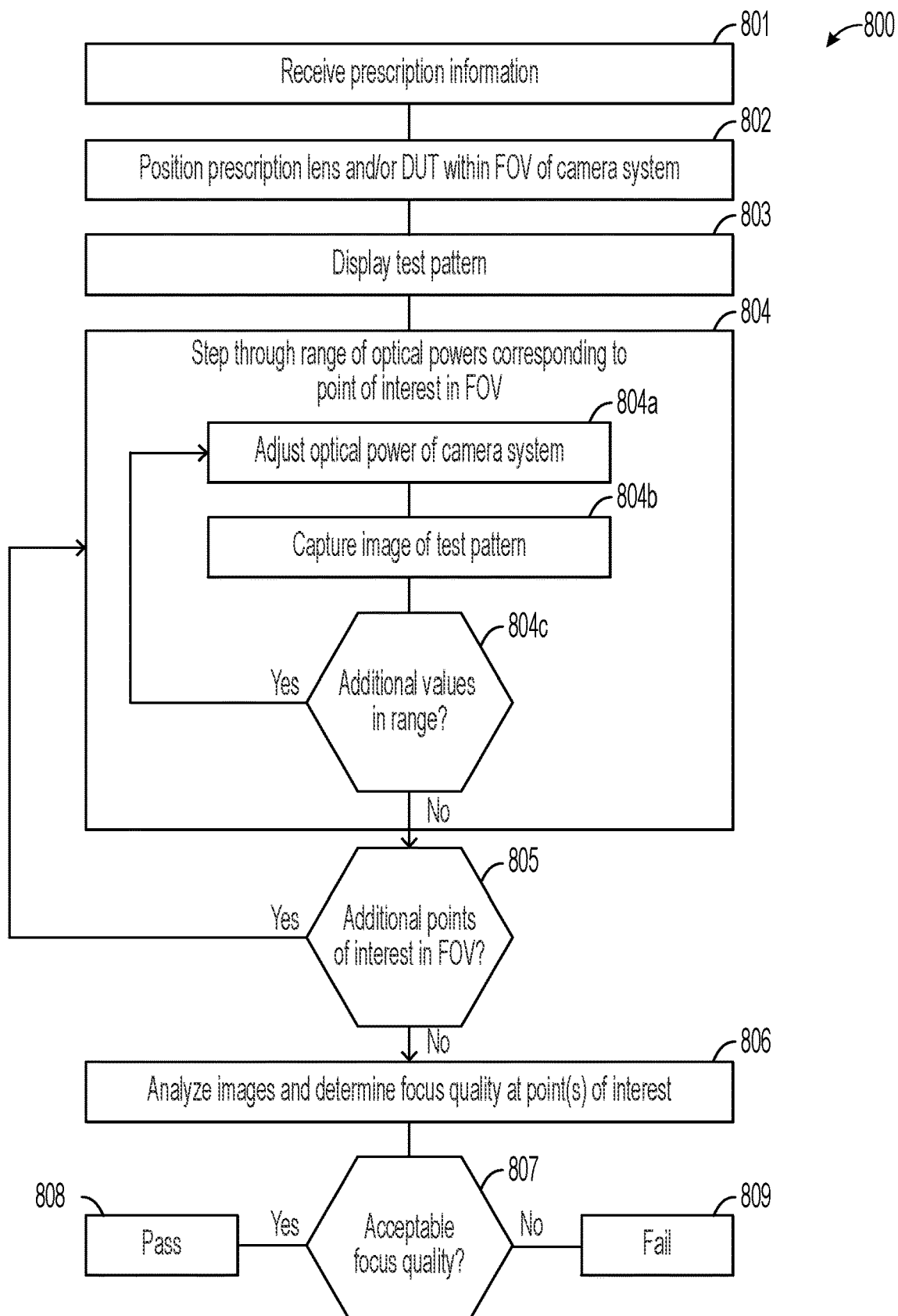
FIG. 8 is a flow diagram illustrating another method of characterizing focus quality of a device under test through a lens in accordance with various embodiments of the present technology.

FIG. 8 is a flow diagram illustrating another method 800 of characterizing focus quality of a DUT through a lens in accordance with various embodiments of the present technology. In some embodiments, the method 800 can be employed to measure a DUT (e.g., a display) through a prescription lens when (i) the prescription of the lens is known but (ii) setting the optical power of the camera system at a value that maximizes focus of a test pattern at various points of interest within a FOV of the camera system is difficult or imprecise. All or a subset of one or more of the steps of the method 800 can be executed by various components or devices of an imaging system (e.g., the imaging system 100 of FIG. 1), such as the camera systems 109, 209, and/or 309 of FIGS. 1-4; and/or the test executive 130 of FIG. 1. Additionally, or alternatively, all or a subset of one or more of the steps of the method 800 can be executed by a user (e.g., an operator, a technician, an engineer, etc.) of the imaging system. In these and other embodiments, all or a subset of one or more of the steps of the method 800 can be automated and/or executed by a robotic system associated with the imaging system. In these and still other embodiments, all or a portion of one or more steps of the method 800 can be executed by a DUT, such as the DUT 190 and/or 490 of FIGS. 1 and 4. Furthermore, all or a subset of any one or more of the steps of the method 800 can be executed in accordance with the discussion above and/or with the discussion below.

As shown, several of the steps of the method 800 are similar to select steps of the method 570 of FIG. 5. For example, the method 800 begins at block 801 by receiving prescription information of a lens of a near-to-eye device. Thereafter, the method 800 continues at block 802 by positioning the lens and/or a DUT (e.g., a display) within a FOV of a camera system configured in accordance with various embodiments of the present technology, and at block 803 by displaying a test pattern using the DUT. Blocks 801-803 can be generally similar to blocks 571-573 of the method 570 of FIG. 5. For example, block 802 can include displaying a test pattern having target edges oriented at an angle theta that matches the astigmatism angle of the prescription lens. Given the general similarly between blocks 801-803 and blocks 571-573, a detailed discussion of blocks 801-803 is omitted here for the sake of brevity.

At block 804, the method 800 continues by stepping through a range of optical powers corresponding to (a) the prescription information of spherical components received for the lens of the near-to-eye device and (b) a point of interest within the FOV of the camera system. The range of optical powers can be user- or system-defined, and/or step sizes between adjacent optical powers in the range can be user- or system-defined. The range can include positive optical powers, negative optical powers, and/or a zero optical power value (e.g., corresponding to focus at infinity). In some embodiments, the range of optical powers can be defined such that the range includes or steps over (i) an optimal optical power value of the camera system that is expected to maximize focus of the test pattern at the point of interest and (ii) one or more other optical power values that surround the optimal optical power value (e.g., to account for errors in the lens and/or imprecision introduced by tolerances of the camera system). In other words, the range of optical powers utilized at block 804 can be defined for each iteration of block 804 such that it is highly likely that, while the camera system steps through optical powers included in the range, the camera system captures an image of the test pattern at or proximate an optical power that maximizes focus of the test pattern at the given point of interest within the FOV of the camera system.

In some embodiments, the range of optical powers utilized for a given point of interest at block 804 can be defined such that the range also includes one or more optical powers at which focus of the test pattern is maximized at one or more other points of interest within the FOV of the camera system. Including these other optical powers in the range can obviate execution of block 805 of the method 800 discussed below, and/or can reduce or minimize the number of times that block 804 of the method 800 is executed before reaching block 806.

As shown in FIG. 8, block 804 of the method 800 includes several sub-steps 804a-804c. In a first iteration through the blocks 804a-804c, the method 800 adjusts or sets the optical power of the camera system to an initial or first value in the range of optical powers. The method 800 then proceeds to block 804b to capture an image of the test pattern while the camera system is providing the initial optical power. At block 804c, the method 800 determines whether there are additional optical power values to step through in the range. If the method 800 determines there are additional optical power values to step through in the range (block 804c: Yes), the method 800 returns to block 804a to adjust the optical power to a next optical power in the range. In some embodiments, step sizes between adjacent optical powers in the range can be user- or system-defined, can correspond to motor counts of an electronic motor of the camera system configured to adjust the positioning of a lens of the camera system, and/or can correspond to a specified percentage of full focus. Smaller step sizes can provide greater resolution in the MTF of the DUT identified for the point of interest at block 806 below, at least across the range of optical powers. After adjusting the optical power of the camera system to a next value in the range (block 804a), the method 800 again proceeds to block 804b to capture an image of the test pattern while the camera system is providing the next optical power. This process can be repeated until the method 800 determines that there are no more optical power values to step through in the range (block 804c: No). At this point, the method 800 can proceed to block 805.

At block 805, the method 800 continues by determining whether there are additional points of interest in the FOV of the camera system at which sharpness of focus of the DUT should be characterized. If the method 800 determines that there are additional points of interest (block 805: Yes), the method 800 can return to block 804 to step through another range of optical powers corresponding to (a) the prescription information of spherical components received for the lens of the near-to-eye device and (b) a next point of interest within the FOV of the camera system. The other range(s) of optical powers utilized when the method 800 returns to block 804 from block 805 can be the same as or different from one or more ranges utilized in previous iterations of the blocks 804-805.

On the other hand, if the method 800 determines that there are no additional points of interest (block 805: No), the method 800 can proceed to block 806 to (i) analyze the images captured at block 804 and (ii) determine the sharpness of focus of the DUT at each of the points of interest. As discussed above with reference to block 577 of the method 570 of FIG. 5, analysis of the sharpness of focus of the DUT at each of the points of interest can include measuring, in images of the test pattern captured at block 804 for that point of interest, contrast of a target edge in the test pattern located at that point of interest. Measuring contrast of a target edge in the test pattern in an image can include measuring a sharpness or slope of transition in the image across the target edge. Because multiple images are captured at block 804 for each point of interest as a result of the method 800 stepping through the corresponding range of optical powers, the method 800 can determine a corresponding number of contrast measurement values (MTF values) for a target edge at each point of interest. The MTF values corresponding to a point of interest identify an MTF of the DUT at that point of interest, and can be plotted as a function of optical power of the camera system. Additionally, or alternatively, the method 800 can use the MTF values corresponding to a point of interest to identify a peak MTF value for that point of interest. The optical power at which to set the camera system to achieve the peak MTF value for a given point of interest can be considered the best or optimal optical power for that point of interest. Additionally, or alternatively, the peak MTF value can be used as an indication of focus quality of the DUT at that point of interest. Such an analysis can be performed for each point of interest using the corresponding images captured at block 804.

At block 807, the method 800 continues by determining whether the sharpness of focus at each point of interest is within acceptable parameters and/or tolerances. In some embodiments, determining whether the sharpness of focus for each point of interest is within acceptable parameters/tolerances can include comparing the corresponding peak MTF value identified for that point of interest at block 806 to a corresponding focus quality threshold. Block 807 of the method 800 is generally similar to block 578 of the method 570 of FIG. 5. Therefore, a detailed discussion of block 807 is omitted here for the sake of brevity.

Furthermore, blocks 807-809 of the method 800 are generally similar to blocks 578-580 of the method 570. Therefore, a detailed discussion of blocks 807-809 is also omitted here for the sake of brevity. It should be noted, however, that the method 800 can proceed from block 809 to block 921 of the method 920 of FIG. 9 in some embodiments (e.g., to verify the prescription information of the lens of the near-to-eye device provided to the method 800 at block 801 and/or to determine actual prescription characteristics of the lens).

Although the steps of the method 800 are discussed and illustrated in a particular order, the method 800 of FIG. 8 is not so limited. In other embodiments, all or a subset of one or more of the steps of the method 800 can be performed in a different order. In these and other embodiments, all or a subset of any of the steps of the method 800 can be performed before, during, and/or after all or a subset of any of the other steps of the method 800. Furthermore, a person skilled in the art will readily recognize that the method 800 can be altered and still remain within these and other embodiments of the present technology. For example, all or a subset of one or more steps of the method 800 can be omitted and/or repeated in some embodiments.

Figure 9:
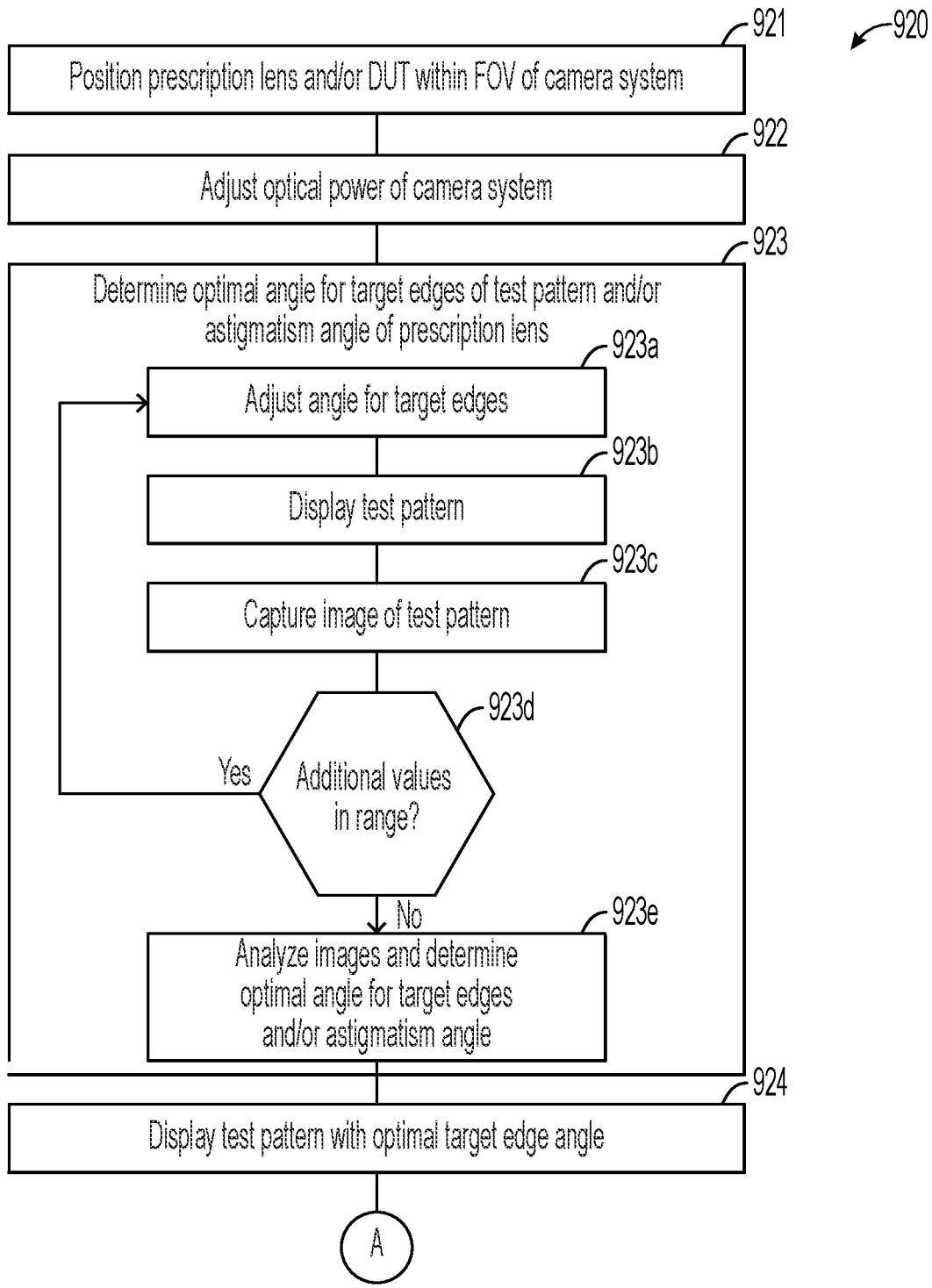
FIG. 9 is a flow diagram illustrating a method for determining prescription information of a lens (e.g., of a near-to-eye device) and/or for characterizing focus quality of a device under test through the lens, in accordance with various embodiments of the present technology.
Figure 9:
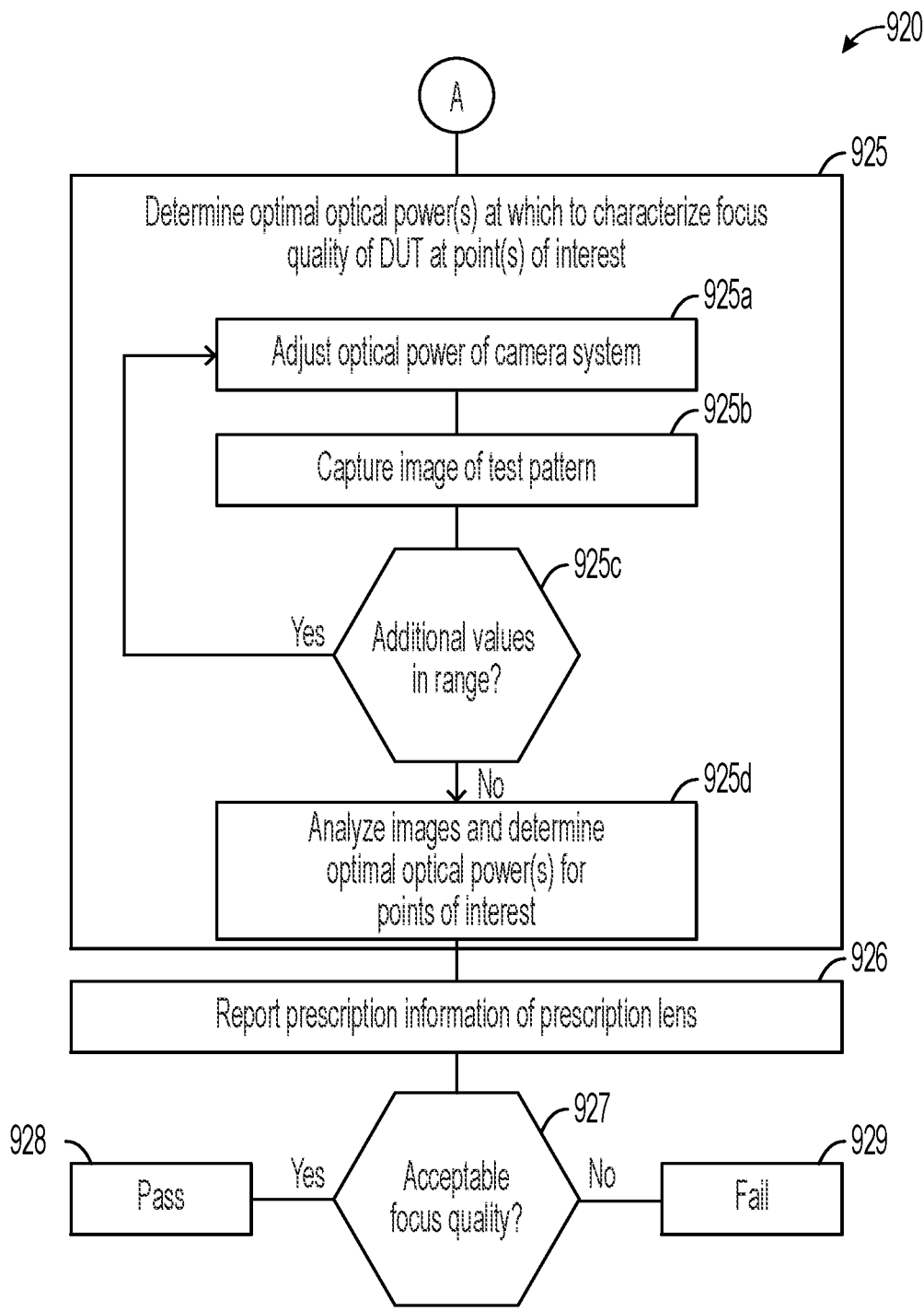

FIG. 9 is a flow diagram illustrating a method 920 for determining prescription information of a lens (e.g., of a near-to-eye device) and/or for characterizing focus quality of a DUT through the lens, in accordance with various embodiments of the present technology. In some embodiments, the method 920 can be employed when the prescription of a lens is unknown or is to be verified. In these and other embodiments, the method 920 can be employed to characterize focus quality a DUT (e.g., a display) through a prescription lens. All or a subset of one or more of the steps of the method 920 can be executed by various components or devices of an imaging system (e.g., the imaging system 100 of FIG. 1), such as the camera systems 109, 209, and/or 309 of FIGS. 1-4; and/or the test executive 130 of FIG. 1. Additionally, or alternatively, all or a subset of one or more of the steps of the method 920 can be executed by a user (e.g., an operator, a technician, an engineer, etc.) of the imaging system. In these and other embodiments, all or a subset of one or more of the steps of the method 920 can be automated and/or executed by a robotic system associated with the imaging system. In these and other embodiments, all or a portion of one or more steps of the method 920 can be executed by a DUT, such as the DUT 190 and/or 490 of FIGS. 1 and 4. Furthermore, all or a subset of any one or more of the steps of the method 920 can be executed in accordance with the discussion above and/or with the discussion below.

As shown, several of the steps of the method 920 are similar to select steps of the method 570 of FIG. 5 and/or to select steps of the method 800 of FIG. 8. For example, the method 920 begins at block 921 by positioning a lens (e.g., of a near-to-eye device) and/or a DUT (e.g., a display) within a FOV of a camera system configured in accordance with various embodiments of the present technology. Block 921 can be generally similar to block 572 of the method 570 of FIG. 5 and/or to block 802 of the method 800 of FIG. 8. Thus, a detailed discussion of block 921 is omitted here for the sake of brevity.

At block 922, the method 920 continues by adjusting or setting the optical power of the camera system to a value that is expected or estimated to maximize focus of the test pattern at a specified point of interest within the FOV of the camera system. The specified point of interest can be any point of interest in the FOV at which a target edge is displayed in the test pattern. For the sake of example, it is assumed that the specified point of interest for block 922 corresponds to a center location in the FOV of the camera system. Setting or adjusting the optical power of the camera system at block 922 can be generally similar to block 574 the method 570 of FIG. 5 or to block 804 of the method 800 of FIG. 8. Thus, a detailed discussion of the block 922 of the method 920 is largely omitted here for the sake of brevity.

That said, it should be noted that spherical prescription information of the lens of the near-to-eye device may not be known at block 922. Thus, the optical power of the camera system can be initially adjusted or set at block 922 to a default value (e.g., 0 diopters, or to another optical power). Additionally, or alternatively, the imaging system can display a test pattern and step through a range of optical power values to determine a best or optimal optical power at which to perform block 923 of the method 920, much like the procedures executed at blocks 804 and 806 of the method 800 of FIG. 8. Alternatively, the optical power of the camera system can be adjusted or set at block 922 to a value that is estimated (e.g., based on the shape or other characteristics of the lens of the near-to-eye device) to at least partially compensate for the optical power provided by the spherical component of the lens of the near-to-eye device.

At block 923, the method 920 continues by determining a best or optimal angle theta ($\theta$) at which to set target edges of a test pattern displayed by the DUT for measuring sharpness of focus of the DUT through the lens of the near-to-eye device. In some embodiments, determining the optical angle for the target edges includes stepping through a range of potential angles. The range of potential angles can be user- or system-defined, and/or step sizes between adjacent angles within the range can be user- or system-defined. Furthermore, in some embodiments, the range of potential angles can include all or a subset of potential astigmatism angles and/or all or a subset of potential angles for the target edges. For example, the range of potential angles can span between zero and 90 degrees, or between zero and 180 degrees.

As shown, block 923 of the method 920 includes several sub-steps 923a-923e. In a first iteration through the blocks 923a-923e, the method 920 can adjust or set the angle for target edges in the test pattern to an initial angle value (e.g., zero degrees) in the range of potential angles at block 923a, and can display the test pattern using the DUT at block 923b. Displaying the test pattern at block 923b can be generally similar to displaying the test pattern at block 573 of the method 570 of FIG. 5 and/or at block 803 of the method 800 of FIG. 8. Thus, a detailed discussion of block 923b is omitted here for the sake of brevity. After displaying the test pattern at block 923b, the method 920 proceeds at block 923c to capture an image of the test pattern through the lens of the near-to-eye device.

At block 923d, the method 920 determines whether there are additional angle values to step through in the range. If the method 920 determines there are additional angle values to step through in the range (block 923d: Yes), the method 920 returns to block 923a to adjust the angle of the target edges in the test pattern to a next angle value in the range. As discussed above, step sizes between angle values in the range can be user- or system-defined. Smaller step sizes can enable greater precision in determining the best or optimal angle theta at which to set the target edges of the test pattern to measure sharpness of focus of the DUT. After adjusting the angle of the target edges in the test pattern to a next angle value in the range (block 923a), the method 923 again proceeds to blocks 923b and 923c to display the test pattern with updated target edge angles and to capture an image of the updated test pattern through the lens of the near-to-eye device, respectively. This process can be repeated until the method 920 determines that there are no more angle values to step through in the range (block 923d: No). At this point, the method 920 can proceed to block 923e.

At block 923e, the method 920 analyzes the images captured at block 923c. Analysis of the images can include an analysis of the sharpness of focus of the test pattern in each of the images at one or more specified points of interest (e.g., the specified point of interest for which optical power of the camera system was set at block 922). Analysis of the sharpness of focus includes finding a modulation transfer function (MTF) corresponding to the test pattern at the one or more specified points of interest. For example, the method 920 can measure the contrast at a target edge (e.g., moving from a white gap onto a black line) located at a specified point of interest in each image captured at block 923c. In turn, the method 920 can plot the resulting MTF values to identify the MTF of the DUT at that point of interest. Additionally, or alternatively, the method 920 can use the MTF values for a point of interest to identify a peak MTF value for the point of interest. In turn, the method 920 can identify the angle at which to display the target edges of the test pattern to achieve the peak MTF value. This angle is referred to herein as the optimal target edge angle. Because the MTF value of a DUT at a given point of interest is achieved when the optimal target edge angle matches the astigmatism angle of the prescription lens, the optimal target edge angle can be said to be directly related to the astigmatism angle of the prescription lens. As such, identifying the optimal target edge angle can also identify the astigmatism angle of the prescription lens. Thus, the method 920 can report (e.g., output) the astigmatism angle of the prescription lens at block 923. Alternatively, the method 920 can report the astigmatism angle of the prescription lens at block 926, as discussed below.

At block 924, the method 920 continues by (i) setting the angle of the target edges in the test pattern to the optimal target edge angle determined at block 923e and (ii) thereafter displaying the test pattern using the DUT.

At block 925, the method 920 continues by determining best or optimal optical power(s) of the camera system at which to characterize sharpness of focus of the DUT at one or more points of interest within the FOV of the camera system. In some embodiments, determining the best optical power(s) at which to characterize focus quality of the DUT at the point(s) of interest can include stepping through a range of optical powers of the camera system. The range of optical powers can be user- or system-defined, and/or the step sizes between adjacent optical powers in the range can be user- or system-defined. Block 925 (and the corresponding sub-steps 925a-925c) of the method 920 is generally similar to block 804 (and the corresponding sub-steps 804a-804c) of the method 800 of FIG. 8. Therefore, a detailed discussion of block 925 is largely omitted here for the sake of brevity. That said, it is important to note that because the optical power provided by the spherical components of the lens of the near-to-eye device may not be known at block 925, the range of optical powers stepped through at block 925 of the method 920 can be broader in some embodiments than the range of optical powers utilized at block 804 of the method 800. In some embodiments, the broader range of optical powers can facilitate capturing images useful for determining the best optical powers at which to set the camera system for characterizing focus quality of the DUT at a plurality of points of interest within the FOV of the camera system. In these and other embodiments, the broader range can include positive optical power values, negative optical power values, and/or an optical power value equivalent to zero.

After the method 920 captures images of the test pattern at each of the optical powers in the range and determines that there are no more optical power values to step through in the range (block 925c: No), the method 920 can proceed to block 925d to analyze the images captured at block 925b. As discussed above with reference to block 577 of the method 570 of FIG. 5 and to block 806 of the method 800 of FIG. 8, analysis of the images at each of the points of interest at block 925d can include measuring contrast of a target edge in the images of the test pattern located at the respective point of interest. Measuring contrast of a target edge in an image of the test pattern can include measuring a sharpness or slope of transition in the image across the target edge. Because multiple images are captured at block 925b as a result of the method 920 stepping through the range of optical powers, the method 920 can determine a corresponding number of contrast measurement values (MTF values) for a target edge at each point of interest. The MTF values corresponding to a point of interest can be used to identify an MTF of the DUT at that point of interest, and can be plotted as a function of optical power of the camera system. Additionally, or alternatively, the method 920 can use the MTF values corresponding to a point of interest to identify a peak MTF value for that point of interest. The peak MTF value can be used as an indication of focus quality of the DUT at that point of interest. The optical power at which to set the camera system to achieve the peak MTF value for a given point of interest can be considered the best or optimal optical power at which to characterize focus quality of the DUT at that point of interest. Additionally, or alternatively, the peak MTF value can be used to determine the optical power provided by the spherical components of the lens of the near-to-eye device at that point of interest. For example, assuming that the working distance of a virtual image including the test pattern is known, the method 920 can determine a diopter difference between the known working distance and the found distance at which the peak MTF value occurs. This diopter difference can represent the optical power of the prescription lens. Analysis performed at block 925d for one point of interest can be performed for each of the other points of interest using the images captured at block 925b.

At block 926, the method 920 continues by reporting prescription information of the lens of the near-to-eye device. For example, the method 920 can output the astigmatism angle of cylindrical components of the lens determined at block 923e. Additionally, or alternatively, the method 920 can output the optical powers provided by the spherical components of the lens at the various points of interest determined at block 925d.

At blocks 927-929, the method 920 determines whether the sharpness of focus of the DUT at one or more points of interest is within acceptable parameters and/or tolerances; proceeds to block 928 when the sharpness of focus of the DUT is within acceptable parameters/tolerances (block 927: Yes); and proceeds to block 929 when the sharpness of focus of the DUT is not within acceptable parameters/tolerances (block 927: No). Blocks 927-929 of the method 920 are generally similar to blocks 578-580 of the method 570 of FIG. 5 and to blocks 807-809 of the method 800 of FIG. 8. Therefore, a detailed discussion of blocks 927-929 is omitted here for the sake of brevity.

Although the steps of the method 920 are discussed and illustrated in a particular order, the method 920 of FIG. 9 is not so limited. In other embodiments, all or a subset of one or more of the steps of the method 920 can be performed in a different order. In these and other embodiments, all or a subset of any of the steps of the method 920 can be performed before, during, and/or after all or a subset of any of the other steps of the method 920. For example, all or a subset of block 925 can be executed before all or a subset of block 923 in some embodiments. As another example, all or a subset of block 923 can be executed before all or a subset of block 922. Furthermore, a person skilled in the art will readily recognize that the method 920 can be altered and still remain within these and other embodiments of the present technology. For example, all or a subset of one or more steps of the method 920 can be omitted and/or repeated in some embodiments. As a specific example, all or a subset of a first iteration of block 925 can be executed before executing all or a subset of blocks 923 and/or 924, and all or a subset of a second iteration of block 925 can be executed after all or a subset of executing blocks 923 and/or 924. As another example, all or a subset of a second iteration of block 923 can be performed after all or a subset of block 925 (e.g., using information measured or analyzed while executing all or a subset of block 925 to inform the second iteration of block 923, such as a better range of target edge angles to use in the second iteration of the block 923 than was used in the first iteration of the block 923, and/or a better optical power at which to set the camera system for performing all or a subset the second iteration of the block 923 to maximize focus of the test pattern at a specific point of interest).

Figure 10:
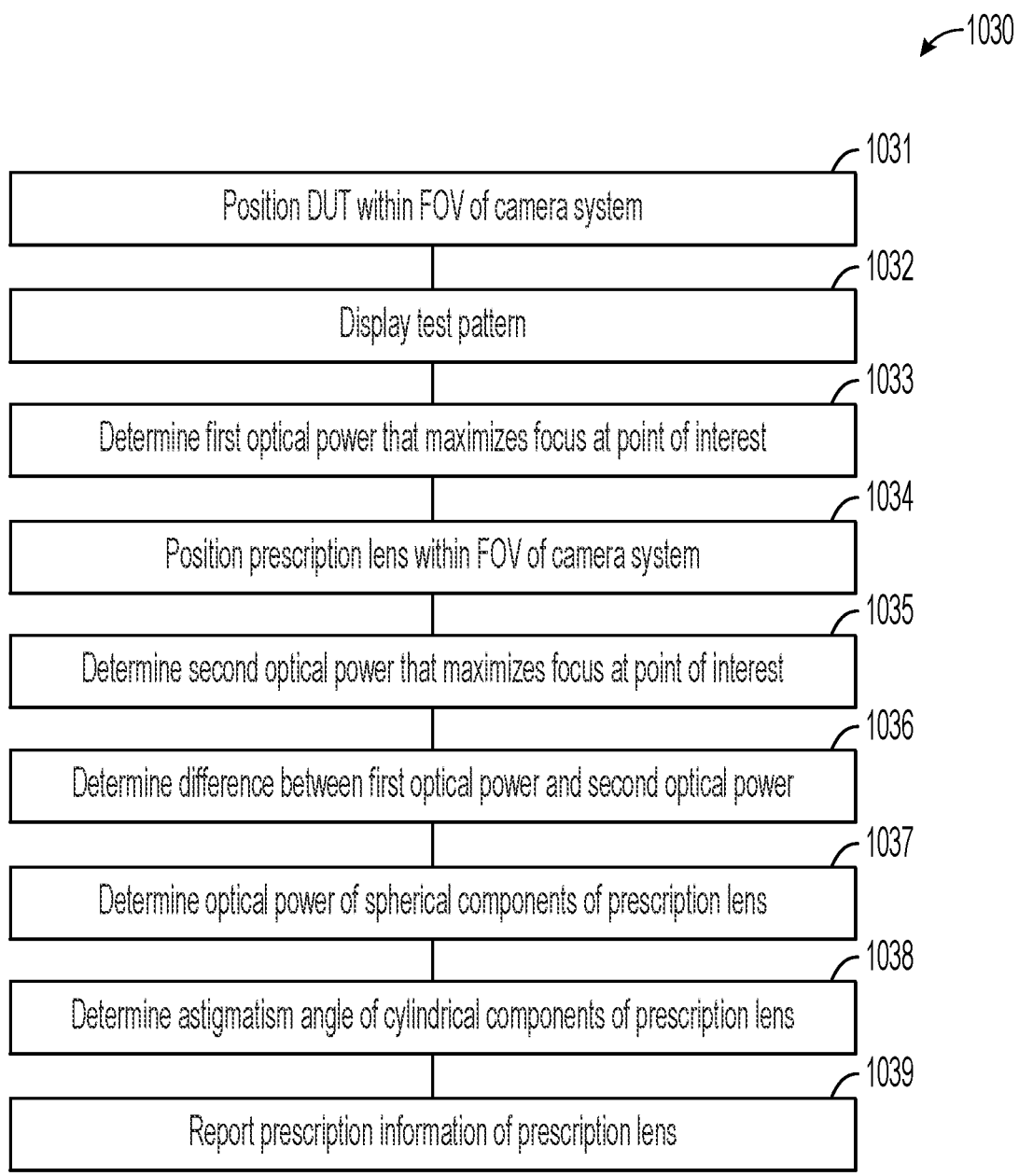
FIG. 10 is a flow diagram illustrating another method of determining prescription information of a lens in accordance with various embodiments of the present technology.

FIG. 10 is a flow diagram illustrating another method 1030 of determining prescription information of a lens in accordance with various embodiments of the present technology. In some embodiments, the method 1030 can be employed to determine prescription information of a lens when the prescription of the lens is unknown or is to be verified, such as in embodiments in which the lens can be removably positioned within a FOV of a camera system without altering a position of the camera system and/or the DUT, in embodiments in which the working distance of the virtual image viewed by the camera system is unknown, and/or in embodiments in which a working distance to the virtual image is variable (e.g., due to a tolerance of the system design). All or a subset of one or more of the steps of the method 1030 can be executed by various components or devices of an imaging system (e.g., the imaging system 100 of FIG. 1), such as the camera systems 109, 209, and/or 309 of FIGS. 1-4; and/or the test executive 130 of FIG. 1. Additionally, or alternatively, all or a subset of one or more of the steps of the method 1030 can be executed by a user (e.g., an operator, a technician, an engineer, etc.) of the imaging system. In these and other embodiments, all or a subset of one or more of the steps of the method 1030 can be automated and/or executed by a robotic system associated with the imaging system. In these and still other embodiments, all or a portion of one or more steps of the method 1030 can be executed by a DUT, such as the DUT 190 and/or 490 of FIGS. 1 and 4. Furthermore, all or a subset of any one or more of the steps of the method 1030 can be executed in accordance with the discussion above and/or with the discussion below.

The method 1030 begins at block 1031 by positioning a DUT (e.g., a display) within a FOV of a camera system configured in accordance with various embodiments of the present technology. Positioning the DUT within the FOV of the camera system can be generally similar to blocks 572, 802, and 921 of the methods 570, 800, and 920, respectively, of FIGS. 5, 8, and 9, respectively. Therefore, a detailed discussion of block 1031 is omitted here for the sake of brevity. That said, it is important to note that the DUT can be positioned within the FOV of the camera system at block 1031 without positioning a prescription lens between the DUT and a lens arrangement or image sensor of the camera system.

At block 1032, the method 1030 displays a test pattern consistent with the discussion above and such that light emitted from the DUT enters the camera system without being affected by a prescription lens.

At block 1033, the method 1030 continues by determining a first optical power that maximizes focus of the test pattern at a point of interest in the absence of a prescription lens (and/or by determining a first distance to the best focus). Block 1033 can be generally similar to block 574 of the method 570 of FIG. 5, block 804 of the method 800 of FIG. 8, and/or 925 of the method 920 of FIG. 9. Therefore, a detailed discussion of block 1033 is omitted here for the sake of brevity.

At block 1034, the method 1030 continues by positioning a prescription lens within the FOV of the camera system. Positioning the prescription lens within the FOV of the camera system can include positioning the prescription lens between the DUT and the camera system, and/or such that light emitted by the DUT passes through the prescription lens before entering the camera system.

At block 1035, the method 1030 continues by determining a second optical power that maximizes focus of the test pattern displayed by the DUT at the point of interest from block 1033 in the presence of the prescription lens (and/or by determining a second distance to best focus). Block 1035 can be generally similar to block 574 of the method 570 of FIG. 5, block 804 of the method 800 of FIG. 8, and/or 925 of the method 920 of FIG. 9. Therefore, a detailed discussion of block 1035 is omitted here for the sake of brevity.

At block 1036, the method 1030 continues by determining a difference between the first optical power from block 1033 and the second optical power from block 1035.

At block 1037, the method 1030 continues by determining the optical power of spherical components of the prescription lens at the point of interest. In some embodiments, the difference between the first optical power from block 1033 and the second optical power from block 1035 can be proportional (e.g., directly proportional) to the optical power of the spherical components of the prescription lens at the point of interest.

At block 1038, the method 1030 optionally continues by determining an astigmatism angle of cylindrical components of the prescription lens. Block 1038 can be generally similar to block 923 of the method 920 of FIG. 9. Therefore, a detailed discussion of block 1038 is omitted here for the sake of brevity.

At block 1039, the method 1030 continues by reporting or outputting the prescription information of the prescription lens. Block 1039 can be generally similar to block 926 of the method 920 of FIG. 9. Therefore, a detailed discussion of block 1039 is omitted here for the sake of brevity.

Although the steps of the method 1030 are discussed and illustrated in a particular order, the method 1030 of FIG. 10 is not so limited. In other embodiments, all or a subset of one or more of the steps of the method 1030 can be performed in a different order. In these and other embodiments, all or a subset of any of the steps of the method 1030 can be performed before, during, and/or after all or a subset of any of the other steps of the method 1030. Furthermore, a person skilled in the art will readily recognize that the method 1030 can be altered and still remain within these and other embodiments of the present technology. For example, all or a subset of one or more steps of the method 1030 can be omitted and/or repeated in some embodiments.

Figure 11:
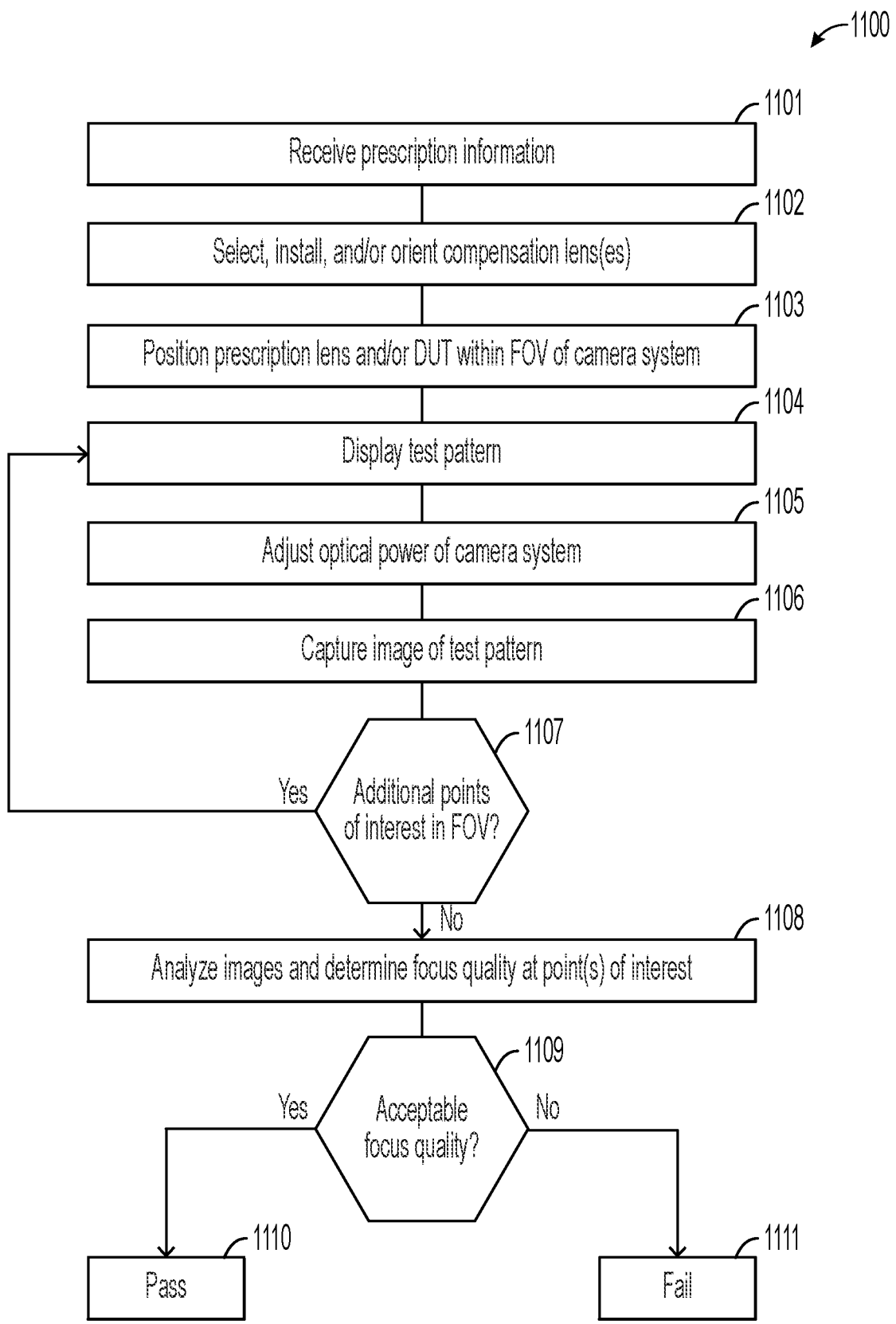
FIG. 11 is a flow diagram illustrating another method of characterizing focus quality of a device under test through a lens in accordance with various embodiments of the present technology.

FIG. 11 is a flow diagram illustrating another method 1100 of characterizing focus quality of a DUT through a lens in accordance with various embodiments of the present technology. In some embodiments, the method 1100 can be employed to measure a DUT (e.g., a display) through a prescription lens when the prescription lens includes cylindrical components (e.g., to account for an astigmatism) and/or when prescription information of the lens is known. All or a subset of one or more of the steps of the method 1100 can be executed by various components or devices of an imaging system (e.g., the imaging system 100 of FIG. 1), such as the camera systems 109, 209, and/or 309 of FIGS. 1-4, and/or the test executive 130 of FIG. 1. Additionally, or alternatively, all or a subset of one or more of the steps of the method 1100 can be executed by a user (e.g., an operator, a technician, an engineer, etc.) of the imaging system. In these and other embodiments, all or a subset of one or more of the steps of the method 1100 can be automated and/or executed by a robotic system associated with the imaging system. In these and still other embodiments, all or a portion of one or more steps of the method 1100 can be executed by a DUT, such as the DUT 190 and/or 490 of FIGS. 1 and 4. Furthermore, all or a subset of any one or more of the steps of the method 110 can be executed in accordance with the discussion above and/or with the discussion below.

The method 1100 begins at block 1101 by receiving prescription information. The prescription information can specify, for example, prescription information of a lens that is integrated with a DUT (e.g., a display) in a near-to-eye device, such as in AR glasses. For example, the prescription information can specify an optical power (e.g., in diopters) of spherical components of the lens that are used to correct or compensate for nearsightedness or farsightedness. Additionally, or alternatively, the prescription information can specify optical power (e.g., in diopters and/or in astigmatism angle) of cylindrical components of the lens that are used to correct or compensate for astigmatism.

At block 1102, the method 1100 continues by selecting, installing, and/or orienting a compensation lens for the imaging system and/or an associated camera system. The compensation lens can be generally similar to the compensation lens 111, 211, and/or 311 discussed above with reference to FIGS. 1-3A. For example, the compensation lens can include a positive or negative cylindrical lens configured to provide an optical power at a given angle. Continuing with this example, selecting the compensation lens can include selecting a compensation lens that provides an optical power that corresponds to (e.g., compensates for, negates, cancels out, counteracts, mitigates, reduces, adjusts, alters) the optical power provided by the cylindrical components of the prescription lens at the astigmatism angle specified in the prescription. For example, selecting the compensation lens can include selecting a compensation lens that provides an optical power that is opposite (e.g., equivalent to the negation of) the optical power provided by the cylindrical components of the prescription lens at the astigmatism angle specified in the prescription. As another example, selecting the compensation lens can include selecting a compensation lens that provide an equivalent (e.g., a same) optical power as the optical power provided by the cylindrical components of the prescription lens at the astigmatism angle specified in the prescription.

In some embodiments, selecting the compensation lens includes selecting a single (e.g., only one) compensation lens for the imaging system and/or associated camera system. In other embodiments, such as in embodiments in which no single compensation lens is available that provides an optical power that corresponds to the optical power provided by the cylindrical components of the prescription lens at the astigmatism angle specified in the prescription, selecting the compensation lens can include selecting multiple compensation lenses and stacking the compensation lenses together to achieve the desired optical power. The multiple compensation lenses can be installed and/or oriented together, such as after stacking the multiple lenses together and/or orienting them to a same angle. Alternatively, the multiple compensation lenses can be installed and/or oriented individually or in subgroups.

Installing the compensation lens can include installing the compensation lens in front of or behind an eyepiece of the camera system. For example, installing the compensation lens can include installing the compensation lens within an eyepiece mount corresponding to the eyepiece. As another example, the compensation lens can be installed within its own hardware mount that can interface with (e.g., permanently or removably attach to) the eyepiece mount, such as by screwing onto a proximal or distal end of the eyepiece mount. As still another example, installing the compensation lens can include positioning the compensation lens at another location along the camera system and/or at another location within the imaging system, such as at one or more of the locations discussed above with reference to FIGS. 1-3B.

Additionally, or alternatively, orienting the compensation lens can include positioning the compensation lens such that it is oriented at an angle that corresponds to the astigmatism angle specified in the prescription. For example, in the event that the selected compensation lens has an optical power opposite the optical power provided by the cylindrical components of the prescription lens, orienting the compensation lens can include positioning the compensation lens such that it is oriented at an angle that matches or aligns with the astigmatism angle specified in the prescription. As a specific example, consider a prescription lens with (a) spherical components that provide −1 diopters of spherical power, and (b) cylindrical components that provide −2 diopters of cylindrical power at a 30-degree angle. A compensation lens that provides +2 diopters of cylindrical power can be selected and oriented at a 30-degree angle to compensate for (e.g., cancel out, negate, counteract, mitigate, reduce, minimize) the −2 diopters of cylindrical power provided by the cylindrical components of the prescription lens. As such, it is expected that a compensation lens (or a stack of compensation lenses) having an optical power opposite to the optical power provided by cylindrical components of a prescription lens will, when oriented to an angle that matches or aligns with the astigmatism angle of the cylindrical components of the prescription lens, cancel out the effects of the cylindrical components of the prescription lens. As a result, it is expected that a camera system, when viewing a DUT through the compensation lens and the prescription lens, will view the DUT without being affected by the cylindrical components of the prescription lens. The camera system may continue to be affected by the spherical components of the prescription lens, at least until the camera system is adjusted (at block 1105 below) to compensate for the spherical optical power (e.g., −1 diopters) provided by the spherical components of the prescription lens.

As another example, in the event that the selected compensation lens has an optical power equivalent to the optical power provided by the cylindrical components of the prescription lens, orienting the compensation lens can include positioning the compensation lens such that it is oriented at an angle orthogonal to the astigmatism angle specified in the prescription. As a specific example, consider again the prescription lens with (a) spherical components that provide −1 diopters of spherical power, and (b) cylindrical components that provide −2 diopters of cylindrical power at a 30-degree angle. A compensation lens that provides −2 diopters of cylindrical power can be selected and oriented at a 110-degree angle to compensate for (e.g., mitigate, reduce, alter, adjust, convert) the −2 diopters of cylindrical power provided by the cylindrical components of the prescription lens. In this example, because two cylindrical lenses of the same power combined at orthogonal angles can be treated as a spherical lens of the same power, it is expected that the combination of the cylindrical components of the prescription lens with the compensation lens will contribute an additional −2 diopters of spherical power. Stated another way, it is expected that a camera system, when viewing a DUT through the compensation lens and the prescription lens, will view the DUT absent cylindrical power but with an additional −2 diopters of spherical power. Thus, continuing with this specific example, it is expected that the camera system will need to be adjusted (at block 1105 below) to compensate for −3 diopters of spherical power (e.g., −1 diopters of spherical power provided by the spherical components of the prescription lens plus −2 diopters of spherical power contributed by the combination of the compensation lens with the cylindrical components of the prescription lens).

Regardless of the optical power of the compensation lens, orienting the compensation lens at an angle that corresponds to an astigmatism angle specified in a prescription can include positioning the compensation lens at—and/or rotating the compensation lens to—the angle, such as before, during, or after installing the compensation lens.

At block 1103, the method 1100 continues by positioning the lens and/or the DUT within a field of view (FOV) of a camera system configured in accordance with various embodiments of the present technology. In some embodiments, the lens and/or the DUT can be positioned and held at a location/orientation such that an entrance pupil of the camera system relative to the DUT is located at a position corresponding to where a user's pupil would be positioned when the user wears the near-to-eye device. In these and other embodiments, the lens and/or the DUT can be positioned and held at a location/orientation such that light emitted by the display passes through the prescription lens, enters the lens arrangement of the camera system, and strikes an image sensor of the camera system. Depending on the location of the compensation lens relative to the distal end of the lens arrangement of the camera system, the light emitted by the display can pass through the compensation lens (a) after passing through the prescription lens and (b) before or after passing through the distal end of the lens arrangement.

In some embodiments, (a) receiving the prescription information (block 1101); (b) selecting, retrieving, installing, positioning, and/or orienting the compensation lens(es) (block 1102); and/or positioning the lens and/or the DUT within a field of view (FOV) of a camera system (block 1103) can be performed by a user or operator of the imaging system and/or an associated camera system. In these and other embodiments, (a) receiving the prescription information (block 1101); (b) selecting, retrieving, installing, positioning, and/or orienting the compensation lens(es) (block 1102); and/or positioning the lens and/or the DUT within a FOV of a camera system (block 1103), can be automated. For example, a robotic system associated with the imaging system and/or the camera system can receive and interpret the prescription information provided at block 1101; can select, retrieve, install, position, and/or orient one or more compensation lenses that compensate for the optical power provided by cylindrical components of the prescription lens; and/or can position the lens and/or the DUT within the FOV of the camera system.

At block 1104, the method 1100 continues by displaying a test pattern. Displaying the test pattern can include emitting light from the DUT and/or presenting a known pattern of information to the camera system through the lens of the near-to-eye device. The test pattern can be a test pattern that is commonly used to characterize focus quality. For example, the test pattern can include a test pattern that is compliant with ISO Standard 12233, that includes at least one 4-degree slanted edge at one or more points of interest in the FOV of the camera system, and/or that enables taking measurements at multiple points of interest within the FOV of the camera system within a single image. Additionally, or alternatively, the test pattern can include sharp edges (e.g., with known, expected contrast values, such as ranging from 100% to 0%) at various points of interest. The sharp edges can be oriented to enable measurements in multiple directions (e.g., sagittal, tangential, etc.) at one or more of these points of interest. An example of such a test pattern is described in greater detail below with reference to FIG. 12. In these and other embodiments, other test patterns can be used, such as line pairs spaced apart from one another at a specific or desired spatial frequency and/or oriented at a desired angle, as discussed above with reference to FIG. 5-10.

At block 1105, the method 1100 continues by adjusting an optical power of the camera system. In some embodiments, the optical power of the camera system can be adjusted to correspond to the optical power of spherical components of the prescription lens. In these and other embodiments, such as in embodiments in which the compensation lens (a) includes an optical power equivalent to the cylindrical power provided by cylindrical components of the prescription lens and (b) is positioned at an angle orthogonal to the astigmatism angle of the cylindrical components, the optical power of the camera system can be adjusted to correspond to the spherical power contributed by the combination of the compensation lens with the cylindrical components of the prescription lens. In these and still other embodiments, the optical power of the camera system can be adjusted to correspond to (i) the spherical power contributed by the combination of the compensation lens with the cylindrical components of the prescription lens plus (ii) the spherical power contributed by the spherical components of the prescription lens. Adjusting the optical power can be generally similar to adjusting the optical power at block 574 of FIG. 5 discussed above. Therefore, a detailed discussion of block 1105 is omitted here for the sake of brevity.

At block 1106, the method 1100 continues by capturing an image of the test pattern displayed by the DUT. Capturing the image can include capturing an image of the test pattern using the image sensor of the camera system. The timing of image capture can be manually controlled. Additionally, or alternatively, the timing of image capture can be controlled via a computer coupled to the camera system and/or automatically via the test executive.

At block 1107, the method 1100 continues by determining whether there are additional points of interest within the FOV at which contrast of the test pattern (as an indication of sharpness of focus of the DUT) should be measured for analysis at block 1108. If the method 1100 determines that there are additional points of interest within the FOV at which contrast of the test pattern should be measured (block 1107: Yes), the method 1100 can return to block 1105 to adjust the optical power of the camera system such that the optical power of the camera system (a) accounts for the effects of the spherical components of the prescription lens on the test pattern and/or the effects of the combination of the compensation lens with the cylindrical components of the prescription lens, and (b) maximizes focus of the test pattern at a next point of interest within the FOV of the camera system. After adjusting the optical power of the camera system to maximize focus of the test pattern at the next point of interest, the method 1100 can proceed to block 1106 to capture another image of the test pattern and then return to block 1107.

On the other hand, if the method 1100 determines that there are no additional points of interest within the FOV at which contrast of the test pattern (as an indication of sharpness of focus of the display) should be measured (block 1107: No), the method 1100 can proceed to block 1108 to analyze the image(s) captured at block 1106 and determine the sharpness of focus of the DUT at each of the points of interest. Analysis of the sharpness of focus of the DUT at each of the points of interest can include measuring, in an image of the test pattern that was captured at block 1106 while optical power of the camera system was set at a value intended to maximize focus of the test pattern at that point of interest, contrast of a corresponding target edge in the test pattern located at that point of interest. Measuring contrast of a target edge in the test pattern can include measuring a sharpness or slope of transition in the image across the target edge. The measured contrast value is referred to herein as a modulation transfer function (MTF) value. Additionally, or alternatively, analysis of the sharpness of focus of the DUT at each of the points of interest can include determining a Fourier transform (e.g., a discrete Fourier transform (DFT)) of an imaged target edge, and using the Fourier transform to compute an overall MTF (or individual MTF values) for the DUT. Analysis of the sharpness of focus of the DUT can be performed for each image captured at block 1106, and/or for one or more points of interest within each image captured at block 1106. Regardless of the method used to compute an MTF of the DUT at a point of interest, the resulting MTF at the point of interest can represent sharpness of focus of the DUT at that point of interest as a function of optical power of the camera system.

At block 1109-1111, the method 1100 continues (a) by determining whether the sharpness of focus at each point of interest is within acceptable parameters and/or tolerances, and (b) by either passing the DUT (block 1110) or failing the DUT (block 1111). Blocks 1109-1111 can be generally similar to blocks 578-580 discussed above with reference to FIG. 5. Therefore, a detailed discussion of blocks 1109-1111 is omitted here for the sake of brevity.

Although the steps of the method 1100 are discussed and illustrated in a particular order, the method 1100 of FIG. 11 is not so limited. In other embodiments, all or a subset of one or more of the steps of the method 1100 can be performed in a different order. In these and other embodiments, all or a subset of any of the steps of the method 1100 can be performed before, during, and/or after all or a subset of any of the other steps of the method 1100. Furthermore, a person skilled in the art will readily recognize that the method 1100 can be altered and still remain within these and other embodiments of the present technology. For example, all or a subset of one or more steps of the method 1100 can be omitted and/or repeated in some embodiments.

In some embodiments, compensation lenses (e.g., the compensation lenses 111, 211, and/or 311 of FIGS. 1-3B) configured in accordance with the present technology can also be used in situations in which prescription information of a prescription lens is not known or is to be verified. For example, a method similar to the method 920 of FIG. 9 and/or the method 1030 of FIG. 10 can be employed. Continuing with this example, a process similar to block 923 of FIG. 9 can be performed to determine an astigmatism angle for a prescription lens. Alternatively, a compensation lens can be installed, several measurements of the DUT can be collected as the compensation lens is rotated through a range of angles, and the astigmatism angle for the prescription lens can be determined from the measurements (e.g., as the angle of the compensation lens when focus is maximized). Once the astigmatism angle is known, an operator or system can cycle through a set of compensation lenses that offers different optical powers by, for each compensation lens in the set, (a) installing and/or positioning the compensation lens between the prescription lens and the image sensor, and in an orientation that corresponds to the astigmatism angle of the prescription lens, and (b) taking a measurement of a DUT through the compensation lens and the prescription lens. The measurements can then be used to determine/verify an optical power provided by cylindrical components (if any) of the prescription lens (e.g., based on the optical power of the compensation lens in the set that maximizes focus). Thereafter, the optical power provided by spherical components of the prescription lens can be determined/verified in a manner consistent with the discussion of FIGS. 9 and/or 10 above. In some embodiments, once prescription information for a prescription lens is known/verified, the method can proceed to characterize focus quality of a DUT (e.g., in a manner generally similar to that described above with reference to FIGS. 5, 8, 9, and/or 11).

3. Experimental Data

Figure 12:
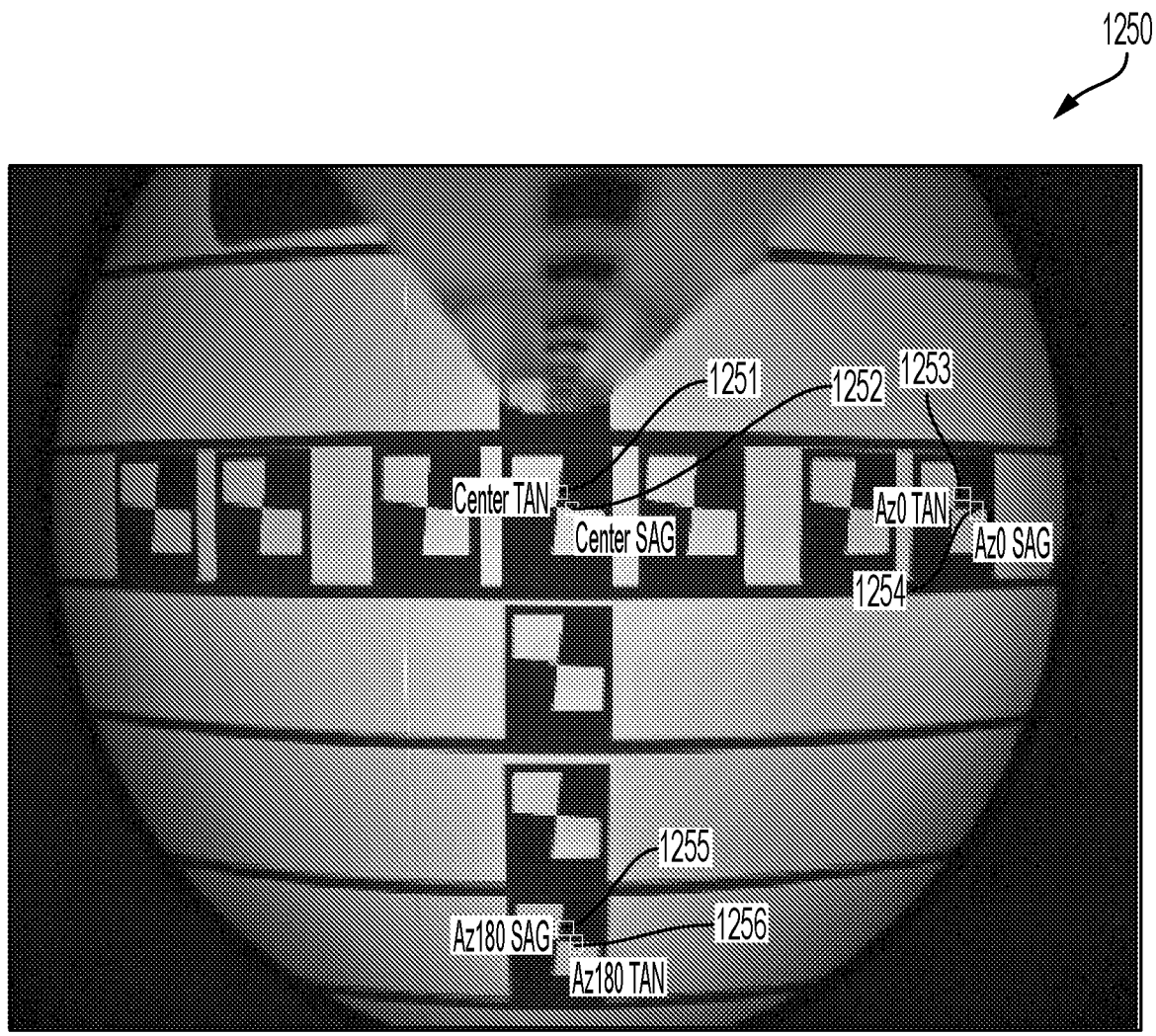
FIG. 12 is an image of a test pattern projected by a device under test and captured by a camera system through a prescription lens that includes only spherical components in accordance with various embodiments of the present technology.

FIGS. 12-17 illustrate several experimental results and proofs of concept. FIG. 12, for example, is an image of a test pattern 1250 projected by a DUT and captured by a camera system of the present technology through a prescription lens that includes only spherical components. The prescription lens does not include cylindrical components to correct for astigmatism. As shown, the test pattern includes 4-degree slant edges in compliance with ISO Standard 12233. Several points of interest 1251-1256 and corresponding slant edges are identified within the image of the test pattern. These include a center tangential point of interest 1251, a center sagittal point of interest 1252, an azimuth 0-degree tangential point of interest 1253, an azimuth 0-degree sagittal point of interest 1254, an azimuth 180-degree sagittal point of interest 1255, and an azimuth 180-degree tangential point of interest 1256. The locations of these points of interest 1251-1255 correspond to the various plots illustrated in FIGS. 13A-15B.

FIGS. 13A-13D are plots 1350a-1350d illustrating MTF functions 1351-1355 of a DUT determined at points of interest corresponding to the locations of the points of interest 1251-1255 in FIG. 12, respectively. More specifically, contrast measurements (MTF values) determined from several images of a test pattern including line pairs spaced at 22.5 line pairs/mm are plotted across optical power of the camera system in each of the plots 1351-1355 as a function of motor count of an electronic motor used to position an internal lens of the camera system. The plot 1350a of FIG. 13A corresponds to characterizations of the focus quality of the DUT in the absence of a prescription lens; the plot 1350b of FIG. 13B corresponds to characterizations of the focus quality of the DUT in the presence of a concave prescription lens having a spherical optical power of −4 diopters; the plot 1350c of FIG. 13C corresponds to characterizations of the focus quality of the DUT in the presence of a concave prescription lens having a spherical optical power of −1 diopters; and the plot 1350d of FIG. 13D corresponds to characterizations of the focus quality of the DUT in the presence of a concave prescription lens having a spherical optical power of −2 diopters.

Figure 13A:
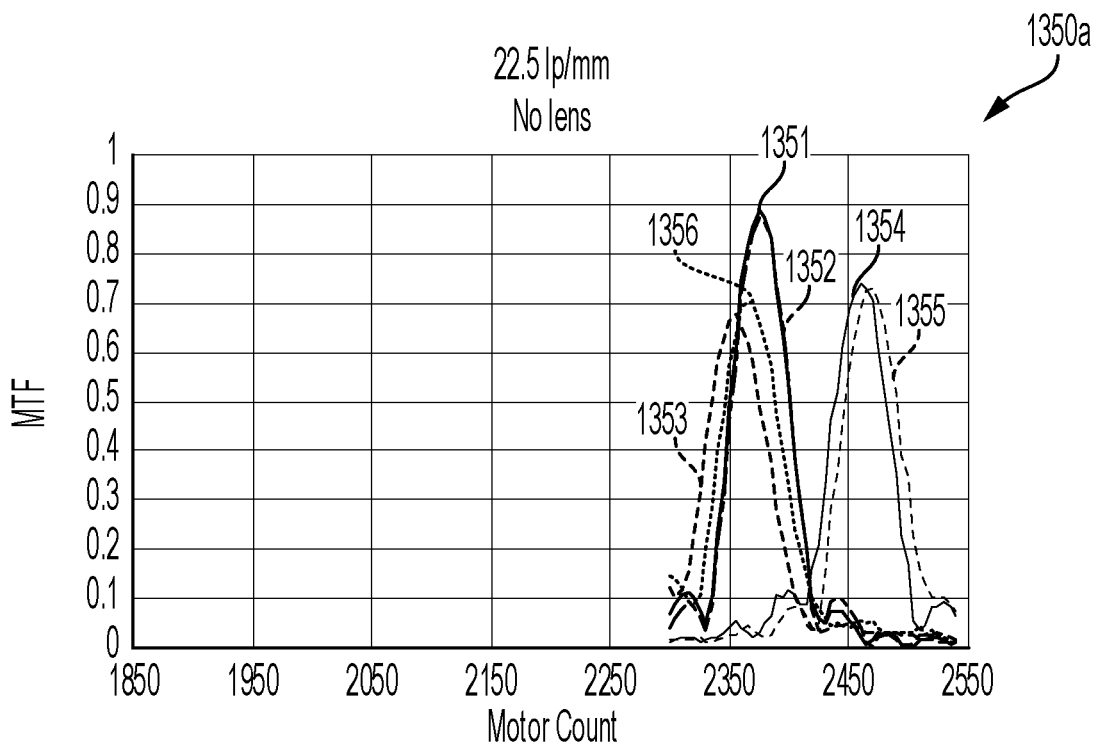
FIGS. 13A-13D are plots illustrating MTF functions identified for a device under test at various points of interest in accordance with various embodiments of the present technology.
Figure 13B:
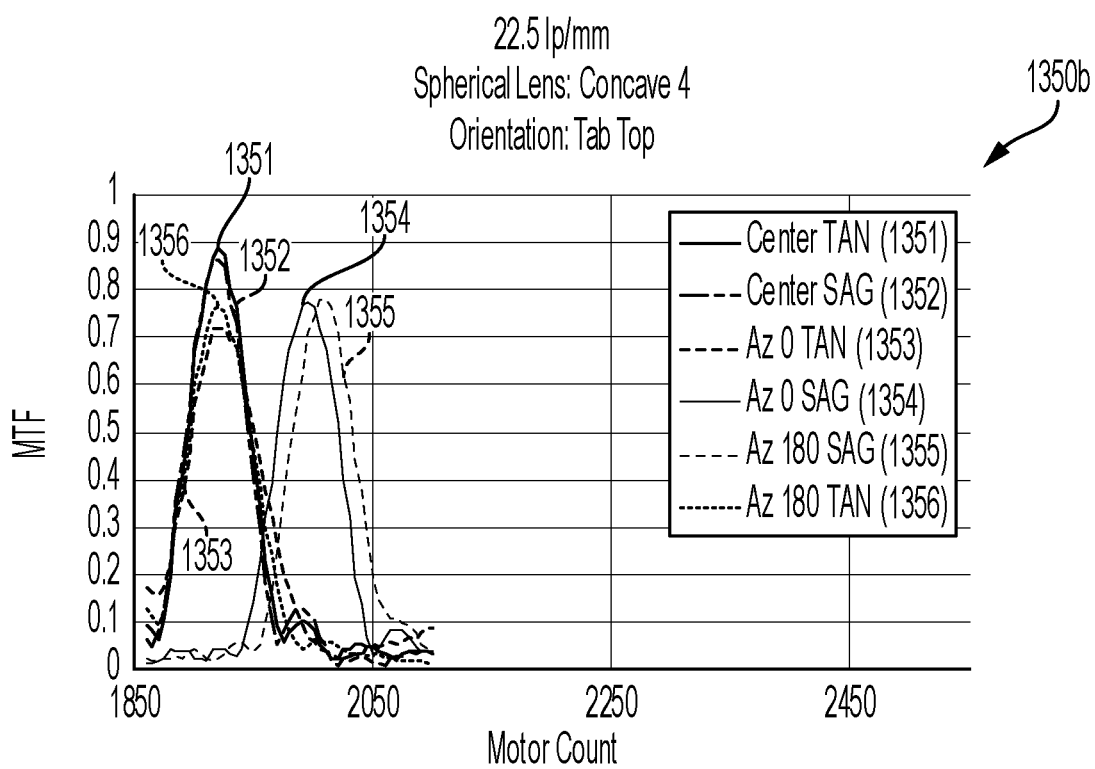
Figure 13C:
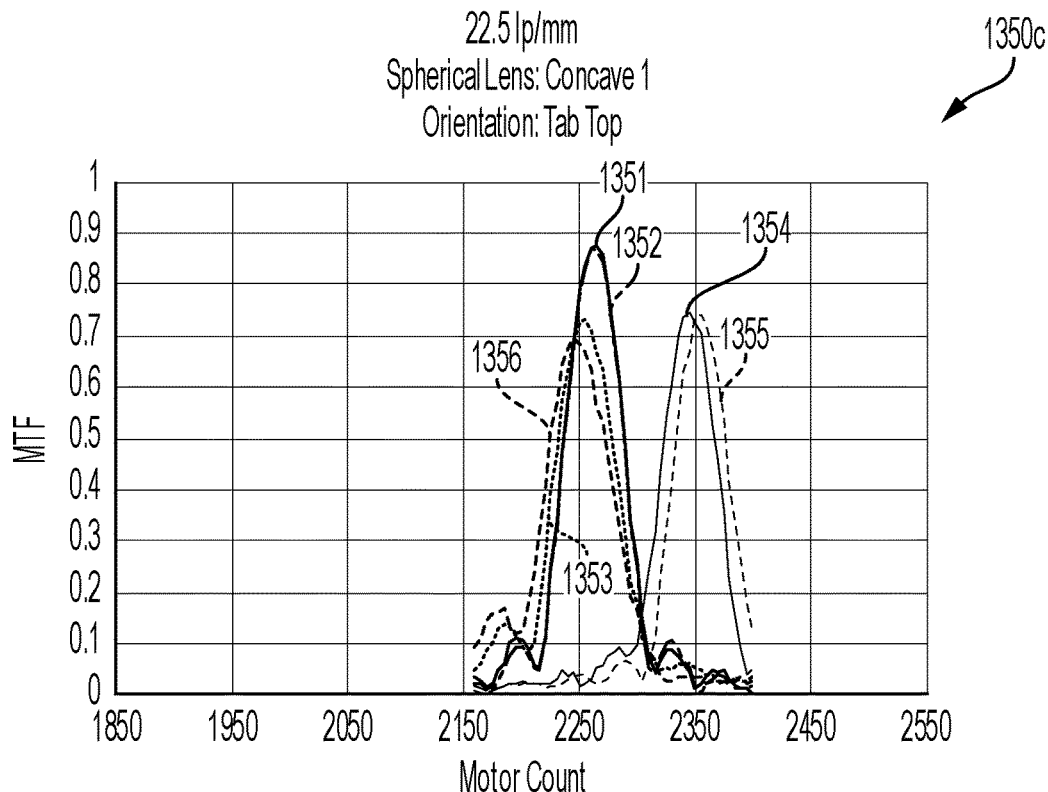
Figure 13D:
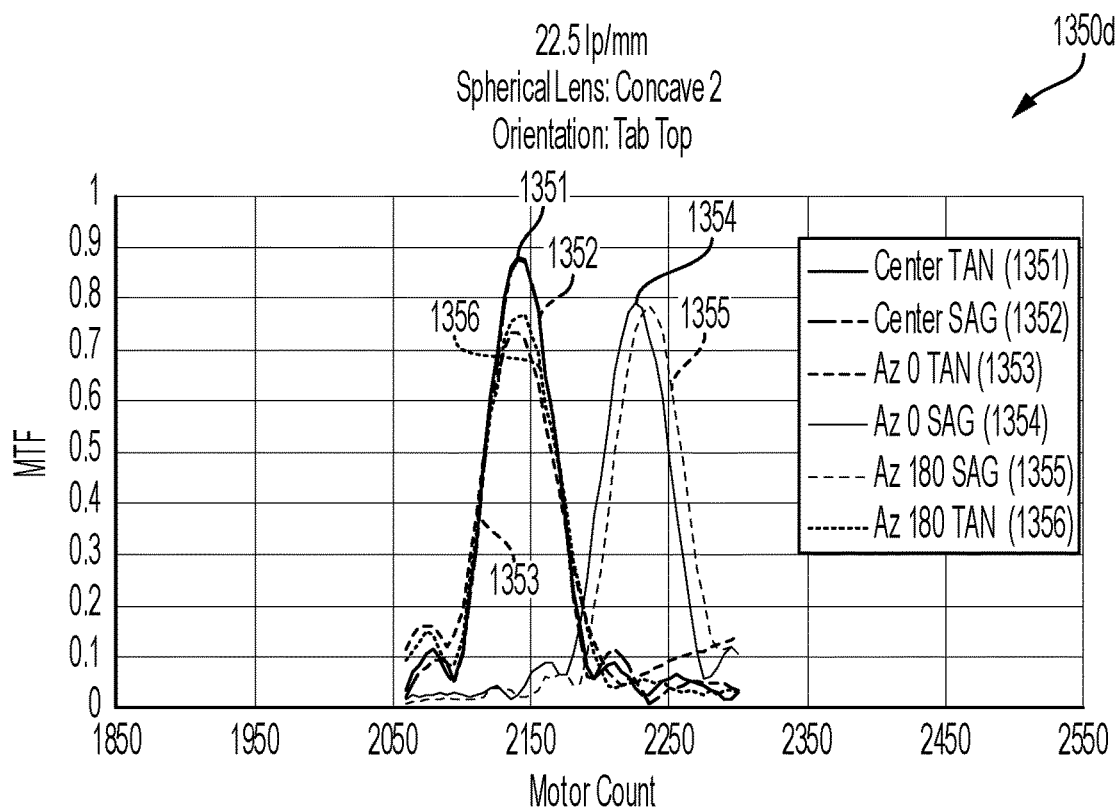

Taking the MTF functions 1351 and 1352 that correspond to a center tangential point of interest and a center sagittal point of interest, respectively, as examples, the peak MTF values for each of these MTF functions 1351 and 1352 is approximately 0.9 in FIG. 13A in the absence of a prescription lens. In the plot 1350a of FIG. 13A, the camera system provided an optical power corresponding to approximately 2375 motor counts to achieve these peak MTF values. As shown in the plots 1350b-1350c of FIGS. 13B-13D, the peak MTF values for the MTF functions 1351 and 1352 remained at approximately 0.9 regardless of the presence of a prescription lens and the optical power provided by the prescription lens. Instead, only the motor count (or the optical power provided by the camera system) that achieves the peak MTF values for the MTF functions 1351 and 1352 changes across the plots 1350a-1350d. This indicates that the camera system can compensate for the optical power provided by spherical components of the prescription lens by providing a corresponding optical power.

Also note that the peak MTF values in an individual one of the plots 1350a-1350d for each of the MTF functions 1351-1356 are slightly different from one another and different motor counts are used to achieve each of these peak MTF values. This is a result of the curvature of the object plan from the perspective of the image sensor of the camera system.

Figure 14A:
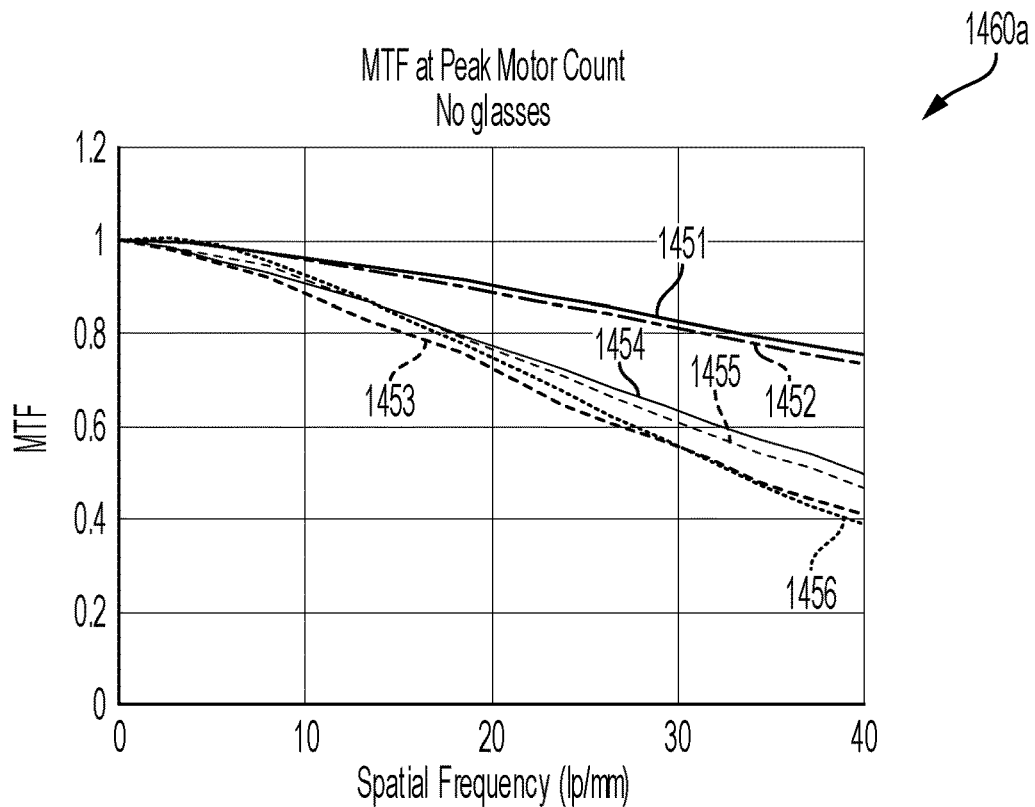
FIGS. 14A and 14B are plots illustrating peak MTF values measured at various points of interest across different spatial frequencies of line pairs in imaged test patterns, in accordance with various embodiments of the present technology.
Figure 14B:
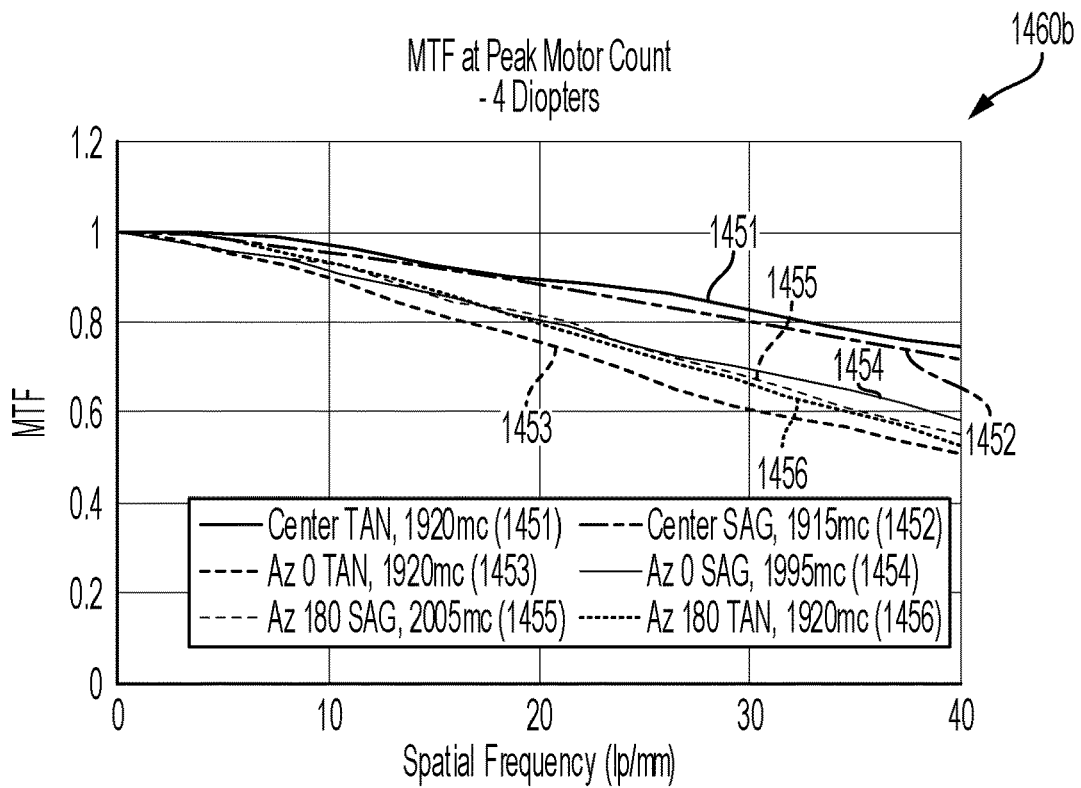

FIGS. 14A and 14B are plots 1460a and 1460b illustrating peak MTF values for each of the points of interest identified above across different spatial frequencies of line pairs in imaged test patterns. As such, similar results are obtained in each plot 1460a and 1460b regardless of the absence (FIG.

14A) or the presence (FIG. 14B) of a prescription lens, indicating that imaging systems configured in accordance with various embodiments of the present technology are able to successfully compensate for optical power provided by spherical components of a prescription lens.

Figure 15A:
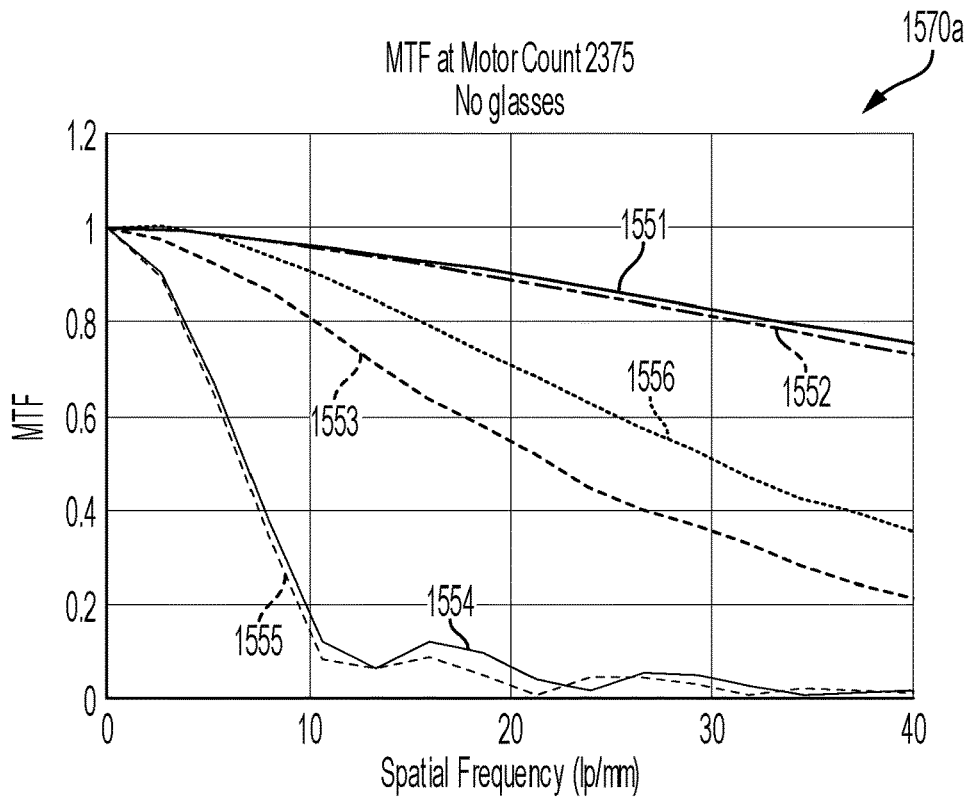
FIGS. 15A and 15B are plots illustrating MTF values measured while an optical power of the camera system was set to a value that maximizes focus of a test pattern at a center tangential point of interest and a center sagittal point of interest, in accordance with various embodiments of the present technology.
Figure 15B:
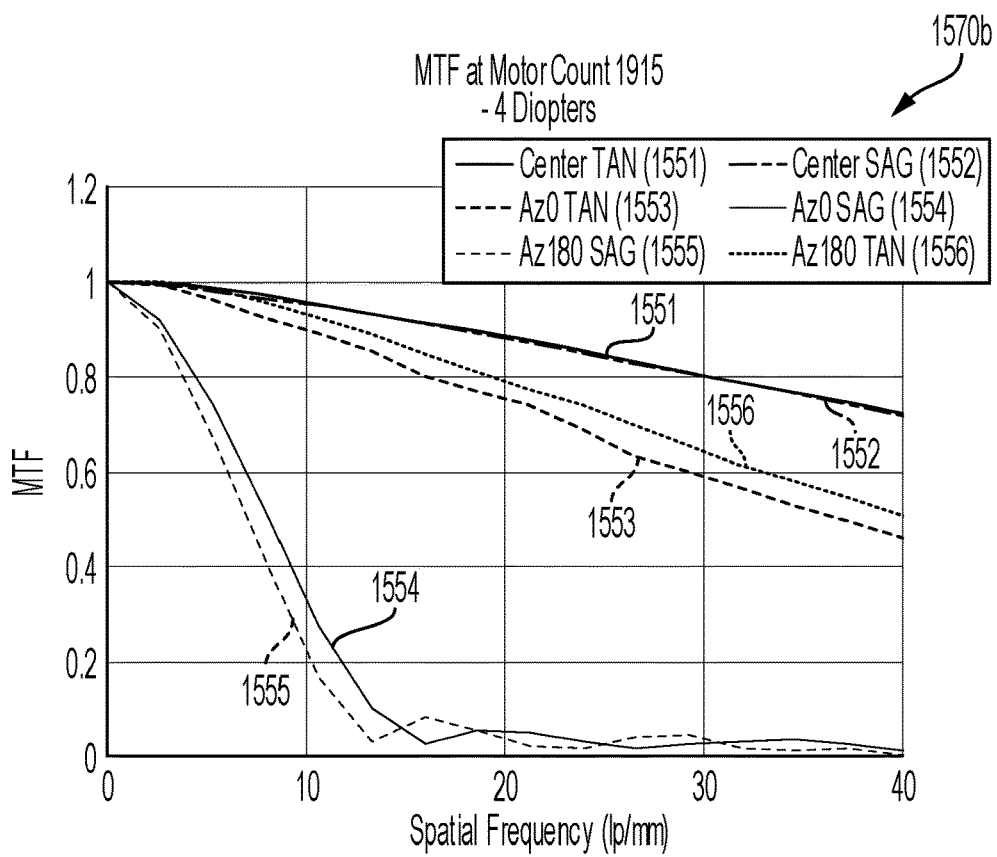

FIGS. 15A and 15B are plots 1570a and 1570b illustrating MTF values achieved by setting an optical power of the camera system to a value that maximizes focus of a test pattern at the center tangential and center sagittal points of interest. The MTF values are plotted against spatial frequency of line pairs presented in the imaged test patterns. As shown, similar results are obtained in each plot 1570a and 1570b regardless of the absence (FIG. 15A) or the presence (FIG. 15B) of a prescription lens. All that changes across the plots is the optical power at which the camera system is set to achieve the peak MTF values at the center points of interest, indicating that imaging systems configured in accordance with various embodiments of the present technology are able to successfully compensate for optical power provided by spherical components of a prescription lens. As also shown in the plots 1570a and 1570b, the MTF values obtained at points of interest away from the center tangential and center sagittal points of interest are poor. This is due to the curvature of the object plane and the fact that the MTF values were optical while the camera system was set at an optimal power that maximized focus at the center points of interest.

Figure 16:
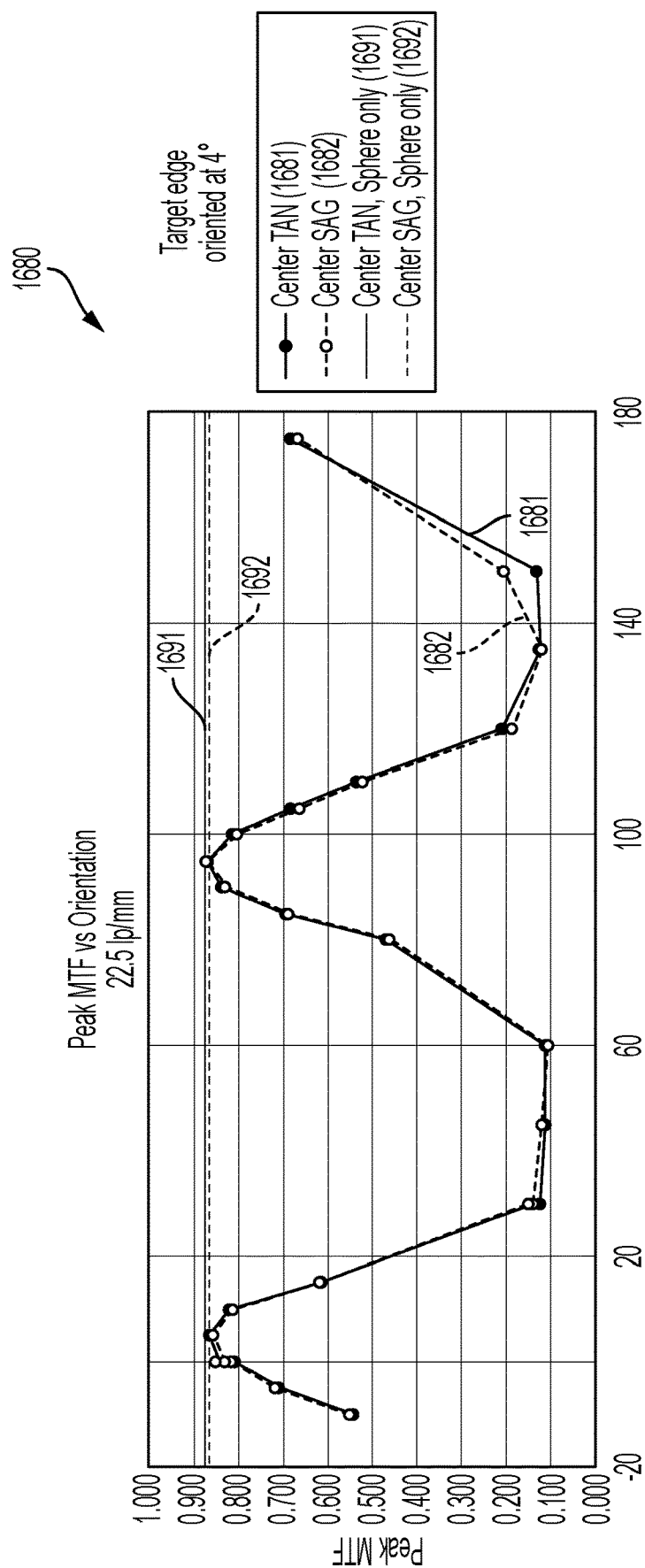
FIG. 16 is a plot illustrating peak MTF values measured from images of a test pattern including 22.5 line pairs/mm at various points of interest against astigmatism orientation.

FIG. 16 is a plot 1680 that illustrates peak MTF values obtained from images of a test pattern including 22.5 line pairs/mm at various points of interest against astigmatism orientation. More specifically, the plot 1680 illustrates (a) peak MTF values 1681 obtained at a center tangential point of interest as a function of astigmatism angle of a lens with a cylindrical component; (b) peak MTF values 1682 obtained at a center sagittal point of interest as a function of astigmatism angle of the lens with the cylindrical component; (c) peak MTF values 1691 obtained at the center tangential point of interest in the presence of a lens that lacked cylindrical components to address astigmatism; and (d) peak MTF values 1692 obtained at the center sagittal point of interest in the presence of the lens that lacked cylindrical components to address astigmatism. As expected, the peak MTF values 1691 and the peak MTF values 1692 remain unchanged as astigmatism orientation changes. On the other hand, the peak MTF values 1681 and the peak MTF values 1682 vary greatly as a function of astigmatism orientation. In particular, the peak MTF values 1681 and the peak MTF values 1682 are maximized when the target edge angle of the line pairs in the imaged test pattern are aligned/match the astigmatism angle of the prescription lens, and are minimized when the target edge angle is fully misaligned with eh astigmatism angle of the prescription lens. As also shown by the plot 1680 in FIG. 16, when the target edge angle matches the astigmatism angle of a prescription lens, generally similar or identical peak MTF values can be obtained at each point of interest as are obtained in the presence of a prescription lens that lacks cylindrical components (and/or as are obtained in the absence of a prescription lens altogether). This indicates that the imaging system and associated methods of the present technology are successfully able to compensate for optical power provided by cylindrical components of a prescription lens to address astigmatisms.

Figure 17:
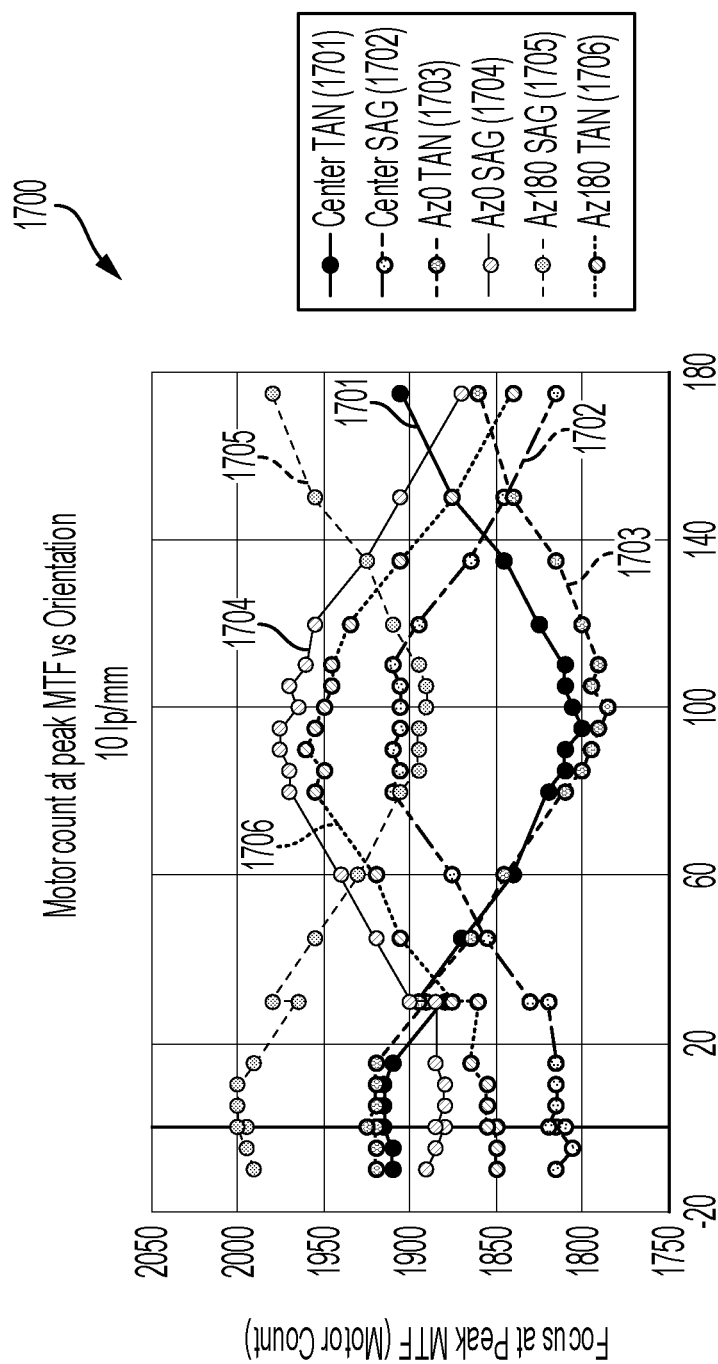
FIG. 17 is a plot illustrating (a) optical power settings of a camera system used to measure peak MTF values from images of a test pattern including ten (10) line pairs/mm as a function of (b) astigmatism angle of a prescription lens, at various points of interest within a FOV of the camera system and in accordance with various embodiments of the present technology.

FIG. 17 is a plot 1700 illustrating (a) optical power settings of a camera system used to obtain peak MTF values from images of a test pattern including ten (10) line pairs/mm as a function of (b) astigmatism angle of a prescription lens, at various points of interest within a FOV of the camera system. The plot 1700 therefore illustrates the effects of cylindrical components of a prescription lens on measurements taken through the prescription lens. For example, the plot 1700 illustrated that an astigmatic lens can add optical power in a one orientation (e.g., sagittal or tangential).

C. Additional Examples

Several aspects of the present technology are set forth in the following examples. Although several aspects of the present technology are set forth in examples directed to systems and methods, these aspects of the present technology can similarly be set forth in examples directed to methods and systems, respectively, in other embodiments. Additionally, these same aspects of the present technology can be set forth in examples directed to devices and/or to (e.g., non-transitory) computer-readable media in other embodiments.

1. A method for characterizing focus quality of a device under test (DUT) through a prescription lens, the method comprising:
adjusting an optical power of a measurement device to compensate for optical power provided by the prescription lens;
imaging, using the measurement device, a test pattern through the prescription lens, wherein the test pattern is displayed by the DUT;
measuring contrast of an edge in the test pattern at a point of interest within at least one image of the test pattern; and
determining focus quality of the DUT based at least in part on the contrast measurement.

2. The method of example 1 wherein adjusting the optical power of the measurement device includes adjusting a lens of the measurement device to a focus setting that maximizes focus of the test pattern at the point of interest.

3. The method of example 2 wherein adjusting the lens of the measurement device to the focus setting includes adjusting the lens of the measurement device such that the optical power provided by the measurement device is negative.

4. The method of example 2 or example 3 wherein adjusting the lens of the measurement device includes electronically adjusting the lens of the measurement device to the focus setting.

5. The method of example 4 wherein adjusting the lens of the measurement device further includes automatically adjusting the lens of the measurement device in response to instructions received from a test executive executed on a computing device coupled to the measurement device.

6. The method of any of examples 2-5 wherein adjusting the optical power of the measurement device includes identifying the focus setting that maximizes focus of the test pattern at the point of interest.

7. The method of example 6 wherein identifying the focus setting includes:
adjusting the optical power of the measurement device to a first value in a range of optical power values;
capturing a first image of the test pattern while the optical power of the measurement device is set to the first value;
adjusting the optical power of the measurement device to a second value in the range of optical power values; and
capturing a second image of the test pattern while the optical power of the measurement device is set to the second value.

8. The method of example 7 wherein the first value, the second value, or both the first and the second value correspond to negative optical powers.

9. The method of example 8 wherein the first value or the second value correspond to a positive optical power.

10. The method of any of examples 7-9 wherein identifying the focus setting further includes determining, based at least in part on a first contrast measurement of the edge in the first image and on a second contrast measurement of the edge in the second image, an optimal optical power of the measurement device at which contrast measurements of the edge are maximized.

11. The method of any of examples 1-10 wherein adjusting the optical power of the measurement device includes identifying the optical power provided by the prescription lens.

12. The method of any of examples 1-11 wherein determining the focus quality of the DUT includes comparing the contrast measurement to a focus quality threshold.

13. The method of example 12 wherein the contrast measurement includes a peak modulation transfer function (MTF) value of the DUT at the point of interest, and wherein determining the focus quality of the DUT includes (a) determining an MTF of the DUT at the point of interest and (b) identifying the peak MTF value in the MTF.

14. The method of any of examples 1-13, further comprising compensating for an astigmatism angle of the prescription lens.

15. The method of example 14 wherein compensating for the astigmatism angle includes orienting the edge in the test pattern at an angle that matches the astigmatism angle of the prescription lens.

16. The method of example 14 or example 15 wherein compensating for the astigmatism angle includes:
orienting the edge in the test pattern at a first angle in a range of angles;
capturing a first image of the test pattern while the edge in the test pattern is oriented at the first angle;
orienting the edge in the test pattern at a second angle in the range of angles; and
capturing a second image of the test pattern while the edge in the test pattern is oriented at the second angle.

17. The method of example 16 wherein compensating for the astigmatism angle further includes determining, based at least in part on a first contrast measurement of the edge in the first image and on a second contrast measurement of the edge in the second image, an optimal angle at which to set the edge in the test pattern to maximize contrast measurements of the edge.

18. The method of example 16 or example 17 wherein compensating for the astigmatism angle further includes identifying, based at least in part on a first contrast measurement of the edge in the first image and on a second contrast measurement of the edge in the second image, the astigmatism angle of the prescription lens.

19. The method of any of examples 14-18 wherein compensating for the astigmatism angle includes compensating for the astigmatism angle using a cylindrical lens oriented at an angle that corresponds to the astigmatism angle.

20. The method of example 19 wherein the cylindrical lens includes a negative cylindrical lens.

21. The method of example 19 wherein the cylindrical lens includes a positive cylindrical lens.

22. The method of any of examples 1-21 further comprising compensating for an optical power provided by cylindrical components of the prescription lens.

23. The method of example 22 wherein compensating for the optical power includes compensating for the optical power using a cylindrical lens configured to provide an optical power that corresponds to the optical power provided by the cylindrical components of the prescription lens.

24. The method of example 23 wherein the cylindrical lens is configured to provide an optical power equivalent to a negation of the optical power provided by the cylindrical components of the prescription lens, and wherein compensating for the optical power includes orienting the cylindrical lens at an angle that matches an astigmatism angle of the cylindrical components of the prescription lens.

25. The method of example 24 wherein adjusting the optical power of the measurement device to compensate for the optical power provided by the prescription lens includes adjusting the optical power of the measurement device to compensate for spherical power provided by spherical components of the prescription lens.

26. The method of example 25 wherein adjusting the optical power of the measurement device to compensate for the optical power provided by the prescription lens includes only adjusting the optical power of the measurement device to compensate for the spherical power provided by the spherical components of the prescription lens.

27. The method of example 23 wherein the cylindrical lens is configured to provide an optical power equivalent to the optical power provided by the cylindrical components of the prescription lens, and wherein compensating for the optical power includes orienting the cylindrical lens at an angle orthogonal to an astigmatism angle of the cylindrical components of the prescription lens.

28. The method of example 27 wherein adjusting the optical power of the measurement device to compensate for the optical power provided by the prescription lens includes adjusting the optical power of the measurement device to compensate for (a) spherical power provided by spherical components of the prescription lens and (b) spherical power provided by a combination of the cylindrical components of the prescription lens with the cylindrical lens.

29. The method of any of examples 1-28, further comprising instructing or causing the DUT to display the test pattern.

30. The method of example 29 wherein instructing or causing the DUT to display the test pattern includes instructing or causing the DUT to display a plurality of lines spaced apart from one another at a specified spatial frequency.

31. The method of example 29 or example 30 wherein the edge corresponds to a line or a line pair, and wherein instructing or causing the DUT to display the test pattern includes instructing or causing the DUT to display the line pair oriented relative to a reference line such that the edge is displayed at a specified angle.

32. The method of example 29 wherein instructing or causing the DUT to display the test pattern includes instructing or causing the DUT to display the edge slanted at four degrees.

33. The method of any of examples 1-32 wherein:
the point of interest is a first point of interest;
the optical power provided by the prescription lens includes an optical power provided by the prescription lens at the first point of interest;
determining the focus quality of the DUT includes determining the focus quality of the DUT at the first point of interest; and
the method further comprises—
adjusting the optical power of the measurement device to compensate for an optical power provided by the prescription lens at a second point of interest different from the first point of interest, imaging, using the measurement device, the test pattern through the prescription lens while the optical power of the measurement device compensates for the optical power provided by the prescription lens at the second point of interest, measuring contrast of the edge in the test pattern at the second point of interest within an image of the test pattern captured while the optical power of the measurement device compensates for the optical power provided by the prescription lens at the second point of interest, and determining focus quality of the DUT at the second point of interest based at least in part on the contrast measurement at the second point of interest.

34. The method of any of examples 1-33 wherein imaging the test pattern includes imaging the test pattern through the prescription lens while the optical power of the measurement device compensates for the optical power provided by the prescription lens at the point of interest.

35. The method of any of examples 1-34 wherein:

the measurement device includes (i) an image sensor and (ii) a lens configured to adjust focus of the measurement device; and imaging the test pattern includes imaging, using the image sensor, the DUT (a) through the lens of the measurement device and the prescription lens and (b) without a compensation lens positioned between the image sensor and the DUT, the compensation lens being different from the lens of the measurement device and the prescription lens.

36. A method for compensating for optical power provided by a prescription lens, the method comprising:

adjusting an optical power of a measurement device to correspond to an optical power provided by the prescription lens at a point of interest; and imaging, using the measurement device, a device under test (DUT) through the prescription lens while the optical power of the measurement device corresponds to the optical power provided by the prescription lens at the point of interest.

37. The method of example 36 wherein adjusting the optical power of the measurement device includes:

receiving prescription information indicating the optical power provided by the prescription lens; and adjusting the optical power of the measurement device based at least in part on the optical power indicated in the prescription information and on a desired focal length corresponding to the point of interest.

38. The method of example 36 or example 37 wherein adjusting the optical power of the measurement device includes:

adjusting the optical power of the measurement device to a first optical power in a range of optical powers;

capturing a first image of the DUT through the prescription lens while the optical power of the measurement device is set to the first optical power;

adjusting the optical power of the measurement device to a second optical power in the range;

capturing a second image the DUT through the prescription lens while the optical power of the measurement device is set to the second optical power;

measuring contrast of information included in the first image at a point of interest;

measuring contrast of the information included in the second image at the point of interest; and determining, based at least in part on the contrast measurement of the information in the first image and on the contrast measurement of the information in the second image, an optimal optical power of the measurement device that maximizes contrast of the information at the point of interest in images of the DUT captured through the prescription lens.

39. The method of any of examples 36-38 wherein the optical power provided by the prescription lens at the point of interest includes spherical optical power provided by the prescription lens at the point of interest.

40. The method of any of examples 36-39 wherein the optical power provided by the prescription lens at the point of interest includes cylindrical optical power provided by the prescription lens at the point of interest.

41. The method of any of examples 36-40 wherein the optical power provided by the prescription lens at the point of interest includes spherical optical power and cylindrical optical power provided by the prescription lens at the point of interest.

42. A method for compensating for an astigmatism angle of a prescription lens, the method comprising:

setting a target edge angle to match the astigmatism angle of the prescription lens, the target edge angle corresponding to an orientation of a target edge in a test pattern displayed by a device under test (DUT); and imaging, using a measurement device, the test pattern through the prescription lens while the target edge angle matches the astigmatism angle.

43. The method of example 42, further comprising receiving prescription information indicating the astigmatism angle of the prescription lens, and wherein setting the target edge angle includes setting the target edge angle to match the astigmatism angle indicated in the prescription information.

44. The method of example 42 or example 43 wherein setting the target edge angle includes:

setting the target edge angle to a first angle value in a range of angle values;

capturing a first image of the test pattern through the prescription lens while the target edge angle is set to the first angle value;

setting the target edge angle to a second angle values in the range of angle values;

capturing a second image of the test pattern through the prescription lens while the target edge angle is set to the second angle value;

measuring contrast of the target edge in the first image at a point of interest;

measuring contrast of the target edge in the second image at the point of interest; and determining, based at least in part on the contrast measurement of the target edge in the first image and on the contrast measurement of the target edge in the second image, an optimal target edge angle that maximizes contrast of the target edge at the point of interest in images of the DUT captured through the prescription lens.

45. The method of any of examples 42-44 wherein the test pattern includes a plurality of lines separated at a specified spatial frequency, and wherein a line of the plurality of lines at least in part defines the target edge.

46. A method for compensating for effects of a prescription lens on measurements of a device under test (DUT) captured through the prescription lens, the method comprising:

adjusting an optical power of a measurement device to corresponding to an optical power provided by the prescription lens at a point of interest; and setting a target edge angle to match an astigmatism angle of the prescription lens, the target edge angle corresponding to an orientation of a target edge in a test pattern displayed by the DUT.

47. An imaging system for measuring a device under test (DUT) through a prescription lens, the imaging system comprising:

a measurement device including (i) an image sensor and (ii) an adjustable lens that is usable to adjust an optical power of the measurement device; and a test executive communicatively coupled to the DUT, wherein the test executive is configured to instruct or cause the DUT to display a test pattern that can be imaged through the prescription lens using the measurement device at least while the DUT is positioned within a field of view (FOV) of the image sensor.

48. The imaging device of example 47 wherein the adjustable lens is configured such that the adjustable lens is usable to focus the measurement device beyond infinity.

49. The imaging device of example 47 or example 48 wherein the adjustable lens is usable to adjust the optical power of the measurement device to any of a plurality of optical power values, and wherein the plurality of optical power values includes a first value corresponding negative optical power and a second value corresponding to positive optical power.

50. The imaging device of any of examples 47-49 wherein a position of the adjustable lens is electronically adjustable to adjust the optical power of the measurement device.

51. The imaging device of any of examples 47-50 wherein the test executive is further communicatively coupled to the measurement device, and wherein the test executive is configured to control a position of the adjustable lens to set the optical power of the measurement device at a desired optical power value.

52. The imaging device of any of examples 47-51 wherein, to instruct or cause the DUT to display the test pattern, the test executive is configured to instruct or cause the DUT to display a plurality of lines separated at a specified spatial frequency and defining target edges that are oriented at a specified angle relative to a reference axis.

53. The imaging device of any of examples 47-52 wherein the test executive is further communicatively coupled to the measurement device, and wherein the test executive is configured to control a timing of image capture of the test pattern using the measurement device.

54. The imaging device of any of examples 47-53 wherein the adjustable lens includes an internal aperture, and wherein a diameter of the internal aperture is mechanically or electronically adjustable to adjust a diameter of an entrance pupil of the measurement device.

55. The imaging device of any of examples 47-54, further comprising a cylindrical lens (a) orientable to an angle corresponding to an astigmatism angle of the prescription lens and (b) configured to provide a first optical power that compensates for a second optical power provided by cylindrical components of the prescription lens.

56. The imaging device of example 55 wherein the cylindrical lens includes a negative cylindrical lens.

57. The imaging device of example 55 wherein the cylindrical lens includes a positive cylindrical lens.

58. The imaging device of any of examples 55-57 wherein the angle corresponding to the astigmatism angle of the prescription lens is an angle that matches the astigmatism angle of the prescription lens.

59. The imaging device of any of examples 55-57 wherein the angle corresponding to the astigmatism angle of the prescription lens is an angle orthogonal to the astigmatism angle of the prescription lens.

60. The imaging device of any of examples 55-59 wherein the first optical power is equivalent to a negation of the second optical power.

61. The imaging device of any of examples 55-59 wherein the first optical power is equivalent the second optical power.

62. The imaging device of any of examples 55-61 wherein the cylindrical lens is reversibly attachable to the measurement device.

63. A test pattern for use in characterizing a sharpness of focus of an electronic display, the test pattern comprising a plurality of lines separated from one another at a specified spatial frequency, wherein lines of the plurality of lines at least in part define target edges oriented at a specified target edge angle relative to a reference axis.

64. A test executive for use in charactering a sharpness of focus of an electronic display, the test executive communicatively couplable to the electronic display and configured to instruct or cause the electronic display to present a test pattern having one or more characteristics specified by the test executive.

65. The test executive of example 64 wherein the one or more characteristics include a plurality of lines separated at a specified spatial frequency and defining at least one target edge that is oriented in the test pattern at a specified angle relative to a reference axis.

66. A method for determining or verifying prescription information of a prescription lens, the method comprising:

determining an optical power provided by the prescription lens; and/or determining an astigmatism axis of the prescription lens.

67. The method of example 66 wherein determining the optical power provided by the prescription lens includes:

directly imaging, using a measurement device set at a first optical power, an electronic display to capture a first image of a test pattern presented on the electronic display;

measuring contrast of a target edge in the test pattern at a first point of interest in the first image to obtain a first contrast measurement;

positioning the prescription lens between the electronic display and the measurement device;

imaging, using the measurement device, the electronic display through the prescription lens to capture one or more second images of the test pattern, wherein the imaging includes imaging the electronic display while the measurement device is set at one or more second optical powers;

measuring contrast of the target edge at the first point of interest in the one or more second images to obtain one or more second contrast measurements;

determining, based at least in part on the one or more second contrast measurements, an optimal optical power of the measurement device that achieves a contrast measurement equivalent to the first contrast measurement; and determining a change between the first optical power and the optimal optical power.

68. The method of example 66 or example 67 wherein determining the astigmatism axis of the prescription lens includes:

imaging, using a measurement device and through the prescription lens, a target pattern presented on an electronic device to obtain a plurality of images of the target pattern, wherein each image of the plurality of images captures a target edge in the target pattern at a point of interest, and wherein an angle of orientation of the target edge relative to a reference axis is different in each image;

measuring contrast of the target each in each image to obtain corresponding contrast measurements; and determining, based at least on the corresponding contrast measurements, an optimal angle of orientation of the target edge that maximizes contrast of the target edge in images of the target pattern.

D. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls.

Where the context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having." and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on."

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method for characterizing focus quality of a device under test (DUT) through a prescription lens, the method comprising:
    adjusting an optical power of a measurement device to compensate for optical power provided by the prescription lens;
    imaging, using the measurement device, a test pattern through the prescription lens, wherein the test pattern is displayed by the DUT;
    measuring contrast of an edge in the test pattern at a point of interest within at least one image of the test pattern; and
    determining focus quality of the DUT based at least in part on the contrast measurement.

2. The method of claim 1 wherein adjusting the optical power of the measurement device includes adjusting a lens of the measurement device to a focus setting that maximizes focus of the test pattern at the point of interest.

3. The method of claim 2 wherein adjusting the lens of the measurement device to the focus setting includes adjusting the lens of the measurement device such that the optical power provided by the measurement device is negative.

4. The method of claim 2 wherein adjusting the lens of the measurement device includes electronically adjusting the lens of the measurement device to the focus setting.

5. The method of claim 4 wherein adjusting the lens of the measurement device further includes automatically adjusting the lens of the measurement device in response to instructions received from a test executive executed on a computing device coupled to the measurement device.

6. The method of claim 2 wherein adjusting the optical power of the measurement device includes identifying the focus setting that maximizes focus of the test pattern at the point of interest.

7. The method of claim 6 wherein identifying the focus setting includes:
    adjusting the optical power of the measurement device to a first value in a range of optical power values;
    capturing a first image of the test pattern while the optical power of the measurement device is set to the first value;
    adjusting the optical power of the measurement device to a second value in the range of optical power values; and
    capturing a second image of the test pattern while the optical power of the measurement device is set to the second value.

8. The method of claim 7 wherein the first value, the second value, or both the first and the second value correspond to negative optical powers.

9. The method of claim 8 wherein the first value or the second value correspond to a positive optical power.

10. The method of claim 7 wherein identifying the focus setting further includes determining, based at least in part on a first contrast measurement of the edge in the first image and on a second contrast measurement of the edge in the second image, an optimal optical power of the measurement device at which contrast measurements of the edge are maximized.

11. The method of claim 1 wherein adjusting the optical power of the measurement device includes identifying the optical power provided by the prescription lens.

12. The method of claim 1 wherein determining the focus quality of the DUT includes comparing the contrast measurement to a focus quality threshold.

13. The method of claim 12 wherein the contrast measurement includes a peak modulation transfer function (MTF) value of the DUT at the point of interest, and wherein determining the focus quality of the DUT includes (a) determining an MTF of the DUT at the point of interest and (b) identifying the peak MTF value in the MTF.

14. The method of claim 1, further comprising compensating for an astigmatism angle of the prescription lens.

15. The method of claim 14 wherein compensating for the astigmatism angle includes orienting the edge in the test pattern at an angle that matches the astigmatism angle of the prescription lens.

16. The method of claim 14 wherein compensating for the astigmatism angle includes:
orienting the edge in the test pattern at a first angle in a range of angles;
capturing a first image of the test pattern while the edge in the test pattern is oriented at the first angle;
orienting the edge in the test pattern at a second angle in the range of angles; and
capturing a second image of the test pattern while the edge in the test pattern is oriented at the second angle.

17. The method of claim 16 wherein compensating for the astigmatism angle further includes determining, based at least in part on a first contrast measurement of the edge in the first image and on a second contrast measurement of the edge in the second image, an optimal angle at which to set the edge in the test pattern to maximize contrast measurements of the edge.

18. The method of claim 16 wherein compensating for the astigmatism angle further includes identifying, based at least in part on a first contrast measurement of the edge in the first image and on a second contrast measurement of the edge in the second image, the astigmatism angle of the prescription lens.

19. The method of claim 14 wherein compensating for the astigmatism angle includes compensating for the astigmatism angle using a cylindrical lens oriented at an angle that corresponds to the astigmatism angle.

20. The method of claim 19 wherein the cylindrical lens includes a negative cylindrical lens.

21. The method of claim 19 wherein the cylindrical lens includes a positive cylindrical lens.

22. The method of claim 1 further comprising compensating for an optical power provided by cylindrical components of the prescription lens.

23. The method of claim 22 wherein compensating for the optical power includes compensating for the optical power using a cylindrical lens configured to provide an optical power that corresponds to the optical power provided by the cylindrical components of the prescription lens.

24. The method of claim 23 wherein the cylindrical lens is configured to provide an optical power equivalent to a negation of the optical power provided by the cylindrical components of the prescription lens, and wherein compensating for the optical power includes orienting the cylindrical lens at an angle that matches an astigmatism angle of the cylindrical components of the prescription lens.

25. The method of claim 24 wherein adjusting the optical power of the measurement device to compensate for the optical power provided by the prescription lens includes adjusting the optical power of the measurement device to compensate for spherical power provided by spherical components of the prescription lens.

26. The method of claim 25 wherein adjusting the optical power of the measurement device to compensate for the optical power provided by the prescription lens includes only adjusting the optical power of the measurement device to compensate for the spherical power provided by the spherical components of the prescription lens.

27. The method of claim 23 wherein the cylindrical lens is configured to provide an optical power equivalent to the optical power provided by the cylindrical components of the prescription lens, and wherein compensating for the optical power includes orienting the cylindrical lens at an angle orthogonal to an astigmatism angle of the cylindrical components of the prescription lens.

28. The method of claim 27 wherein adjusting the optical power of the measurement device to compensate for the optical power provided by the prescription lens includes adjusting the optical power of the measurement device to compensate for (a) spherical power provided by spherical components of the prescription lens and (b) spherical power provided by a combination of the cylindrical components of the prescription lens with the cylindrical lens.

29. The method of claim 1, further comprising instructing or causing the DUT to display the test pattern.

30. The method of claim 29 wherein instructing or causing the DUT to display the test pattern includes instructing or causing the DUT to display a plurality of lines spaced apart from one another at a specified spatial frequency.

31. The method of claim 29 wherein the edge corresponds to a line or a line pair, and wherein instructing or causing the DUT to display the test pattern includes instructing or causing the DUT to display the line pair oriented relative to a reference line such that the edge is displayed at a specified angle.

32. The method of claim 29 wherein instructing or causing the DUT to display the test pattern includes instructing or causing the DUT to display the edge slanted at four degrees.

33. The method of claim 1 wherein:
the point of interest is a first point of interest;
the optical power provided by the prescription lens includes an optical power provided by the prescription lens at the first point of interest;
determining the focus quality of the DUT includes determining the focus quality of the DUT at the first point of interest; and
the method further comprises—
adjusting the optical power of the measurement device to compensate for an optical power provided by the prescription lens at a second point of interest different from the first point of interest,
imaging, using the measurement device, the test pattern through the prescription lens while the optical power of the measurement device compensates for the optical power provided by the prescription lens at the second point of interest,
measuring contrast of the edge in the test pattern at the second point of interest within an image of the test pattern captured while the optical power of the measurement device compensates for the optical power provided by the prescription lens at the second point of interest, and determining focus quality of the DUT at the second point of interest based at least in part on the contrast measurement at the second point of interest.

34. The method of claim 1 wherein imaging the test pattern includes imaging the test pattern through the prescription lens while the optical power of the measurement device compensates for the optical power provided by the prescription lens at the point of interest.

35. The method of claim 1 wherein:
- the measurement device includes (i) an image sensor and (ii) a lens configured to adjust focus of the measurement device; and
- imaging the test pattern includes imaging, using the image sensor, the DUT (a) through the lens of the measurement device and the prescription lens and (b) without a compensation lens positioned between the image sensor and the DUT, the compensation lens being different from the lens of the measurement device and the prescription lens.

* * * * *